(12) United States Patent
Anisimov et al.

(10) Patent No.: US 11,468,288 B2
(45) Date of Patent: Oct. 11, 2022

(54) METHOD OF AND SYSTEM FOR EVALUATING CONSUMPTION OF VISUAL INFORMATION DISPLAYED TO A USER BY ANALYZING USER'S EYE TRACKING AND BIORESPONSE DATA

(71) Applicant: Oken Technologies, Inc., New York, NY (US)

(72) Inventors: Victor Nikolaevich Anisimov, Moscow (RU); Konstantin Leonidovich Chernozatonskiy, Moscow (RU); Maxim Kirillovich Raykhrud, St. Petersburg (RU); Arsen Revazov, Moscow (RU)

( * ) Notice: Subject to any disclaimer, the term of this patent is extended or adjusted under 35 U.S.C. 154(b) by 281 days.

(21) Appl. No.: 16/940,931

(22) Filed: Jul. 28, 2020

(65) Prior Publication Data
US 2020/0364539 A1 Nov. 19, 2020

(51) Int. Cl.
*G06N 3/04* (2006.01)
*G06N 3/08* (2006.01)
(Continued)

(52) U.S. Cl.
CPC ........... *G06N 3/0445* (2013.01); *G06F 3/011* (2013.01); *G06F 3/012* (2013.01); *G06F 3/013* (2013.01);
(Continued)

(58) Field of Classification Search
CPC ........ G06N 3/0445; G06N 3/08; G06N 5/003; G06N 3/0454; G06N 20/00; G06F 3/012;
(Continued)

(56) References Cited

U.S. PATENT DOCUMENTS

| 6,090,051 A | 7/2000 | Marshall |
| 7,130,447 B2 | 10/2006 | Aughey et al. |

(Continued)

FOREIGN PATENT DOCUMENTS

| WO | 2019/040665 A1 | 2/2019 |
| WO | 2019/094953 A1 | 5/2019 |

OTHER PUBLICATIONS

Bradshaw, J. L., Pupil Size and Problem Solving, Quarterly Journal of Experimental Psychology, vol. 20, Issue 2, 1968, pp. 116-122.
(Continued)

*Primary Examiner* — Mihir K Rayan
(74) *Attorney, Agent, or Firm* — Anglehart et al.

(57) ABSTRACT

Method of analyzing eye tracking data for estimating user's cognitive and emotional level of consumption of visual information. A training machine learning model is trained using a data set containing gaze information of known training users, their known cognitive levels and their EEG signal measurements. A calibrating machine learning model is trained using a data set of calibrating visual information displayed to a user, calibrating gaze tracks of that user, calibrating actions data of that user, and calibrating session data related to the session environment. The device displays to that user a target visual information and records target eye tracking data of that user in response to consuming the target information. The recorded target eye tracking data is calibrated via the calibrating machine learning model. The calibrated target eye tracking data is fed into the training machine learning model, which estimates the cognitive levels of consumption of the target visual information of that user.

20 Claims, 29 Drawing Sheets

(51) Int. Cl.
  *G06F 3/01*    (2006.01)
  *G06N 20/00*   (2019.01)
  *G06F 16/23*   (2019.01)
  *G06F 3/14*    (2006.01)
  *G06N 5/00*    (2006.01)

(52) U.S. Cl.
  CPC ............... *G06F 3/015* (2013.01); *G06F 3/14* (2013.01); *G06F 16/2379* (2019.01); *G06N 3/0454* (2013.01); *G06N 3/08* (2013.01); *G06N 20/00* (2019.01); *G06F 2203/011* (2013.01); *G06N 5/003* (2013.01)

(58) Field of Classification Search
  CPC . G06F 3/013; G06F 3/015; G06F 3/14; G06F 16/2379; G06F 2203/011; G06F 3/011
  See application file for complete search history.

(56) References Cited

U.S. PATENT DOCUMENTS

| | | | |
|---|---|---|---|
| 8,602,789 B2 | 12/2013 | Hallowell et al. | |
| 10,534,982 B2* | 1/2020 | Linden | G06T 7/73 |
| 10,884,494 B1* | 1/2021 | Lagies | G06F 3/013 |
| 11,106,280 B1* | 8/2021 | Bigham | G06F 3/013 |
| 2014/0208226 A1 | 7/2014 | Lyons | |
| 2020/0029806 A1* | 1/2020 | Shojaeizadeh | A61B 5/163 |

OTHER PUBLICATIONS

Gardner, R. M., et al., Pupillary Changes during Encoding, Storage, and Retrieval of Information, Perceptual and Motor Skills, vol. 41, Issue 3, 1975, pp. 951-955.

Granhohn, E. et al., Pupillary responses index cognitive resource limitations, Psychophysiology. vol. 33, Issue4, Jul. 1996, pp. 457-461.

Kahneman, D., Attention and Effort, Prentice-Hall, Englewood Cliff, N.J. (1973), ISBN 0-13-050518-8.

Hess, E. H. et al., Pupil Size in Relation to Mental Activity during Simple Problem-Solving, Science Mew Series, vol. 143, No. 3611 (Mar. 13, 1964), pp. 1190-1192, Published By: American Association for the Advancement of Science.

Ahern, S. et al., Pupillary responses during information processing vary with Scholastic Aptitude Test scores, Science Sep. 21, 1979: vol. 205, Issue 4412, pp. 1289-1292.

Metalis, S. A. et al., Pupillometric assessment of reading using materials in normal and reversed orientations. J. Applied Psych. 65:359-363 (1980).

Schluroff, M., Pupil responses to grammatical complexity of sentences, Brain and Language, vol. 17, Issue 1, Sep. 1982, pp. 133-145.

Just, M. A. et al., The intensity dimension of thought: Pupillometric indices of sentence processing. Canadian Journal of Experimental Psychology. 47:310-339 (1993).

Backs, R. W. et al., Eye movement and pupillary response indices of mental workload during visual search of symbolic displays, Applied Ergonomics, vol. 23, Issue 4, Aug. 1992, pp. 243-254.

* cited by examiner

METHOD OF AND SYSTEM FOR EVALUATING CONSUMPTION OF VISUAL INFORMATION DISPLAYED TO A USER BY ANALYZING USER'S EYE TRACKING AND BIORESPONSE DATA

CROSS-REFERENCE

None.

FIELD OF THE TECHNOLOGY

The present technology relates to electronic systems and methods of analyzing eye tracking and bioresponse data in response to a user consuming visual information, specifically, methods of evaluating levels of consumption of the visual information by the user to whom the visual information is displayed.

BACKGROUND

Computing devices such as personal computers, smartphones, tables, virtual reality headsets and/or augmented reality headsets are used widely throughout the world. Users are consuming vast amounts of visual information displayed on screens of those computing devices on a daily basis. It is known that it is possible to track eye movements of a user looking at a display of a computing device by recording with a camera the eye movements of that user while he/she consumes visual information on the display he/she is looking at.

Scientists and engineers are trying to find ways of using data collected via eye tracking methods for various means. These means may include trying to determine levels of attention, fatigue, cognitive engagement, gaze and the like of a user consuming visual information. Other means may include trying to provide interfaces that are gaze-controlled by a user. Different techniques, including various mathematical modelling are being tested for analyzing collected user eye tracking data by many companies.

It has been proposed that eye-movement may correlate with cognitive activity. For example, the pupil may dilate as a user gazes at a point which stimulates cognition. This relationship has been outlined in Kahneman's theory of attention (Kahneman, D., Attention and Effort, Prentice-Hall, Englewood Cliff, N.J. (1973)) and has been the focus of a number of studies involving different cognitive activities including: mental arithmetic (Hess, E. H. and J. M. Polt, Science 140:1190-1192 (1964); Bradshaw, J. L., Quart. J. Expl. Psych. 20:116-122 (1968); Ahern, S. and J. Beatty, Science 205:1289-1292 (1979)), sentence processing (Metalis, S. A. et al., J. Applied Psych. 65:359-363 (1980); Schluroff, M., Brain and Language 17:133-145 (1982); Just, M. A. and P. A. Carpenter, Can. J. Expl. Psych. 47:310-339 (1993)), visual search (Backs, R. W. and L. C. Walrath, Appl. Ergonom. 23:243-254 (1992)), and digit span recall (Gardner, R. M., et al., Percep. Motor Skills 41:951-955 (1975); Granhohn, E. et al., Psychophysiol. 33:457-461 (1996).

For example, U.S. Pat. No. 6,090,051 teaches that pupil dilation is primarily the result of the integrated activity of two groups of muscles located in the iris. One set of muscles (the circular muscles) encircles the pupil; when activated, this set serves to constrict the diameter of the pupil and make it smaller. The second set of muscles (the radial muscles) lies immediately outside the circular muscles and extends radially from the pupil out through the iris. When activated, the radial muscles pull the pupil diameter outward and cause it to become larger. These two sets of muscles (the radial and the circular) typically work together through reciprocal innervation, a physiological process involving both agonistic and antagonistic responses. When an individual experiences a psychosensory stimulus, e.g. a task requiring significant cognitive processing, the pupil may make a response that is quite different from the light reflex as the process of reciprocal innervation is reversed: the radial muscles are activated (causing the pupil to dilate), and the circular muscles are inhibited (also causing the pupil to dilate). The result is a brief dilation that is greater than either muscle group alone could effect. For this reason, the phenomenon is called the dilation reflex (Loewenfeld, 1993). Like the light reflex, the dilation reflex is a transitory event. In both instances, one observes a pulsing of the diameter, but with the dilation reflex the pulses are irregular and sharp, often exhibiting large jumps followed by rapid declines.

It has been also proposed that other eye-movements, measuring either the point of gaze (where one is looking) or the motion of an eye relative to the head may also be related to cognitive and/or emotional responses of a user when stimulated via consuming visual information. There have been some inventions, as those hereinbelow, related to measuring eye movements and analyzing data collected by those measurements.

For example, the U.S. Pat. No. 7,130,447 teaches an improved eye tracking assembly, gaze tracking system and method of calibration, where a user can utilize the eye tracking assembly, as well as the gaze tracking system and method of calibration, without distractions associated with conventional eye tracking assemblies. However, this patent does not seem to teach effective methods of analyzing collected eye tracking data.

For example, the patent application No. WO2019/040665 teaches systems, devices, and methods for use in the implementation of a brain-computer interface that integrates real-time eye-movement tracking with brain activity tracking to present and update a user interface that is strategically designed for high speed and accuracy of human—machine interaction.

For example, the patent application No. WO 2019/094953 teaches systems, devices and methods for various embodiments of a hardware-agnostic, integrated oculomotor-neural hybrid brain computer interface (BCI) platform to track eye movements and brain activity to mediate real-time positioning of a user's gaze or attention and selection/activation of desired action.

For example, the U.S. Pat. No. 8,602,789 teaches methods for assessing cognitive and linguistic abilities by tracking and recording the eye movements of a patient in response to predetermined verbal and visual stimuli. The methods incorporate conventional eye tracking technology to acquire eye-fixation location and duration measures for testing linguistic comprehension, working memory, attention allocation, and the effect of semantic associative priming.

For example, the U.S. Pat. No. 10,534,982 teaches methods, systems, and apparatus, including computer programs encoded on computer storage media, for gaze position prediction using neural networks. One of the systems includes a neural network comprising one or more neural network layers, wherein the neural network is configured to obtain a collection of input facial images of a user, wherein the collection of input facial images of the user comprises (i) a query image of the user, (ii) one or more calibration images of the user, and (iii) a respective calibration label that marks a known gaze position of the user for each of the one or more calibration images of the user; and process the received collection of input facial images of the user using the one or more neural network layers to generate a neural network output that characterizes a gaze position of the user in the query image.

For example, the US patent application No. US2014/0208226 teaches a system that tracks a user's pupillary response to content located on a web page. The system then estimates a cognitive load for the user that is based on the measured response. Cognitive load refers to the total amount of mental activity imposed on working memory in any one instant. Further, the system may aggregate the cognitive load data for one user over time, for many different users, and/or for many different users over time. The cognitive load may be determined for different portions of a displayed page, such as a document object model (DOM) included on the page. The cognitive load may be specified for different elements that make up the DOM. Also, cognitive load may be apportioned over several different DOM elements at one moment in time or over a period of time. Other embodiments are described herein.

The inventions heretofore are known to suffer from a number of disadvantages, which include lack of satisfactory quality of eye tracking data collection and analysis, insufficient precision of determining cognitive and emotional levels of a user that is consuming target visual information, as well as those inventions may be costly to implement in a mass market.

What is needed is a method and/or system that solves one or more of the problems described herein and/or one or more problems that may come to the attention of one skilled in the art upon becoming familiar with this specification.

The objective of the present technology is to provide an efficient method and a system for analyzing eye tracking data of a user in order to determine the cognitive and/or emotional levels that are related to consumption of target visual information by that user. The method and the system have to be safer, more reliable, easily installable and more cost-effective than the conventional eye tracking and analyzing methods and systems, such that they may be scalable for the needs of the mass market.

SUMMARY

It is thus an object of the present technology to ameliorate at least some of the inconveniences present in the prior art.

The present invention relates to determining the correlation of the eye-movements and/or facial expressions of a user that is consuming visual information and his/her estimated cognitive and/or emotional response to the task of consuming that visual information. The determination of the abovementioned correlation may include training one or more machine learning models that include deep neural networks within their architecture.

Embodiments of the present technology have been developed based on researchers' appreciation of at least one technical problem associated with the prior art approaches to estimating the levels of consumption of visual information presented to a user. Various cognitive or emotional levels of a user at a time of consuming the visual information may be measured and/or estimated by recording the eye-movements and/or facial expressions of that user.

More specifically, the presently known prior art systems do not appear to take into account similarities and patterns between users' measurable biological reactions, such as bioresponses, bio-electrical signals, biometrical measurements and/or facial expressions, to various visual stimuli, such as texts, still pictures, moving pictures, still or animated graphics, graphs, colours, symbols, or the like.

The researchers further discovered that it would be beneficial to provide a computerized system and/or a device that will be able to measure and map the similarities and patterns between users' measurable biological reactions to various visual stimuli in order to train a machine learning algorithm that estimates some other user's reactions to some other visual stimuli by recording at least that user's eye movements and/or facial expressions and/or bio-electrical signals. Such a computerized system and/or a device would be then able to determine how well and/or deep a user has comprehended and/or consumed visual stimuli presented to him/her.

In the context of the present specification, unless specifically provided otherwise, the words "training", "calibrating", "target", when they are grammatically used as adjectives, and the words "first", "second", "third", etc. when they are grammatically used as adjectives, have been used as adjectives only for the purpose of allowing for distinction between the nouns that they modify from one another, and not for the purpose of describing any particular relationship between those nouns. Thus, for example, it should be understood that, the use of the terms "training server", "calibrating server", "first server" or "second server" is not intended to imply any particular function, order, type, chronology, hierarchy or ranking (for example) of/between the server, nor is their use (by itself or in a combination) intended imply that any "target" or "second server" must necessarily exist in any given situation. Further, as is discussed herein in other contexts, reference to a "first" element and a "second" element does not preclude the two elements from being the same actual real-world element. Similarly, the reference to terms "target" element and a "training" element does not preclude the two elements from being the same actual real-world element. Thus, for example, in some instances, a "training", a "calibrating", a "first" or a "second" server may be the same software and/or hardware, and in other cases they may be different software and/or hardware. Similarly, in some instances, a "training" and a "calibrating" module may be the same software and/or hardware, and in other cases they may be different software and/or hardware. The term "electroencephalography" may be referred to as EEG in the present application.

According to a first broad aspect of the present technology, there is provided a method of analyzing eye tracking data for evaluating a target cognitive level and/or a target emotional level of a user, whereby the eye tracking is recorded in response to the user consuming a target visual information displayed thereto on a display. The method is executed on an electronic device. The method may have several steps that may be executed independently from each other or that may be executed simultaneously. Modules, servers or components that may execute any method's steps may be technologically integrated, such that each step may be recognizable by the result obtained thereby. The method includes a step of training a training machine learning model. A training visual information and a training data set from a training user are used to train the training machine learning model. The training visual information is displayed to the training user on a training display. The training visual information may include any one of a training number, a training letter, a training image, a training character, a training symbol, a training space and a training color. The training number may be a set of numeric symbols, the training letter may be a set of letters that may form words or sentences, the training image may be a set of images either moving or still, which may be photos, pictures, paintings, graphics, animations or the like, the training character may be any set of characters in any order in any human or computer language, a training symbol may be a set of any computer, grammar, visual, cultural, religious, political, financial symbols or the like, the training space may be the empty spaces between numbers, letters, images, characters or symbols, and the training color may be any RGB color, E-ink, or a visible color of any spectrum. Any of the training number, the training letter, the training image, the training character, the training symbol, the training space or the training color is associated with training coordinates of the training display. The training data set is recorded in response to the training user visually consuming the training visual information by the training user looking at the training display. The training data set contains information that includes training user gaze tracks and one of a training cognitive and training emotional data of the training user. The training cognitive and training emotional data are associated with the training user training gaze tracks. The training gaze tracks are associated with the training coordinates of the displayed training number, training letter, training image, training character, training symbol, training space or training color, depending on where the training user is looking at. The method also includes a step of displaying to the user a calibrating visual information. The calibrating visual information is displayed to the user on a display. The calibrating visual information consists at least of a calibrating number, a calibrating letter, a calibrating image, a calibrating character, a calibrating symbol, a calibrating space or a calibrating color. The calibrating number may be a set of numeric symbols, the calibrating letter may be a set of letters that may form words or sentences, the calibrating image may be a set of images either moving or still, which may be photos, pictures, paintings, graphics, animations or the like, the calibrating character may be any set of characters in any order in any human or computer language, a calibrating symbol may be a set of any computer, grammar, visual, cultural, religious, political, financial symbols or the like, the calibrating space may be the empty spaces between numbers, letters, images, characters or symbols, and the calibrating color may be any RGB color or a visible color of any spectrum. Each of the calibrating number, the calibrating letter, the calibrating image, the calibrating character, the calibrating symbol, the calibrating space and the calibrating color is associated with a particular calibrating coordinates of the display. When the calibrating visual information is displayed to the user, according to the method, a step of recording by an eye tracking device a calibrating data set is executed, in response to the user visually consuming the calibrating visual information. The step of recording the calibrating data set consists of at least recording calibrating gaze tracks of the user, recording calibrating actions data of the user, and recording calibrating session data. The calibrating session data is the data that is recorded at the time of the calibration session, i.e. when the eye tracking device is recording the response of the user to consuming the calibrating visual information. As such, the calibrating session data is related to the session of the recording of the calibrating data set. During the calibrating session, the method may include a step of calculating calibrating features based on associating the calibrating gaze tracks with the calibrating coordinates of the calibrating visual information by analyzing the calibrating gaze tracks, the calibrating actions data and the calibrating session data. These calibrating features are a set of data that is used in the method to train a calibrating machine learning model. As such, the step of training the calibrating machine learning model is performed on the calibrating data set and/or the calibrating features. Further, the method includes a step of displaying to the user a target visual information on the display. The target information consists of at least a target number, a target letter, a target image, a target character, a target symbol, a target space or a target color. The target number may be a set of numeric symbols, the target letter may be a set of letters that may form words or sentences, the target image may be a set of images either moving or still, which may be photos, pictures, paintings, graphics, animations or the like, the target character may be any set of characters in any order in any human or computer language, a target symbol may be a set of any computer, grammar, visual, cultural, religious, political, financial symbols or the like, the target space may be the empty spaces between numbers, letters, images, characters or symbols, and the target color may be any RGB color or a visible color of any spectrum. The target number, the target letter, the target image, the target character, the target symbol, the target space or the target color are associated with target coordinates of the display. The method further includes a step of recording by the eye tracking device a target data set in response to the user visually consuming the target visual information. The step of recording the target data set consists of recording target gaze tracks of the user, and recording target session data of the recording of the target session. The target session is the time when the eye tracking device is recording the target data set. The method further includes the step of calibrating the target data set by applying the calibrating machine learning model to the target data set and determining a calibrated target data set. The method further includes the step of applying the training machine learning model to the calibrated target data set. As such, the training machine learning model performs calculations based at least on the calibrated target data set, such that the method estimates one of the target cognitive level and the target emotional level of consumption of the target visual information of the user. This estimation may be calculated at several target gaze tracks by applying the training machine learning model to different data within the calibrated target data set. The method further includes storing in the electronic device a digital report of one of the target cognitive level and the target emotional level of consumption of the target visual information associated with the several target gaze tracks.

In one aspect of the invention, the method has a step of recording neural signals, bio-electric signals, facial expressions or any biometrical measurements of the user, in response to the user consuming either the calibration visual information or the target visual information or both. Recording of neural signals, bio-electrical signals, facial expressions or any biometrical measurements may be done by the device disclosed in this invention or by any external apparatus that is connected to the device of this invention via a network. Recording of this information may be done at the time of the recording of the calibrating or the target session and analyzed by the device in real time. When this information is recorded during the calibrating session, this information may be used for training the calibrating machine learning model or may be used for enhancing the training machine learning model. When this information is recorded during the target session, it may be used for enhancing the training machine learning model.

In a further aspect of the invention, the training data set includes a neural signals, bio-electric signals, captures of facial expressions or any biometrical measurements of the training user in response to consuming the training visual information. Recording of neural signals, bio-electric signals, facial expressions or any biometrical measurements may be done by the device of disclosed in this invention or by any external apparatus that is connected to the device of this invention via a network. This information is recorded at the time of the training session and is used to enhance the training machine learning model.

In another aspect of the invention, the display includes one of a smartphone display, a computer display, a tablet display, a television display, a projector display, a paper, a whiteboard, a blackboard, and a display configured for displaying one of a calibrated visual information and a target visual information. The technology of this invention is not limited by any specific design of a display. The goal of the display is to display information to a user and the coordinates of the display in relation to visual information displayed thereon may be determined by any means. For example, the display may be part of a computerized system, such as a computer, a smartphone or a tablet, such that the computerized system may determine at what display coordinate is a particular visual information displayed. For example, the display may be part of a non-computerized system, such as a paper, a book, whiteboard, a blackboard or the like. When the display is a non-computerized system, the display coordinates and the displayed visual information may be determined by a means, such as a camera facing the display that is connected to a computerized system of image capture and recognition.

In one aspect of the invention, the one of the training cognitive, training emotional, target cognitive and target emotional levels include data related to one of attention, cognitive concentration, cognitive load, cognitive fatigue, stress level, emotional state, emotional strain, reaction time, fatigue, mental effort and engagement.

In a further aspect of the invention, the target session data may be augmented with any one measurement related to one of durations of fixations, measurements related to amplitudes of saccades, ratios of the measurements related to durations of fixations and measurements related to the amplitudes of saccades, estimates of long and extra-long fixations of the durations of fixations, measurements related to electroencephalography asymmetry, measurements related to spectral characteristics of the electroencephalography alpha rhythm, measurements related to lower alpha range suppression level, data related to electroencephalography, fatigue index, data related to Alpha electroencephalography index, data related to intrusive saccades, data related to orthodromic saccades, data related to and regressive saccades, measurements related to blinking activity, measurements related to changes in skin characteristics, for example, electrical conductivity, data related to Baevsky index, data related to Kaplan index, data related to optically obtained plethysmograms, measurements related to micro-mimic of a face data, measurements related to saccade latency, measurements related to respiratory activity, measurements related to electroencephalography alpha rhythm desynchronization, and data related to electroencephalography ratio index.

In another aspect of the invention, the method further includes recording from the user during one of the calibration session and the target session one of measurements related to durations of fixations, measurements related to amplitudes of saccades, ratios of the measurements related to durations of fixations and measurements related to the amplitudes of saccades, estimates of long and extra-long fixations of the durations of fixations, measurements related to EEG asymmetry, measurements related to spectral characteristics of the EEG alpha rhythm, measurements related to lower alpha range suppression level, data related to EEG Fatigue index, data related to alpha EEG index, data related to intrusive saccades, data related to orthodromic saccades, data related to and regressive saccades, measurements related to blinking activity, measurements related to changes in skin characteristics, data related to Baevsky index, data related to Kaplan index, data related to optically obtained plethysmogram, measurements related to facial expressions data, measurements related to saccade latency, measurements related to respiratory activity, measurements related to EEG alpha rhythm desynchronization, and data related to EEG ratio index.

In one aspect of the invention, the method further includes recording data by electroencephalography applications, devices, hardware or the like.

In a further aspect of the invention, training the calibration machine learning model includes one of applying independent component analysis, training a computer neural network, applying a stacked autoencoder model and any suitable regression techniques including applying a distributed regression trees model.

In another aspect of the invention, the training machine learning model or calibration machine learning model may use one or several of the following algorithms, including a regression algorithms, regularization algorithms, decision tree algorithms, bayesian algorithms, clustering algorithms, association rule learning algorithms, artificial neural network algorithms, deep learning algorithms, dimensionality reduction algorithms, ensemble algorithms, and computer vision algorithms. Any of these algorithms may be used as a stand-alone to solve a particular task within either the training machine learning model or calibration machine learning model, or in combination with any other suitable algorithm for processing a desired kind of data.

In another aspect of the invention, the training machine learning model or calibration machine learning model may include a convolutional neural network, a fully-connected neural network or both, provided that those neural networks are arranged in a suitable network architecture.

In one aspect of the invention, raw data from an analogue or a digital signal generated by a measurement device, such as an eye tracking device, an electroencephalography device or any other bioelectric signal measurement device within the system, is transformed into a frame-level feature representation, by applying any suitable algorithm, including a Fast Fourier transform, for electroencephalography signal data, or any other raw data signal transformation algorithm used for preparing raw data for inputting into a neural network as the neural network input data.

Following the raw data transformation into, for example, a convolutional neural network input data, the raw data is transformed into a form of frame-level feature representations, which may be digitally stored in a computer as a tensor, having a time axis and a frequency axis. When such convolutional neural network input data is fed into the convolutional neural network, the result of the processing by the convolutional neural network is stored in the computer as activations or as the outputs (in form of tensors) of the convolutional neural network, which are then used to create a segment-level representation of these outputs, by applying a suitable pooling method, for example, statistical pooling, average pooling or the like. The segment-level representation is derived from a given number of frame representations of the outputs per a given time interval. For the purposes of this technology, the time interval for a frame representation may be between 0.05 seconds to 5 seconds and the time interval for a segment-level representation may be over than 1 second and may last for the duration of the recording session. The segment-level representations may be used as input data for other neural networks used within the architecture of the training machine learning model or calibration machine learning model.

In one aspect of the invention, the segment-level representation may be used as the input data for a fully-connected neural network, which may be a part of the architecture of the training machine learning model. Once the segment-level representations are fed into the fully-connected neural network and processed thereby, the fully-connected neural network may provide as its output a sequence or a set of real numerical values. The set of the real numerical values is related to the time interval of the segment-level representation and represents an estimate of a cognitive level or an emotional level for that time interval. Each of the real numerical values within the set may be used independently from one another in the estimation of the cognitive level or the emotional level, for example, a number 0,1 may represent a value related to fatigue of the user, a number 0,2 may represent a value for attention of the user, etc. Such real values may provide a basis for further analysis by the system and this set may be stored in the system as the result of the application of this technology.

In one aspect of the invention, the real numerical real values may range from 0 to 1. However, other suitable neural network architectures of the training machine learning model or the calibration machine learning model may result in other suitable output of the training machine learning model, which may include any real numbers.

In aspect of the invention, the convolutional neural network, the fully-connected neural network, or both may provide segment-level representations that may be associated with corresponding representations of the gaze tracks. The segment-level representations generated by the convolutional neural network, the fully-connected neural network or both and the corresponding representations of the gaze tracks are fed as an input data of a recurrent neural network or RNN, that transforms such input data into frame-level estimates, that may be associated with cognitive levels or emotional levels estimates for a given time interval.

In one aspect of the invention, training of the training machine learning model or the calibrating machine learning model includes training neural networks embedded within either the training machine learning model or the calibrating machine learning model. For example, training may include training the convolutional neural network, the fully-connected neural network, the recurrent neural network, or any other neural network within the architecture of the training machine learning model or the calibrating machine learning model, or any combination of the neural networks when the architecture of the training machine learning model or the calibrating machine learning mode provides for a simultaneous or an alternating training of connected neural networks.

In one aspect of the invention, a neural network has a set of parameters that are specific to that neural network. Each parameter of a neural network has to be derived by iteratively applying a set of that neural network's specific functions to the input data of that neural network and to the neural network parameters of the most recent iteration (during first iteration the functions are applied to the input data and to network's initial parameters). The neural network specific functions that may be applied to the input data include optimizing a loss function, such as a mean squared error or cross-entropy function. The optimization algorithm applied to the loss function may be a stochastic gradient descent or Adam optimizer functions. The process may be described as follows: input data is prepared for a neural network and fed into the network, the network applies weights to the input data, a loss function is calculated, the loss function is optimized (minimized) by changing the weights, then the process repeats until the neural network is sufficiently trained.

The network specific functions may be applied iteratively over the entire set of the input data or a substantial portion of the set of the input data. The parameters of a neural network may include weight matrices of that neural network. The neural networks that may require training include the convolutional neural network, the fully-connected neural network, recurrent neural network or any other neural network within the architecture of the training machine learning model or the calibrating machine learning model.

In one aspect of the invention, the training machine learning model may include a recurrent neural network within its architecture. The input data for the recurrent neural network may include tensors of representations that are generated from gaze tracks measurement data and from segment-level representations that are derived from processing an EEG or other suitable bioresponse data by a combination of a convolutional neural network and pooling algorithms applied to a number of frame representations generated by the convolutional neural network for a given time segment. As such, the recurrent neural network input data tensors have a time component and a corresponding session data component. The session data component of the recurrent neural network input data tensors that are generated from gaze tracks measurement data contain information about gaze point coordinates, specific information about duration of fixations, saccades and regressions, specific information about user's head position, facial biometrics features, and session environment representations, including lighting information, eye tracking technical information, display technical information, etc. The concatenation of the abovementioned gaze tracks representation and the segment-level representations are fed as input data into the recurrent neural network that has a bi-directional long short-term memory network (biLSTM) architecture. The outputs of the recurrent neural network may represent frame-level activations or representations matched to corresponding time intervals. These outputs may be used for producing frame-level estimations of cognitive and emotional level at the corresponding time intervals.

In one aspect of the invention, algorithms used for training of the training machine learning model and calibration machine learning model operate independently. Each of the training machine learning model and calibration machine learning model may include an ensemble of neural networks, such that various neural network architectures may be applied.

In one aspect of the invention, one of the training data set, the calibration data set and the target data set include gaze direction, pupil activity data and/or facial expressions data.

In one aspect of the invention, one of the training data set, the calibration data set, the target data set, the training cognitive and emotional levels include data recorded at a time interval having a range between 50 milliseconds and 5000 milliseconds, with corresponding estimations of target cognitive and emotional levels for the time interval having a range between 50 milliseconds and 5000 milliseconds.

In another aspect of the invention, estimating one of a target cognitive and target emotional levels of consumption of the target visual information of the user at several target gaze tracks by applying the training machine learning model to the calibrated target data set further includes estimating a value for each one of attention, cognitive concentration, cognitive load, cognitive fatigue, stress level, emotional state, emotional strain, reaction time, fatigue, mental effort and engagement.

In one aspect of the invention, the recording of the target data set includes recording user actions. The user actions may be related to the user consuming the target visual information or the calibrating visual information. The actions may be moving pages, scrolling pages, touching the display, moving the information of the display, reacting vocally or physically to the information on the display.

In the context of the present specification, unless specifically provided otherwise, a "server" is a computer program that is running on appropriate hardware and is capable of receiving requests (e.g. from devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task has been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, unless specifically provided otherwise, a "module" is a computer program that is running on appropriate hardware and is capable of carrying some computational tasks or causing those tasks to be carried out. The term "module" is meant to have a broader technological meaning than "server" and is not tied to any hardware whatsoever. The term "module" may mean one or more modules and is not limited to any combination of modules or hardware used therewith.

In the context of the present specification, unless specifically provided otherwise, a "device" is any computer hardware that is capable of running software appropriate to the relevant task at hand. Thus, some (non-limiting) examples of devices include personal computers (desktops, laptops, netbooks, etc.), smartphones, and tablets, as well as network equipment such as routers, switches, and gateways. It should be noted that a device acting as a user device in the present context is not precluded from acting as a server or a module to other devices. The use of the expression "a device" does not preclude multiple devices being used in receiving/sending, carrying out or causing to be carried out any task or request, or the consequences of any task or request, or steps of any method described herein.

In the context of the present specification, unless specifically provided otherwise, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless specifically provided otherwise, the expression "information" includes information of any nature or kind whatsoever capable of being stored in a database. Thus, information includes, but is not limited to audiovisual works (images, movies, sound records, presentations etc.), data (location data, numerical data, etc.), text (opinions, comments, questions, messages, etc.), documents, spreadsheets, etc.

In the context of the present specification, unless specifically provided otherwise, the expression "component" is meant to include software (appropriate to a particular hardware context) that is both necessary and sufficient to achieve the specific function(s) being referenced.

In the context of the present specification, unless specifically provided otherwise, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

Implementations of the present technology each have at least one of the abovementioned object and/or aspects, but do not necessarily have all of them. It should be understood that some aspects of the present technology that have resulted from attempting to attain the abovementioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
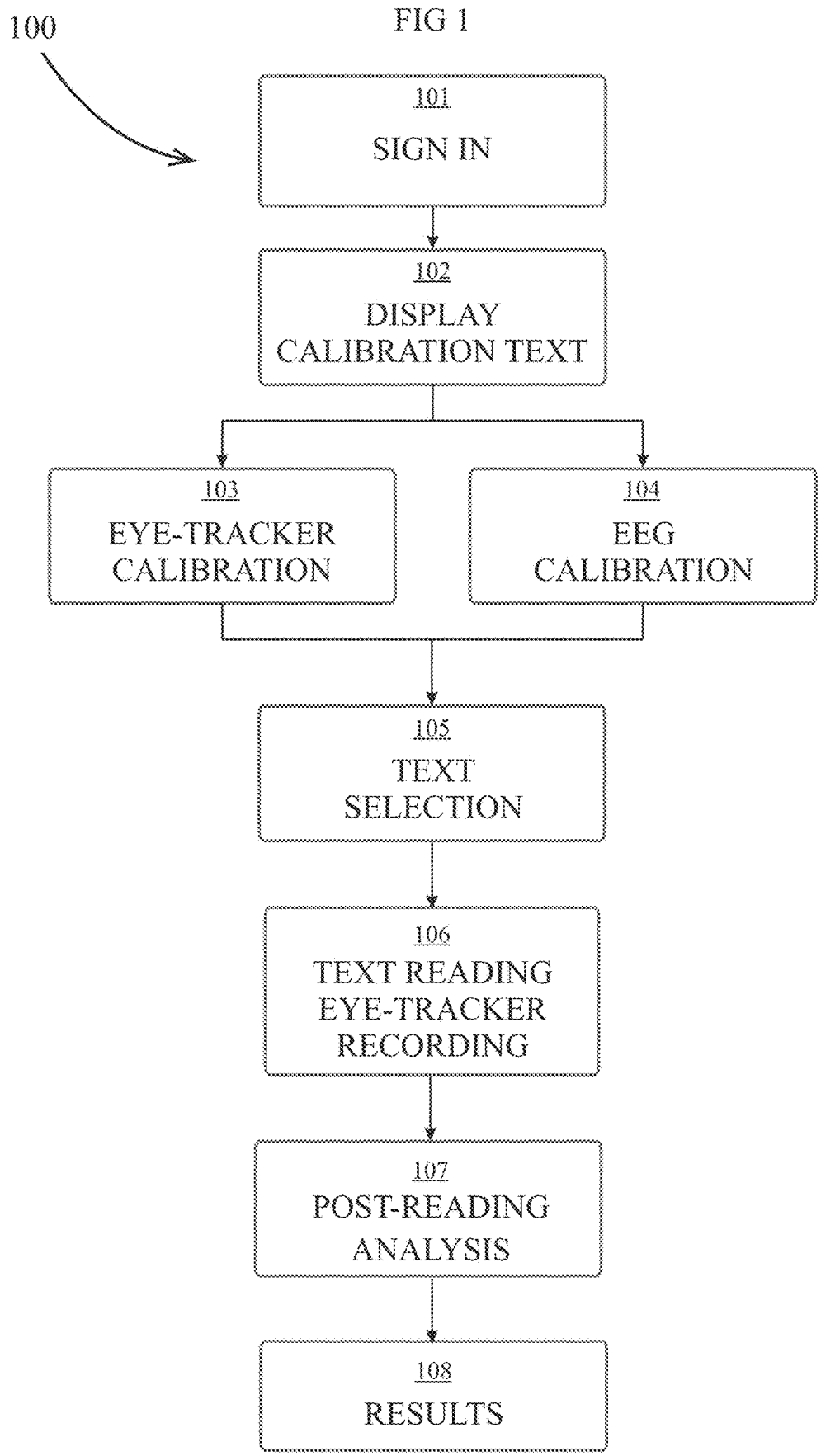
FIG. 1 is a block diagram of a method implemented in accordance with an embodiment of the present technology.

Reference will now be made in detail to some specific examples of the embodiments of the invention including some modes of carrying out the invention that are contemplated by the inventors to be suitable for understanding the technology. Examples of the specific embodiments are illustrated in the accompanying drawings. While the technology is described in conjunction with these specific embodiments, it will be understood that it is not intended to limit the invention to the described embodiments. On the contrary, it is intended to cover alternatives, modifications, and equivalents as may be included within the scope of the invention as defined by the appended claims.

For example, the techniques and mechanisms of the present technology may be described in the context of EEG. However, it should be noted that the techniques and mechanisms of the present technology apply to a variety of modality combinations, and not just EEG. In the following description, specific details are set forth in order to provide a thorough understanding of the present technology. Particular example embodiments of the present technology may be implemented without some or all of these specific details. In other instances, well known process operations have not been described in detail in order not to unnecessarily obscure the present technology.

For example, a biological response or a bioresponse data may be generated by monitoring a person's biological reactions to visual, audio, or other sensory stimuli. A bioresponse measurement may include rapid simultaneous eye movements (saccades), eyes focusing on a particular visual element (e.g., word or graphic) for a time period (a fixation), multiple eye fixations to a particular visual element within a time period (repeating fixations), returning to previously read to visual elements or words (regressions), heart rate (HR), galvanic skin response (GSR), pupil dilation, cortisol level, blood sugar level, rate of breathing, muscle tension (EMG), electroencephalography (EEG), or any other measurable biological reaction. For the present technology any measurements of any of bioresponses may be included in user input data for processing by the present technology. The user input data used for processing by the present technology may be associated with detailed information on what prompted a response. For example, an eye tracking system may indicate a coordinate location of a particular element within a visual information presented to a user for user consumption as a stimuli. The particular element may be a particular word in a phrase or figure in an image and such an element may be associated with a certain bioresponse data. This association may enable a system to identify specific words, images, and other elements that elicited a measurable biological response from a user consuming the visual information. For example, a person reading a text may quickly read over some words while pausing at others, allowing to determine quick eye movements, or saccades, that may be associated with the words the person is reading. When the eyes simultaneously pause and focus on a certain word for a longer duration than other words, this response may then be associated with the particular word the person is reading.

For example, bioresponse data may be collected from a variety of devices and sensors. These include desktop, laptop, and tablet computers frequently include microphones and high-resolution cameras capable of monitoring a person's facial expressions, eye motion patterns, or verbal responses while consuming visual information stimuli. Smartphones or tablets, for example, may include high-resolution cameras, proximity sensors, accelerometers, and touch-sensitive screens, in addition to microphones and buttons, and additional sensors. Wearable augmented reality glasses may contain sensors for tracking a user's eye positions with respect to the user's field of view.

Bioresponse data may be measured by the following techniques: Electroencephalography (EEG), Functional Magnetic Resonance Imaging (fMRI), Electrooculography (EOG), Galvanic Skin Response (GSR), Electrocardiograms (EKG), Electrooculography (EOG), pupillary dilation, facial expression encoding, reaction time, eye tracking, etc., may be collected, filtered, analysed, or combined to evaluate the effectiveness of a response of a user to a stimulus information presented to that user, such as visual, auditive or other sensory materials that may be consumed by the user's senses. The data collection may be performed by a variety of devices including EEG, fMRI, EOG, GSR, EKG, eye tracking device, pulsometer, accelerometer, spirometer, etc. These devices may collect response data from users exposed to stimuli visual information. The response data may be filtered to remove cross-device interference, non-representative peak values, measurement errors, etc.

Various techniques and mechanisms of the present technology will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors, cloud computing, distributed ledger technology, multiple-core processors, video cards or graphic accelerators, quantum computers or a combination thereof, while remaining within the scope of the present invention unless otherwise noted. Furthermore, the techniques and mechanisms of the present technology will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Figure 2:
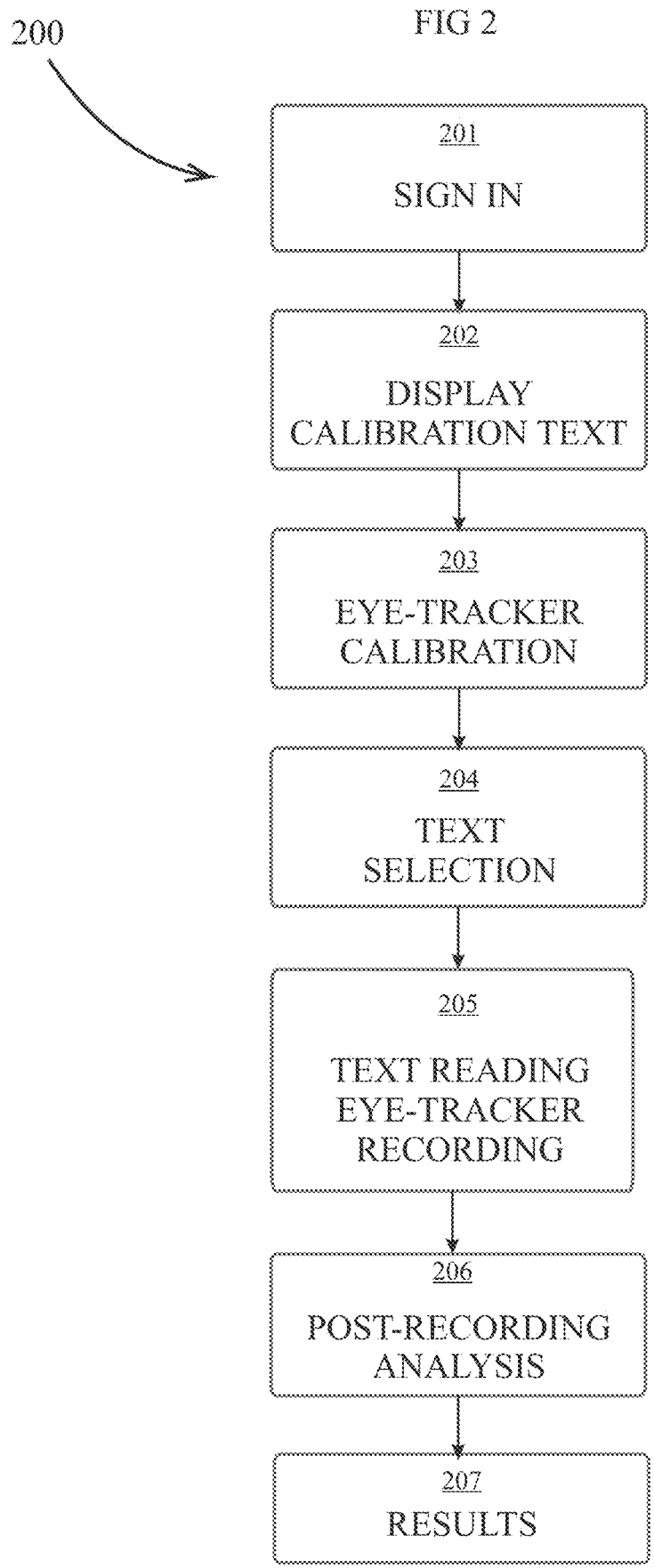
FIG. 2, there is depicted a block diagram of an alternative method implemented in accordance with an embodiment of the present technology.

Referring to FIGS. 1 and 2, there is shown a method 100 and a method 200 outlining an example of a digital service that may be presented to a user, the methods 100 and 200 are implementing the present technology. The methods 100 and 200 are non-limiting embodiments of the present technology. It is to be expressly understood that the methods 100 and 200 are depicted merely as illustrative examples of steps pertaining to a service that may be presented to a user in order to use an implementation of the present technology. There are other embodiments of using this technology that may be implemented using various hardware and software setups.

Figure 3:
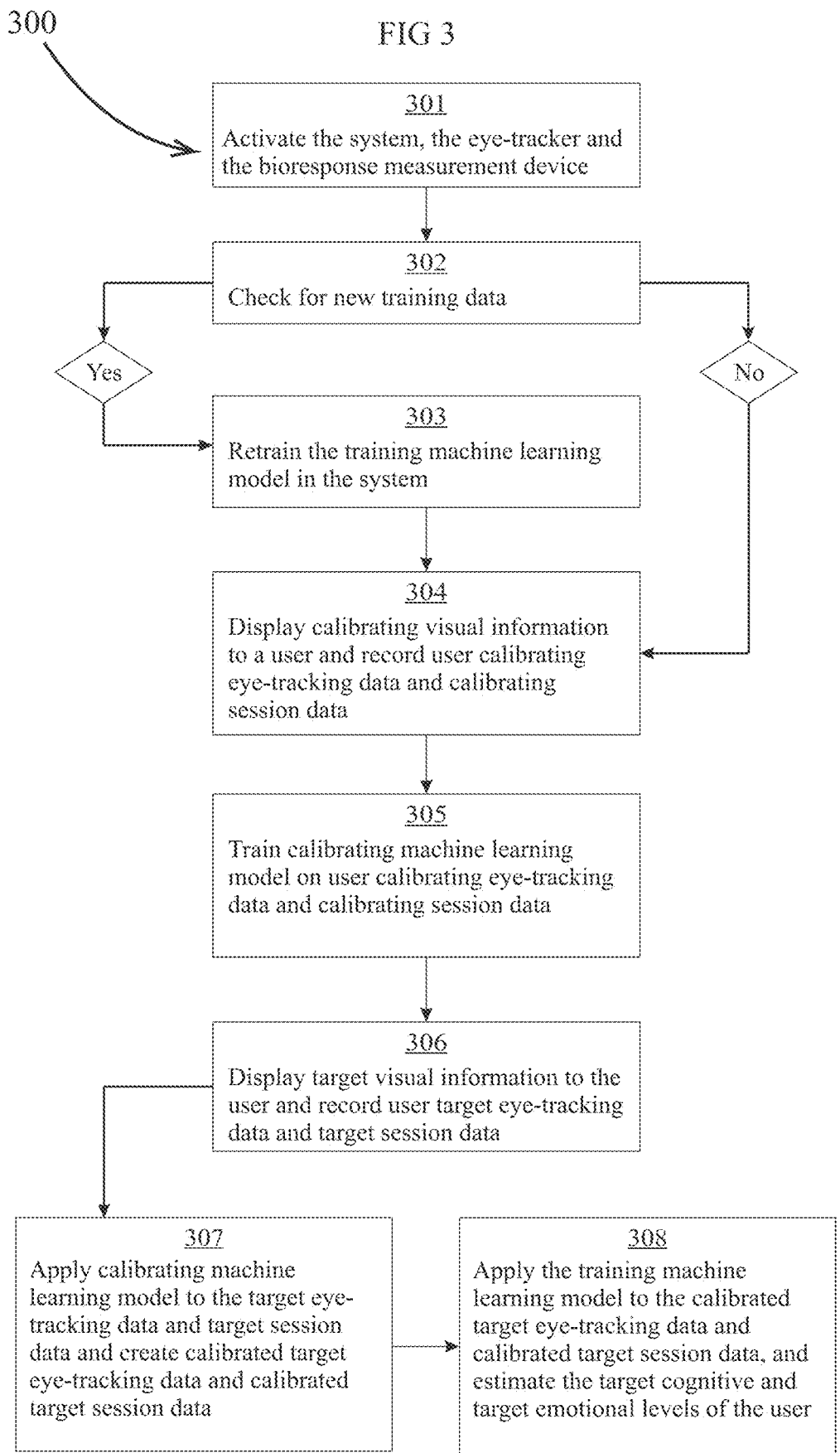
FIG. 3, there is depicted a block diagram of an alternative method implemented in accordance with an embodiment of the present technology.

Referring to FIG. 3, there is shown a method 300 outlining an example of implementing the present technology as seen from the point of view of the system 700. The method 300 is suitable for implementing non-limiting embodiments of the present technology. It is to be expressly understood that the method 300 is depicted merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the method 300 may also be set forth below.

Figure 4:
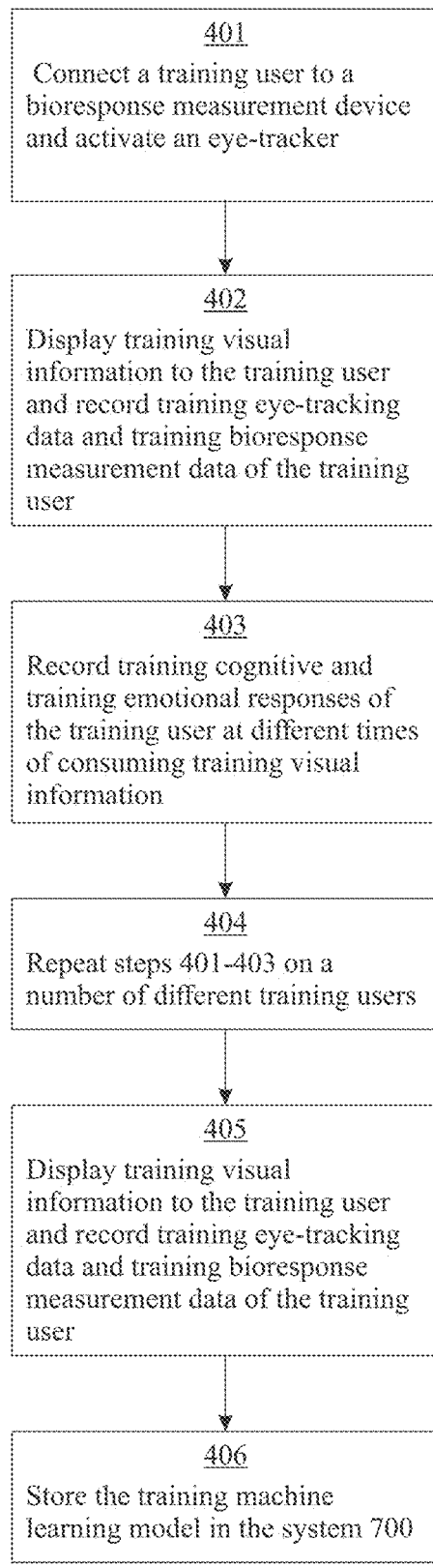
FIG. 4, there is depicted a block diagram of a method of training a training machine learning model implemented in accordance with an embodiment of the present technology.

The FIG. 4 shows an embodiment of a method 400 used to train a training machine learning model to be used by the system in the method 300. This is done merely as an aid to understanding, and, again, not to define the scope or set forth the bounds of the present technology. Thus, the description thereof that follows is intended to be only a description of illustrative examples of the present technology. This description is not intended to define the scope or set forth the bounds of the present technology. In some cases, what are believed to be helpful examples of modifications to the method 400 may also be set forth below.

Figure 5:
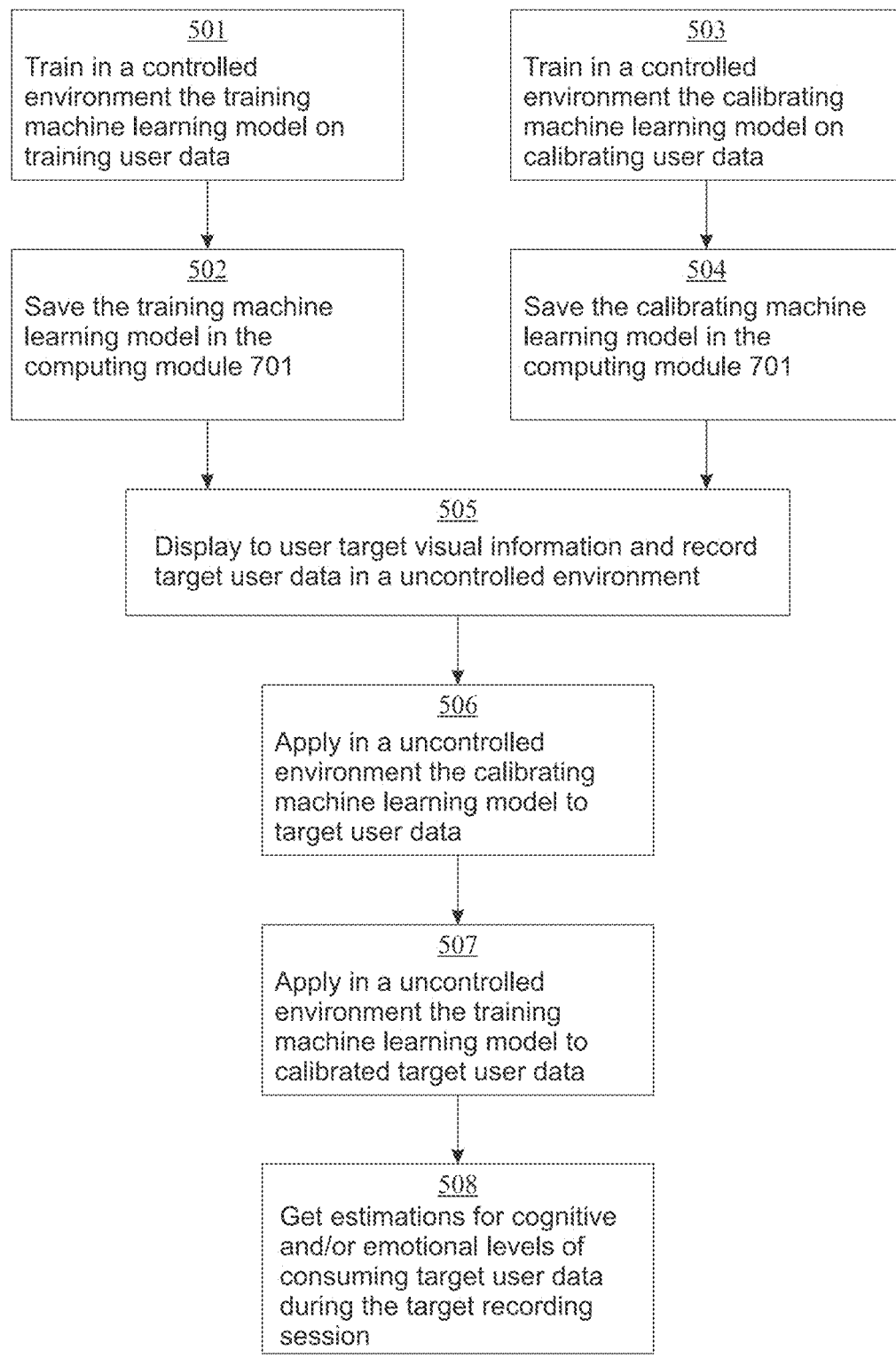
FIG. 5, there is depicted a block diagram of an alternative method implemented in accordance with an embodiment of the present technology.

The FIG. 5 shows an embodiment of a system 700 that may be used to execute any of the embodiments of the methods 100, 200, 300 and 400 thereon, or portions of any of these methods. This is done merely as an aid to understanding, and, again, not to define the scope or set forth the bounds of the present technology. Thus, the description thereof that follows is intended to be only a description of illustrative examples of the present technology. This description is not intended to define the scope or set forth the bounds of the present technology. In some cases, what are believed to be helpful examples of modifications to the method 400 may also be set forth below.

The FIGS. 6-11 show embodiments of various parts of the system 700 and/or provide more detailed descriptions thereof. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition it is to be understood that the system 700 may provide in certain instances simple implementations of the present technology, and that where such is the case they have been presented in this manner as an aid to understanding. As persons skilled in the art would understand, various implementations of the present technology may be of a greater complexity.

Figure 8:
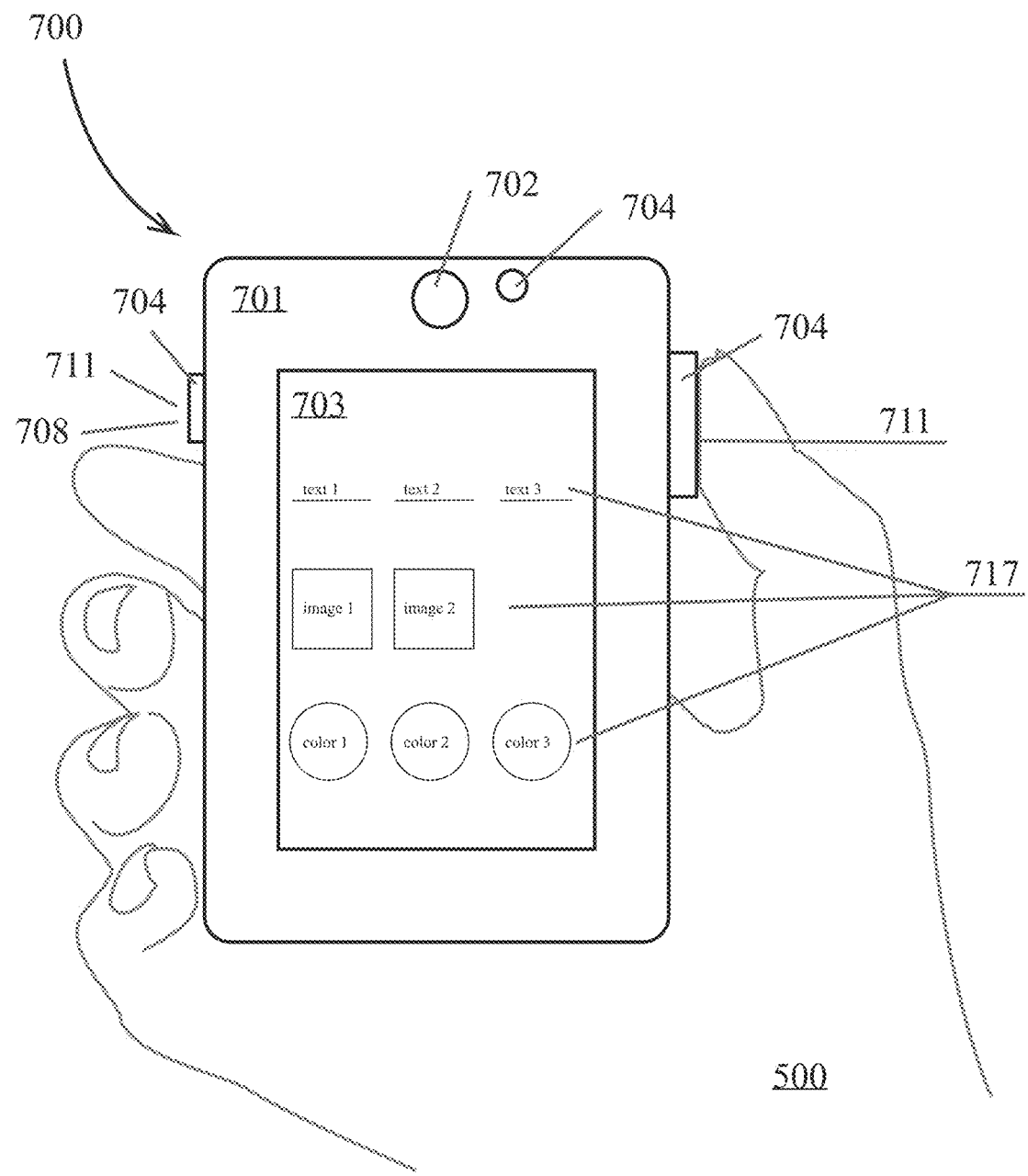
FIG. 8 is a schematic diagram of a computing device suitable for configuring an exemplary implementation of the present technology.
Figure 29:
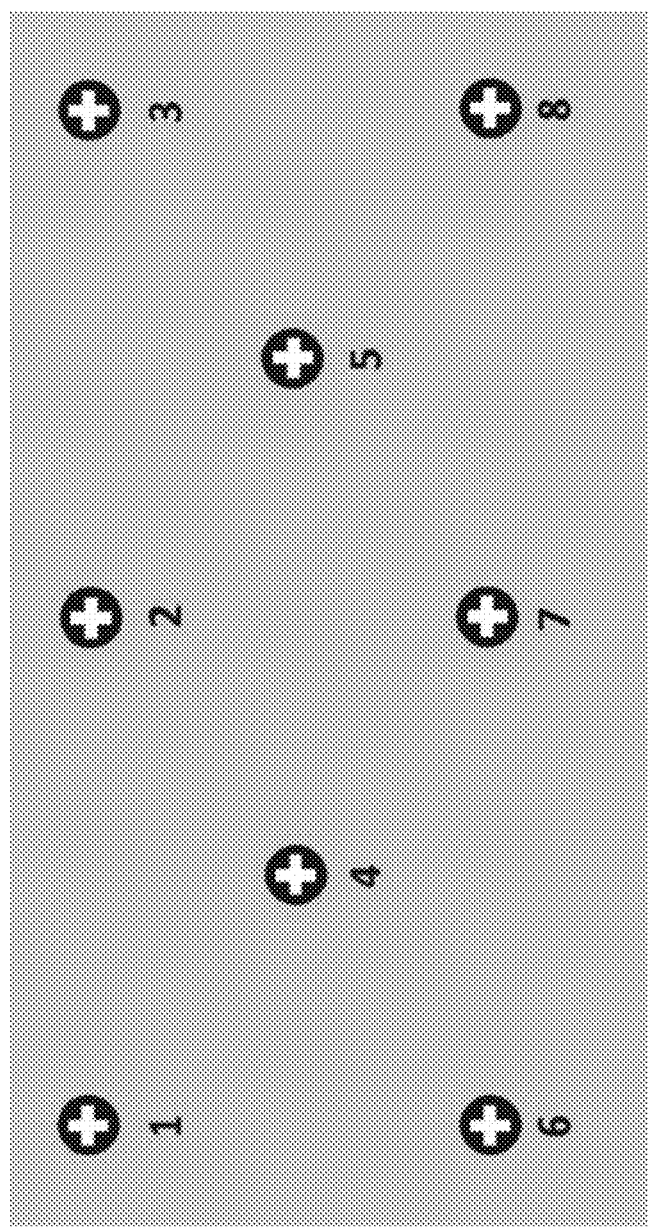
FIG. 29 is an exemplary embodiment depicting a representation of the calibrating visual information.

For the purposes of this application, the term "visual information" may mean any visual information, which may be "calibrating visual information", a "target visual information", a "training visual information" or any other kind of visual information. The FIGS. 6, 8, 9, 11 and 29 identify different types of visual information, which is referred to under the numeral 717. The present application uses the numeral 717 to identify any visual information that may be displayed to a user. For example, the term "calibrating visual information" means that the visual information 717 that is being presented to a user during the calibrating session (an example of which is shown in FIG. 29), i.e. the term "calibrating visual information" refers to the time interval when the visual information 717 is presented, and is not intended to be limiting to a kind of visual information 717 that is being is presented. The term "target visual information" means that the visual information 717 is being presented to a user during the target session, i.e. the term "target visual information" refers to the time interval when the visual information 717 is presented, and is not intended to be limiting to a kind of visual information 717 that is being is presented. The term "training visual information" means that the visual information 717 is being presented to a training user during the training session, i.e. the term "training visual information" refers to the time interval when the visual information 717 is presented, and is not intended to be limiting to a kind of visual information 717 that is being is presented. The visual information 717 may consist of text characters, images or colours (FIG. 8). Hereinbelow, for simplicity, the reference number 717 may be used for any of the terms that refer to a visual information, including a "visual information", a "calibrating visual information", a "target visual information", or a "training visual information".

For the purposes of this application, the term "training user" means a person to whom the training visual information 717 is displayed for the purposes of training the training machine learning module. The term "user" means a user other than the "training user", and the user is a person to whom a calibrating visual information 717 or a target visual information 717 is displayed. The term "training user" may also refer to a group of training users whose data has been provided for the training of the training machine learning model, and such a group of training users may include data related to the user, without any limitation to the meanings of the terms "training user" and "user".

The present technology aims at estimating the user's cognitive or emotional response to consuming the target information. It is understood that the user's cognitive or emotional response to consuming the target visual information 717 is unknown prior to executing any of the methods 100, 200 or 300.

The methods 100, 200, 300 and 400 may be executed on a computer, a server, a smartphone, a tablet, a combination of electronic devices, or any suitable electronic system 700 having at least some of the components and/or modules described herein.

Figure 10:
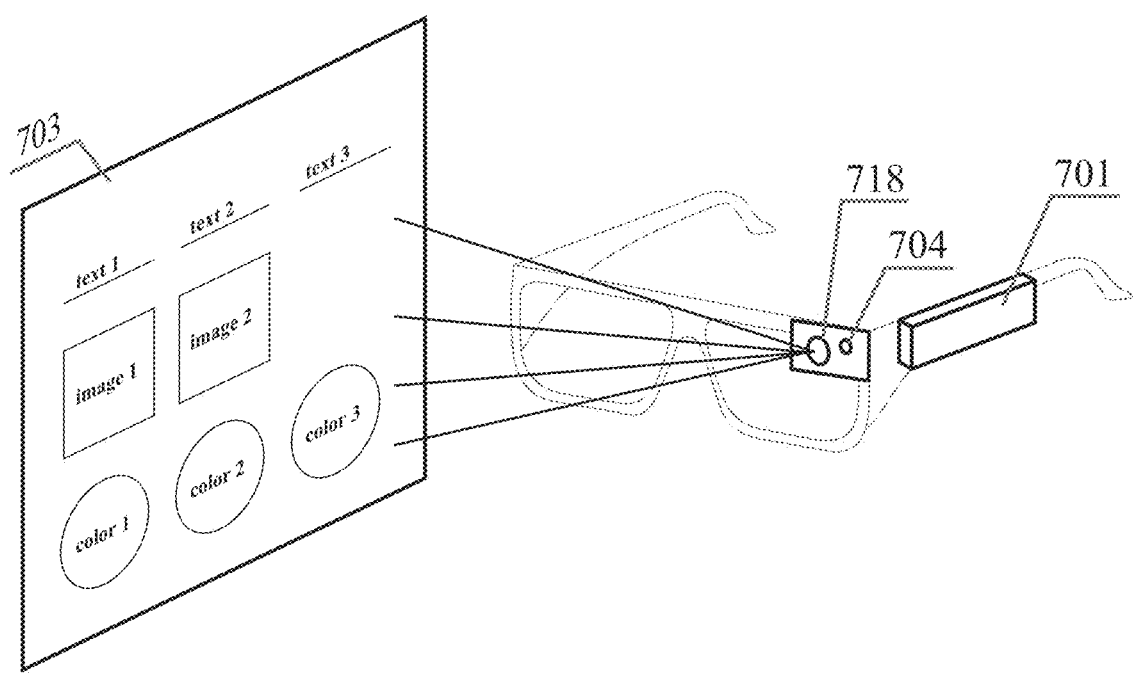
FIG. 10 is a schematic diagram of an electronic system for eye tracking suitable for configuring an exemplary implementation of the present technology.

According to various embodiments of the system 700, it is recognized that various modules may be used within the system 700. Examples of some modules are shown in FIGS. 5 and 10 and this is done merely as an aid to understanding, and, again, not to define the scope or set forth the bounds of the present technology. For example, the bioresponse measurement module 704 or the training bioresponse measurement module 710 may include any of the devices such as the EEG, fMRI, EOG, GSR, EKG, pulsometer, accelerometer, spirometer, etc. Some measurements of any of these devices may be taken simultaneously during a single session when the user is consuming visual information, and others may be taken during different sessions when the user is consuming the same visual information. It is understood that exposing a user in sequence to consume the visual information and measuring responses using various devices does not easily account for habituation and wear-out. Responses may be different after a first recording session and future recording sessions. As such, it is understood that a person skilled in the art will apply techniques to normalize at least some measurements across devices for performing the present technology. It is also understood that performing multiple measurements by multiple devices simultaneously may require implementing additional levels of analysis for controlling accuracy of measurements. For example, one measurement device may interfere with the measurements from another device. For example, EEG wires and electrodes may interfere with eye-tracker measurements. If other bioresponse measurement modules are used, the EEG wires and electrodes may interfere with those devices. For the purposes of the present technology, the data collected from the users may be measured by different bioresponse measurement devices simultaneously with eye-trackers. Furthermore, the present technology contemplates that the system 700 may have filtering mechanisms implemented therein to address cross-device interference, such as interference from EEG wires that disrupt measurements of other bioresponse measurement devices of the eye-tracker, or for example, such as interference of fMRI magnetic fields generating currents that alter EEG measurements and the eye-tracker measurements, or for example, such as interference caused by any of the EOG, GSR, EKG, pulsometer, accelerometer, spirometer on the measurements of the eye-tracker, etc.

Any of the modules within the system 700 may use any hardware (not shown) to operate, and such hardware may include a processor, a memory, a video card, an input/output unit (for wired or wireless technology data transfer), a wireless data transmittal hardware based on any suitable technology, for example, Bluetooth or Wi-Fi, a battery, a power source, or any other hardware parts that are required to operate a system 700 and execute computer programs (not shown) designed for executing at least some steps of any of the methods 100, 200, 300 or 400.

In the present application, the term "calibrating" is generally referred to different aspects that are related to calibrating data that may be used for or by the calibrating machine learning model. However, the term "calibrating" may also be used in reference to actions that may be related to calibrating the hardware, such as the eye-tracker 703, the display 703, the bioresponse measurement module 704, or any other hardware within the system 700.

FIG. 5 shows an embodiment of the system 700. The embodiment shows that the system 700 may have a computing module 701 that is connected to an eye-tracker 702, a display 703 and a bioresponse measurement module 704. The eye-tracker 702 may be an image or a video recording device, such as a camera. The display 703 may be a digital display, a whiteboard, blackboard, a paper or an item configured to display thereon any kind of visual information 717.

The biomeasurement module 704 may be any device capable of gathering bioresponse data from a user using any bioresponse measurement techniques, for example: Electroencephalography (EEG), Functional Magnetic Resonance Imaging (fMRI), Electrooculography (EOG), Galvanic Skin Response (GSR), Electrocardiogram (EKG), Electrooculography (EOG), pupillary dilation, reaction time, heart rate, blood pressure measurement, etc.

The computing module 701 may be connected to a training server 706 via a network 705. The training server 706 may store data related to training users. The server 706 may be connected to a training computing module 707, which may be connected to a training eye-tracker 708, a training display 709 and a training bioresponse measurement module 710. The training eye-tracker 708 may be an image or a video recording device, such as a camera, which may be substantially the same as or substantially different from the eye-tracker 702. The training display 709 may be any display configured to display thereon any kind of training visual information 717 and the training display 709 may be substantially the same as or substantially different from the display 703.

Figure 7:
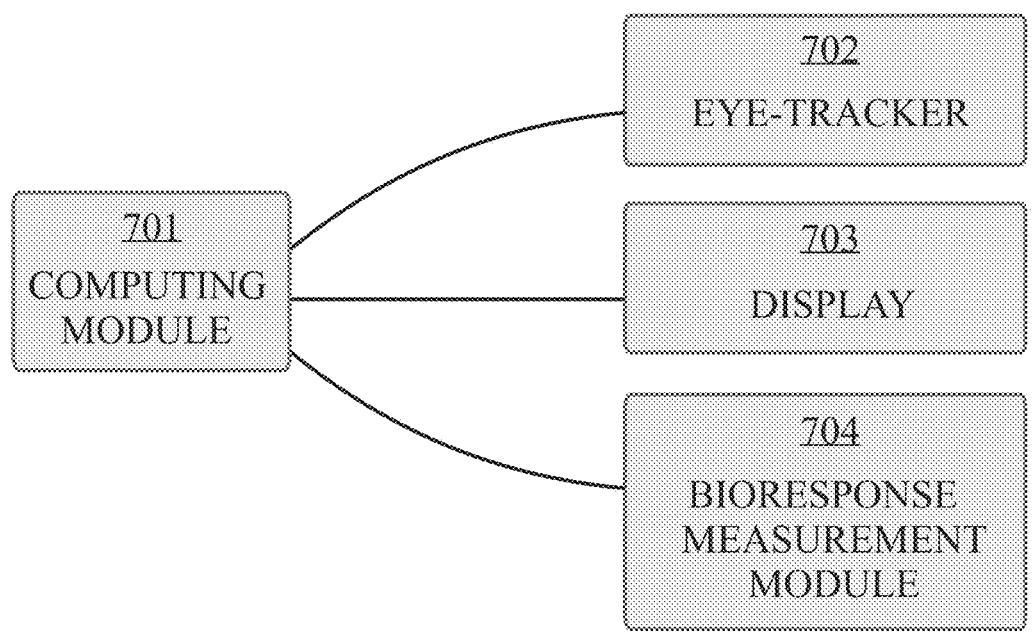
FIG. 7 is a schematic diagram of a computing environment suitable for configuring an exemplary implementation of the present technology.

As shown in FIG. 7, it is possible to combine the portion related to training users 700a of the system 700 and the portion related to uses 700b into a single embodiment, such that the computing modules 701 and 707 are one computing module, the eye-trackers 702 and 708 are one eye-tracker, the displays 703 and 709 are one display, the bioresponse measurement modules 704 and 710 are one bioresponse measurement module.

Figure 9:
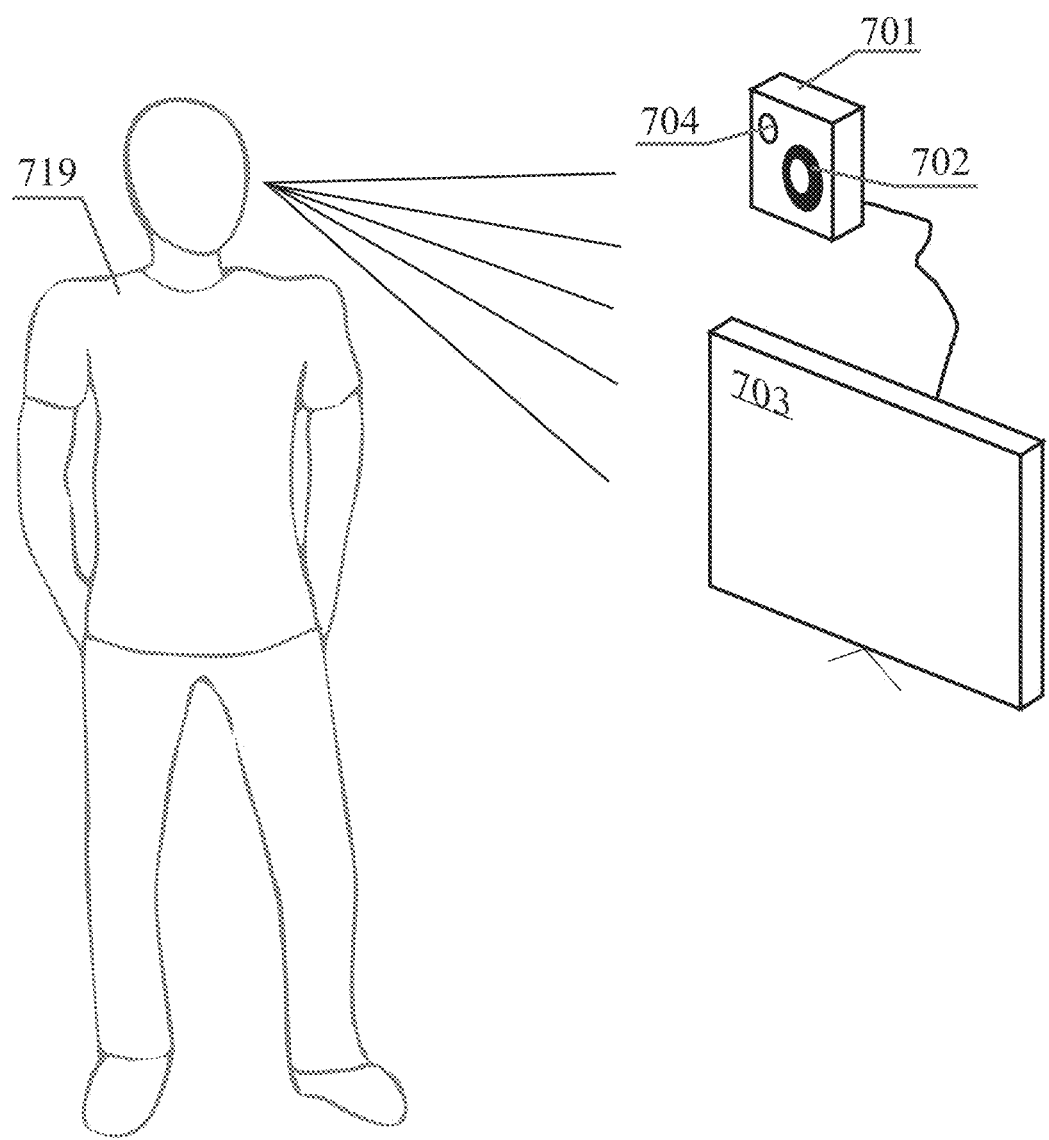
FIG. 9 is a schematic diagram of a user interacting with the electronic system suitable for configuring an exemplary implementation of the present technology.

As shown in FIG. 9, the computing module 701 may include a sensory module 712, a data gathering module 713, a data processing module 714, a data transfer module 715 and a data storage module 716. It is understood that modules having an equivalent functionality may be present in the training computing module 707 and are not described here. The computing module 701, the sensory module 712, the data gathering module 713, the data processing module 714, the data transfer module 715, and the data storage module 716 are interconnected and form a multifunctional computing system capable of executing at least some embodiments of any of the methods 100, 200, 300 or 400.

In an embodiment shown in FIG. 5, the training machine learning model may be stored and executed on the training computing module 707 and the calibrating machine learning model may be stored and executed on the computing module 701.

Figure 6:
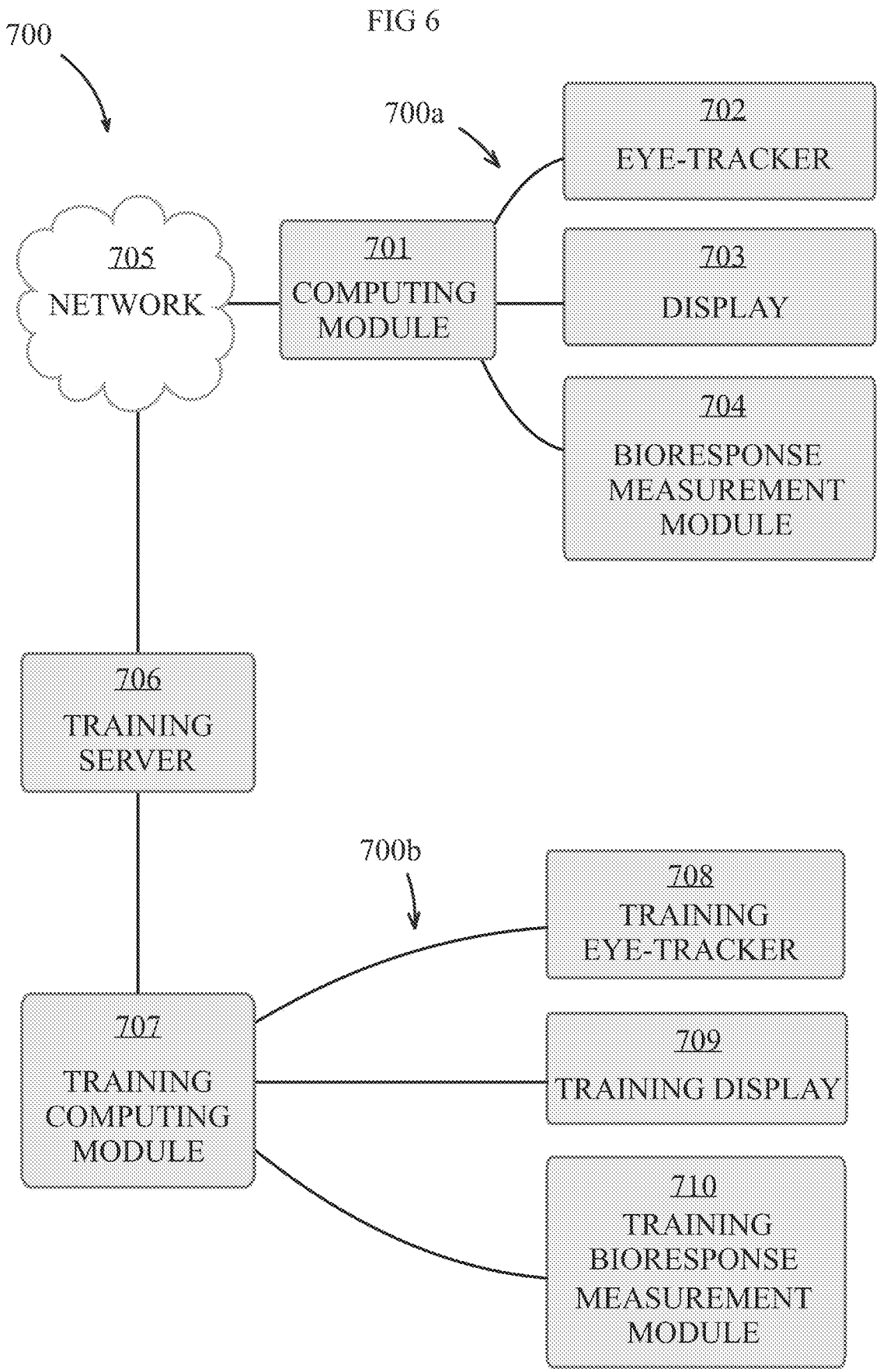
FIG. 6 is a schematic diagram of a networked computing environment suitable for configuring an exemplary implementation of the present technology.

In an embodiment shown in FIG. 6, the training machine learning model and the calibrating machine learning model may be stored and executed on the computing module 701. For the purposes of the further description of the present application, the execution of methods 100, 200, 300 and 400 will provided in reference to the embodiment shown in FIG. 6, however, it should be understood that this is not intended to be limiting the scope of the present technology to the embodiment depicted in FIG. 6.

When the system 700 executes any of the methods 100, 200 or 300 the system 700 activates the computing module 701, which becomes ready to receive and process data from the eye-tracker 702 in response to the user consuming a visual information 717 displayed on the display 703. In an embodiment of the method 100, the system 700 also activates the bioresponse measurement module 704, which becomes ready to receive and process data from the bioresponse measurement device, such as the EEG, for example.

The user consumes the calibrating visual information 717 during the recording of data of the calibrating session. During recording of data during the target session, the user consumes the target visual information 717. In response to the user consuming the calibrating visual information 717, the eye-tracker 702 collects gaze tracks of the user over a time interval of the calibrating session, which may be between 1 and 30 seconds. In response to the user consuming the target visual information 717, the eye-tracker 702 collects gaze tracks of the user over a time interval of the target session, which may be between 1 second and several hours, depending on the type of the target visual information 717 being collected. It is understood that the target session may be recorded continuously or may have pauses/breaks for the convenience of the user.

The data transfer module 715 transmits the gaze tracks into the data gathering module 713 of computing module 701. The gaze tracks consists at least of the display coordinates (not shown) indicating the positions of user's gaze on the display 703 and the elements of the calibrating or target visual information 717 that the user's gaze is directed at, at a particular moment in time (t) during the entire time interval of the calibrating or the target sessions. The gaze tracks are transmitted into the data gathering module 713.

As shown in an embodiment of FIG. 7, the gaze tracks collected during the calibrating session may be transmitted by data transfer module 715 directly from the display 703, when the display 703 is a digital display and it is connected directly to the computing module 701. Consequently, when the display 703 is connected directly to the computing module 701, the computing module 701 may control the operation of the display 703, which includes controlling the type of visual information 717 displayed thereon, the brightness of the display 703, the sharpness of the visual information 717 displayed thereon, etc.

As shown in an embodiment of FIG. 8, when the display 703 is not directly connected to the computing module 701, the visual information 717 displayed on the display 703 may be recorded via an image or a video recording device 718 connected to the computing module 701, as is explained in more detail below.

In an embodiment shown in FIG. 9, the bioresponse measurement module 704, which is depicted as an exemplary EEG device, is connected via a Bluetooth™ wireless connection to the sensory module 712 of the computing module 701. The EEG bioresponse measurement device 704 of FIG. 9 is depicted as having a number of sensors 711 for measuring bioresponses of the user or the training user during the data recording sessions, including the training session, the calibrating session or the target session. The bioresponse data collected is then transmitted into the sensory module 712. It is understood that the depicted in FIG. 9 Bluetooth™ connection between the bioresponse measurement module 704 and the sensory module 712 of the computing module 701 is for illustrative purposes only and the connection may be wired or wireless, such as Wi-Fi, infrared, radio, etc.

In the present application, the sensor 711 or sensors 711 are used to describe any kind of data collection elements of the system 700. For example, the bioresponse measurement module 704 may have sensors 711 for bioresponse measurement data collection as shown in FIG. 9, the computing module 701, which is depicted as a smartphone or a tablet 701 in FIGS. 6 and 9, may also have sensors 711 for measuring ambient environment data recorded during any of the recording sessions, and the system 700 may also have internal sensors (not shown) for measuring data related to select hardware and/or software portions of the system 700 during the recording sessions.

The sensors 711 of the bioresponse measurement module 704 may record bioresponses of the user during the entire recording session, i.e. prior to consuming visual information 717, during consumption of the visual information 717 and after consuming the visual information 717. Session data recorded by the bioresponse measurement module 704 may include measurements of pupillary dilation, user's reaction time, heart rate, blood pressure, electrical signals that form brain waves patterns, skin hydration, changes in blood oxygenation level, direction of blood oxygenation change, polarization potential or corneal-retinal potential, which is the resting potential between the cornea and the retina, electrical (ionic) activity resulting from changes in sweat gland activity, heart's electrical signals, etc.

The sensors 711 and the internal sensors (not shown) of the system 700 are configured to record environment data that is present during a recording session, characteristics of different parts of system 700, or data related to functioning of different parts of the system 700 during a recording session. The environment data, characteristics of different parts of system 700, or data related to functioning of different parts of the system 700 may include data related to coordinate system of the eye-tracker camera; exact eye-tracker camera coordinates of the visual information 717 as measured by the eye-tracker; coordinate system of the display 703; exact position of the visual information 717 on the display 703; eye-tracker 702 device type; display 703 type; display 703 screen size and resolution; technical characteristics of the eye-tracker 702, display 703, computing module 701, or the bioresponse measurement module 704; ambient light level; distance from the display 703 to the user; distance from the eye-tracker 702 to the user; type of visual information 717 displayed, including size and type of letters, numbers, symbols, or images, types of colors, type of font, number of spaces, etc.; relative movements of the display 703, the user and the eye-tracker 702; time of the recording sessions; ambient sounds; geolocation; IP address; time zone of the user; and other data that may be valuable to improving accuracy of eye-tracker 702 measurements, calibration of the system 700 and estimating cognitive and emotional levels of the user.

When the sensors record the data during the calibrating session, the sensor data is stored in the sensory module 712 and then as metadata associated with each point of the calibrating visual information 717 at every millisecond of a time interval of the calibrating session. This metadata is transferred into the data gathering module 713 via the data transfer module 715. When the sensors record the data during the target session, the sensor data is stored in the sensory module 712 and then as metadata associated with each point of the target visual information 717 at for every millisecond of a time interval of the target session, it is transferred into the data gathering module 713 via the data transfer module 715.

Figure 11:
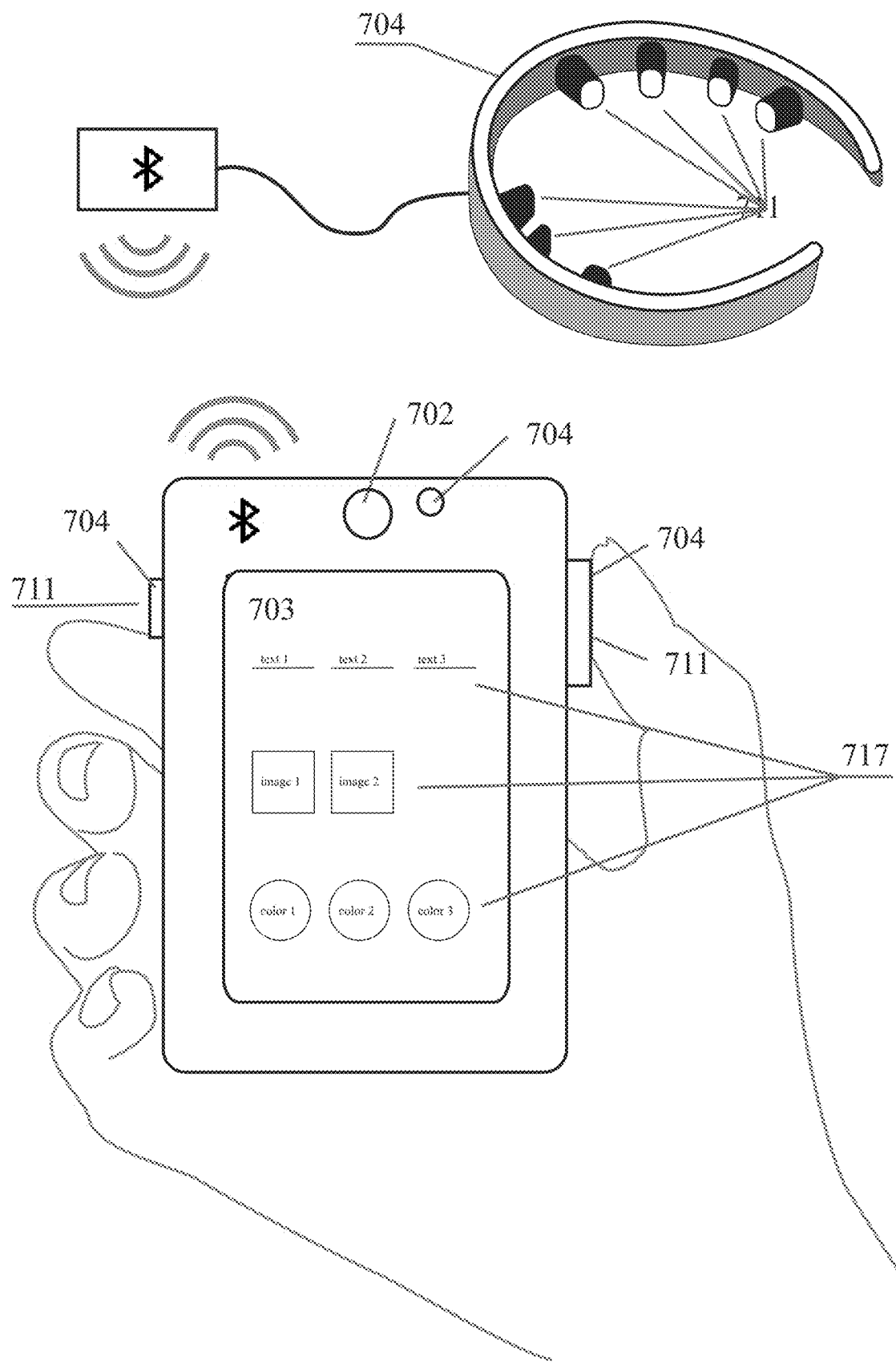
FIG. 11 is a schematic diagram of an electronic system for recording bioresponse measurements suitable for configuring an exemplary implementation of the present technology.
Figure 12:
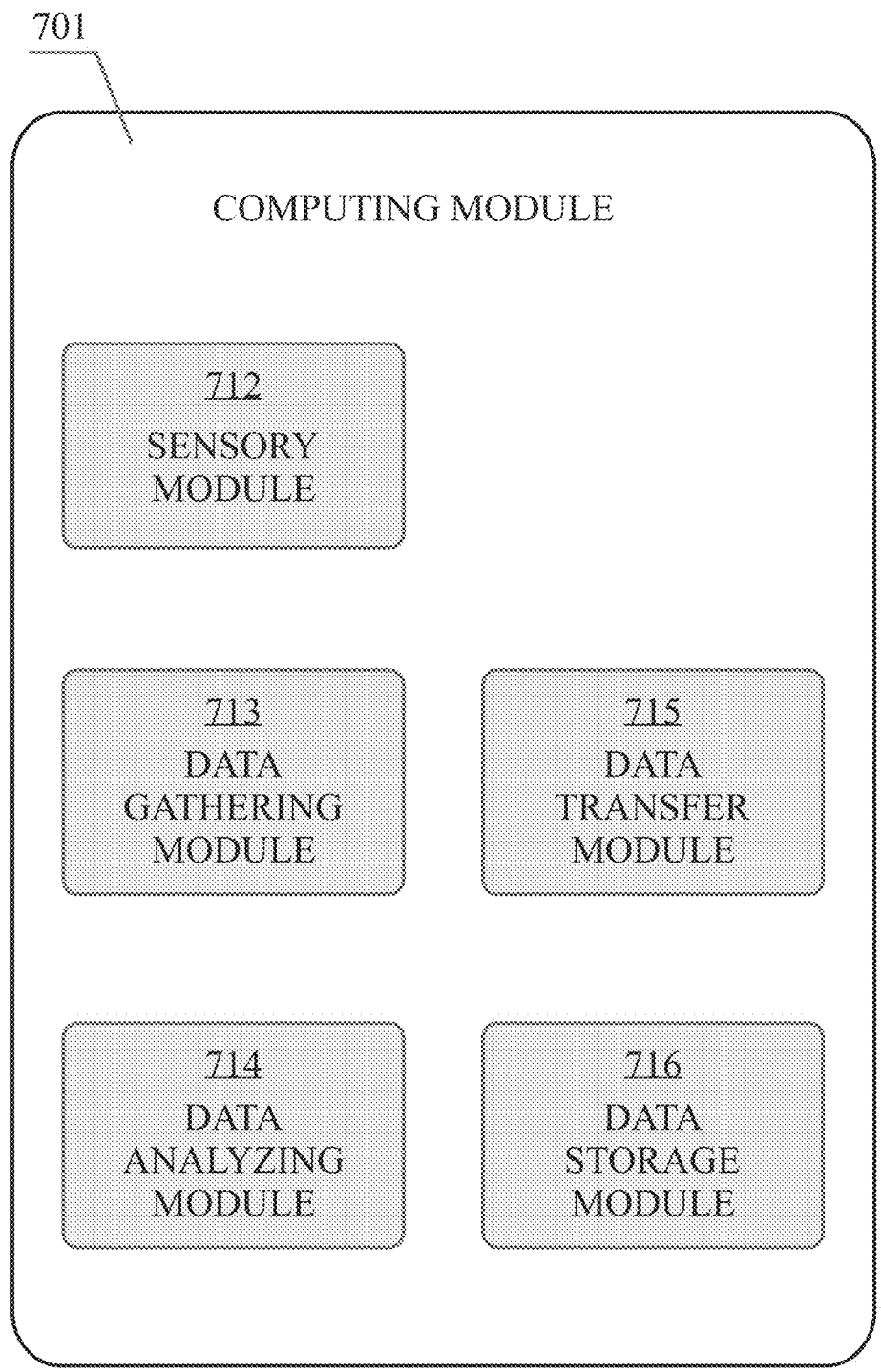
FIG. 12 is a schematic diagram of a computing system suitable for configuring an exemplary implementation of the present technology.
Figure 13:
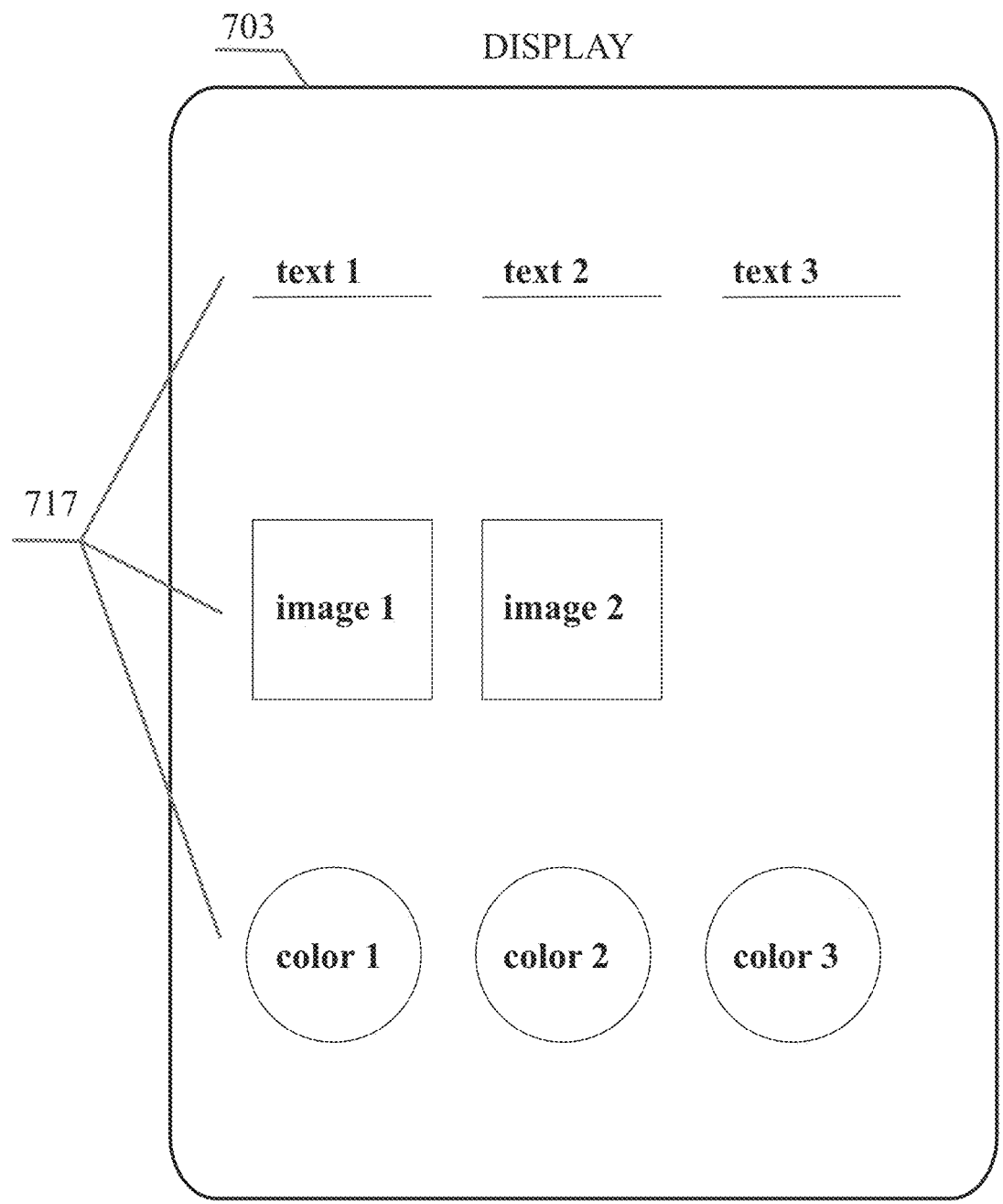
FIG. 13 is a schematic diagram of display for displaying visual information suitable for configuring an exemplary implementation of the present technology.

The sensors 711 of the EEG bioresponse module 704 shown in FIG. 11 are configured to record electrical impulses in the brain activity of the user consuming visual information 717 and to send the raw data generated by the EEG signals to the data gathering module 713. The EEG bioresponse module 704 measures voltage fluctuations resulting from ionic current within the neurons of the brain. To record the brain's electrical activity, multiple electrodes are placed on the scalp of a user as is well known in the art. The measurement is performed over the time of a recording session, during which, for example, a user may be reading text on the display 703. The EEG measured voltage fluctuations may be interpreted in several ways, all of which are within the scope of the present technology.

For example, the EEG measured voltage fluctuations may be interpreted to within the scope of the N400, which is an interpretation of the EEG measurement that is seen as a component of time-locked EEG signals (fixation-related potentials or FRP), the P300 (also known as the P3) wave, which is an fixation-related potential component elicited in the process of decision making, the P600, which is an fixation-related potential (FRP) that is considered to be related to reading grammatical errors and other syntactic anomalies, or other interpretations. For example, the N400 is measured as a negative-going deflection that extends from 250-500 ms that may peak around 400 milliseconds post-stimulus over centro-parietal electrode sites. The present technology describes a correlation between larger N400 amplitude effects and longer fixation durations of the user consuming visual information 717, as well as experiments that study brain responses to words, pictures, graphs, faces. Similarly, experiments describing the P300 and the P600 interpretations of user's responses to consuming visual information 717 are within the scope of the present technology.

It is also within the scope of the present technology to interpret the EEG measured voltage fluctuations to determine a correlation between the user's brain activity and the relevance of words and/or sentences of the visual information 717 to a user. For this purpose, the EEG may measure changes in certain brain areas in relation to processing verbs versus nouns, concrete nouns versus abstract nouns, common nouns versus proper nouns, frequency of use of words, correct use of words versus incorrect use of words, etc., or, the present technology may determine correlations between characteristics of cognitive processes and certain EEG effects in order to record data for estimating the cognitive or emotional responses of a user to consuming target visual information 717.

FIG. 5 depicts the method 500 of using the present technology. The method 500 generally has four main steps: the step 501 related to training a training machine learning model on data from training users, the step 503 related to training a calibrating machine learning model on calibrating user data, the step 506 related to calibrating the target user data 506 and the step 507 related to applying the training machine learning model to calibrated target user data. Embodiments of the present technology related to the steps 501, 503, 506 and 507 will be described in more detail below, wherein possible processes related to each of those steps are disclosed.

Typically, both the eye-tracker 702 and the bioresponse measurement module 704 collect raw data, such that the eye-tracker 702 collects eye tracking gaze tracks from training users and the EEG electrical signal data when the bioresponse measurement module 704 is the EEG device. This raw data needs to be transformed into features that are typically in tensor form in order to be fed into the training machine learning model in order to be processed by the neural networks. The features in tensor form may be referred to as tensors at different parts of the present description and this is done merely for illustration purposes and is not intended to mean that all features in tensor form are tensors. Transforming the raw data into features in tensor form may be performed using various approaches, some examples of which are described below. For the purposes of ease of understanding, the transformation of raw data is referred in the present application within the steps related to the calibration of data, which is described more detail in relation to the calibration of target user data of step 506, however, processes that relate to transformation of the raw data into tensor feature form data may be described throughout the present description.

FIG. 1 outlines the general steps of how an electronic application, for example, a smartphone application, executing the method 100 may operate. A user can log into an eye tracking and analysis service provided by the system 700. A user can sign in to the service at step 101, however, it is understood that no sign in is required. At step 102, the calibration process of the system 700 is executed. The calibration process may be applied to the eye-tracker 702 as shown in step 103 and to the bioresponse measurement module 704, for example, for an EEG device, as shown in step 104. At step 105 the user selects a text to read, i.e. the target visual information 717, however, it is understood that the text may be any visual information 717 as described herein. At step 106, the users will read the text and the eye-tracker will record the gaze of the user, and the EEG measurements during the user consuming the text, as well as any other data collected by the system 700 during this recording of the target session. At step 107, the system 700 will analyze the collected data by applying the calibrating machine learning model to the target data recording, i.e. the gaze tracks, EEG and ambient data recorded by the system 700, thus generating calibrated target data, and then it applies the training machine learning model to the calibrated target data, which then estimates what level of cognitive or emotional state the user had at each moment (t) in time while consuming the text. Then at step 108, the system 700 saves the results of the method 100 in a database and/or displays them to the user.

General Description of the Training Machine Learning Model

The general steps of the training of the training machine learning model are depicted in FIG. 4. The system 700 trains the machine training model using training data from training users. In one embodiment of the system 700, the training of the training machine learning model may be executed prior to the execution of the steps of any of the methods 100, 200 or 300. In other embodiments, the training of the training machine learning model may be executed during the step 107 of the method 100, the step 206 of the method 200, or the step 308 of the method 300. It is understood that the training of the machine learning model may be executed at any suitable step of the methods 100, 200 or 300.

The training machine learning model consists at least of a number of neural networks, which include at least one deep neural network (DNN). To initially train the DNN of the training machine learning model, the data analyzing module 714 requires data that is suitable for the DNN to process application. In some embodiments of the training machine learning model, it is possible to use the RNN architectures in combination with the fully connected neural network and/or a RNN within the neural network layers of the training machine learning model in addition to the abovementioned at least one layer of the DNN. The cognitive or emotional levels determination are represented in outputs of the DNN as a threshold value for each time interval or for each time (t) of the training sessions or the target sessions.

The training process generally includes the steps of data collection, analysis, verification and testing. Provided the data collected during the training sessions is collected in a controlled environment over a large enough sample of training users, the DNN may be trained to calculate the probability of a certain cognitive or emotional level at a time (t) for each element of the training visual information 717 that is consumed by every training user. The training machine learning model is then used to calculate the probability of a certain cognitive or emotional level at a time (t) for each element of the target visual information 717 that is consumed by any other user.

In some embodiments, the training machine learning model may have a set of classifiers that are applied to the tensor feature form data together with the DNN. For example, the training machine learning algorithm may include algorithms for generating a classifier for the gaze tracks and for an EEG data. Furthermore, the training machine learning model may be constructed designed to extract features (e.g. time domain such as amplitude, frequency domain such as power, additional external spatial patterns or components such as via geoinformation systems or life cycle assessments) from one or more time intervals and render a likelihood output (continuous value from 0 to 1) or decision output (binary value of 0 or 1) based on a weighted (linear or nonlinear) combination of the features. This may be useful for verification of the training machine learning model outputs in certain neural network architectures. Typical classifiers include the LDA, support vector machine (SVM), neural networks or AdaBoost. Such classifiers may be trained based on the extracted features to detect specific user's responses for a predetermined relevant visual stimulus. These classifiers may be trained to recognize any gaze tracks or brain responses for a particular relevant stimuli and reject responses for non-relevant stimuli.

Training the training machine learning model in a controlled environment allows the cognitive and/or emotional levels of the training users to be estimated by the training machine learning model with a sufficient degree of accuracy by the system 700 because of the possibility of self-assessment during the training session of the results generated by the training machine learning model due to the controlled environment of the training session. It is also possible to collect training data from experiments performed by groups of researchers and commercial entities that study correlation between eye tracking and bioresponses of users. Such collected training data may be fed into the training machine learning model to perform the training thereof (now shown in any of the figures). The collected data may be used to supplement the data recorded during training sessions by the system 700, or it may be used independently to create training machine learning models that are catered to specific needs of the system 700.

The training machine learning model may use within its architecture a Long Short-Term Memory (LSTM) as a variation of a deep network, such as RNNs to classify the sequential data, including estimating probabilities of cognitive and emotional levels at a given moment of time. The LSTM requires large enough samples of data for training. In order to achieve a training machine training model that provides quality estimations of cognitive and/or emotional levels of consuming visual information, a sufficient amount of training data is needed. In one embodiment this, it is possible to ensure that during the training of the training machine learning model, a training user reads longer fragments of text, such as complete sentences instead of single words, which will enhance the feature extraction from the raw data collected by the eye-tracker 702 because reading longer fragments of text provides more data related to gaze tracks that when a training user reads independent words. Similarly, when a training user reads sentences, more data is collected using the EEG measurements of the brain activity, as the sentences may have more meanings in the mind of the training user than single words. As such, processing of data collected from the training user reading sentences may be used at the training of the training machine learning model effectively. Furthermore, the system 700 does not create personalized training machine learning models, which allows to train the training machine learning model on large data set collected from multiple training users.

Any number of sources may be used to record gaze tracks for training of the training machine learning model. For example, the gaze tracks may be collected from a number of different sources, such as a source 1, a source 2 and a source 3, which all provide different data sets that were recorded via multiple eye-trackers 702 with multiple training users. In some cases, the more gaze tracks is available, the more accurate will be the training machine learning model, however, it may not be the case for certain sets of data, as some data sets may differ substantially from each other and these differences may not be used to extract meaningful tensor type features across all data sets. Typically, the same or similar features may be extracted for all sources, however, this may not be possible in some practical aspects of the operation of different eye-trackers 702 and some different bioresponse measurement modules 704, as their data may differ substantially across data sets, for example, combining data measured by an EEG device and an fMRI device to extract tensor features, based on that combined data, may not add accuracy to the training machine learning model. The factors that may influence readings of different eye-trackers 702 include experiment procedures, text presentation, recording hardware and software quality, sampling rates, initial calibration and filtering, as well as human factors such as head movements and different levels of attention. In some embodiments of the present technology, it may be possible to apply a normalization algorithm to suitable data sets of each signal within each source in order to account for differences in the data sets. The normalization may be applied separately to each source, or it may be applied to a number of sources whose data sets are combined. Furthermore, in order to extract meaningful features, the data sets may also be aggregated by type, the features may be extracted and then they may be normalized to have normalized feature values.

In an example of a process of collecting training data, a group of 1000 training users has consumed in a controlled environment a given number of texts and images consisting of 100,000 words and 1000 images. The ambient conditions of the training sessions were recorded by the system 700 and stored in the data gathering module 713. The eye tracking gaze data and the EEG data has been fed into the system 700 for the purpose of training the machine learning model. All the data from each training session was normalized and averaged, and then fed into the training machine learning model. During the training of the training machine learning model, the steps related to extraction of the gaze tracks features and the EEG features may be either incorporated within the training machine learning algorithm or may be performed by a single use of the neural network having a sufficient number of layers separately from the training machine learning algorithm.

It is contemplated that it is also possible to train the training machine learning model on a set of training users of more than two people that have undergone simultaneous eye tracking and EEG recordings of consuming visual information 717.

Other approaches to ensuring that the training machine learning model has sufficient data fed therein are outlined in more detail below.

During recording sessions (training, calibrating or target), the data recording by eye-tracker 702 and the bioresponse measurement module 703 is done simultaneously. In some cases, there may be the bioresponse measurement module 703 measured data available only at the training session and not the calibrating or target session, which may lead to using the bioresponse measurement module 703 measured data training of the machine learning model and not for the measurement of the user's response during calibrating and target sessions. This does not preclude the training machine learning model from using features extracted from the bioresponse measurement module 703 measured data at the training session to determine the cognitive or emotional levels of the user in response to consuming calibrating or the target visual information 717.

It is contemplated that all processing could be integrated into a single processor or allocated among a plurality of processors in a variety of ways, for clarity signal processing is divided among several functional processors. An eye tracking processor may monitor the position signals to determine a fixation on a particular stimulus. Fixation occurs when the eyes remain focused on a constrained spatial region of, for example, less than half a degree. An audio processor may monitor the audio signals to detect the start/stop time tags of each action generated by a user. A signal processor may pre-process the raw EEG signals using the position signals to remove artifacts due to blinks and head movement, segment the signals into a sequence of stimulus-locked time windows (possibly overlapping) and process each segment of EEG data to reduce eye movement artifacts noise. Artifact removal for head movement and blinks is well known. A technique for removal of blink artifacts is described in Lucas C. Parra et al. "Response Error Correction—A Demonstration of Improved Human-Machine Performance Using Real-Time EEG monitoring" IEEE Trans. On Neural Systems and Rehabilitation Engineering, Vol. 11, No. 2, June 2003, which is hereby incorporated by reference. A technique for removal of eye movement artifacts is described in German Gomez-Herrero "Automatic Removal of Ocular Artifacts in the EEG without an EOG Reference Channel", Proc. of the 7th Nordic Sig. Proc. Symp., pp. 130-133, 7-9 Jun. 2006, which is hereby incorporated by reference.

In particular embodiments, evaluations are calibrated to each user and synchronized across users. For example, this may be useful when several users that are located in the same environment are using the system 700. These users may be seated in the same room with the same lighting conditions and each of the users may have its own eye-tracker 702 installed on their device. As such, the calibrating sessions of each user may be synchronized to generate a calibration model that is best suitable for the given conditions. In particular embodiments, templates are created for users to create a baseline for measuring the differentials in data in pre and post recording sessions. According to various embodiments, the computing module 701 may be intelligent, and adaptively modify specific parameters of the visual information 717 presented to the users, which includes duration of exposure, lighting conditions, size, color and shape of characters, and duration of recording sessions for each user being analyzed.

Hereinbelow are provided descriptions of the processes of calibrating data for the training machine learning model and the process of operation of the training machine learning model, which consists of the step of training thereof and of application thereof to a calibrated target data.

The process of calibrating data.

The system 700 has two separate steps of calibrating data: first calibrating data step is related to calibrating the training data before it is used to train the training machine learning model and the second calibrating data step is related to calibrating the target data before it is used to apply the training machine learning model to the calibrated target data. The two calibrating data steps are similar in their technical approaches; however, they are applied at different sessions: the training session, the calibrating session and the target session. Because of this subtle difference, the calibration of training data is used to generate tensor features that are used by the training machine learning model, whereby the calibrating of data step for both the calibrating session and the target session are similar to each other, as they relate to an uncontrolled/semi-controlled session environment (which is different from the controlled training session environment) and the calibrating data step aims to generate tensor features to be fed into the training machine learning model, and they aim to determine a set of mathematical functions that need to be applied to raw data collected at the calibrating and target sessions from the eye-tracker 702, the bioresponse measurement module 704 and other sensors 711 of the system 700, in order to generate tensor features that have characteristics similar to the tensor features used to train the training machine learning model of the system 700. Consequently, it is contemplated that the different systems 700 may have different training machine learning models and different calibrating machine learning models as each of those models may have been trained on different sets of data. It is contemplated that the system 700 many have different training models at a time (a) than at a time (t2, t3, tn), and a different calibrating machine learning models at a time (a) and a time (t2, t3, tn) as each of those models may have been trained on different sets of data that are available to the system 700 at each of the times (t1, t2, tn), for example, for a particular user with a first linguistic background, the system 700 may choose a first training machine learning model, and for a user with a second linguistic background the system 700 may choose a second training machine learning model.

Due to the similarity of approaches of data calibration, the present application will describe the general process thereof via examples of possible embodiments. The data calibration process is described hereinbelow for eye tracking gaze data and for EEG data, however, it is understood that a calibration process may be applied to any device of the bioresponse measurement module 704.

At any of the steps 102, 202 or 304, a calibrating visual information 717 is displayed on the display 703 to a user, each point of the calibrating visual information 717 has a metadata associated therewith. The metadata has some session environment data and some display data, particularly the exact coordinates on the display 703 of each element of the calibrating visual information 717, also known as the ground truth labeling. The eye-tracker 702 tracks and records the gaze of the user and collects the gaze tracks outlined above. At steps 103 and 104, 203, or 305 the system 700 requests the user to perform a predetermined action in order to indicate the exact element of calibrating visual information 717 that the user is looking at. The predetermined action may be, for example, tapping the display 703 with a finger on the exact element of the calibrating visual information 717 the user is looking at, or vocally notifying the system 700 of to indicate the exact element of the calibrating visual information 717 the user is looking at, or stop the gaze at an exact element of the calibrating visual information 717 following an instruction of the system 700 that indicates to the user what exact element of the calibrating visual information 717 to look at. Then for every timestep (the timestep may be any discrete time interval, for example, millisecond, second, a few seconds, etc.) of a time interval that may be between 1 and 10 seconds, the eye-tracker 702 records the gaze positions and movements at the each known exact element of calibrating visual information 717 that the user is looking at, and the internal sensors of the computing module 701 record environment data and internal system 700 data for every millisecond of that time interval.

The recorded gaze data and the associated metadata for the calibrating visual information is transferred into the data analyzing module 714. The data analyzing module 714 uses the raw data from the eye-tracker 702 and the metadata from the sensory module 712 to calculate the calibration parameters of the system 700 or independently for any of the parts of the system 700, for the computing module 701 the eye-tracker 702, the display 703, the bioresponse measurement module 704 (for cases when the bioresponse measurement module 704 undergoes a calibrating process), provided calibrating session data has been recorded by the sensory module 712 and stored in the data gathering module 713. The calibrated parameters are tensor form features or tensors (frame-level feature representations) that are calculated by applying a pre-trained non-linear transformation to the raw data from the eye-tracker 702 and to the metadata from the sensory module 712 (session data) for every timestep. In cases when bioresponse measurement module 704 is calibrated, the calibrating data gathered from via the bioresponse measurement module 704, for example, the electroencephalography signal data, is transformed into tensors (frame-level feature representations) using a Fast Fourier Transform for every window of measured signals consisting of numerous timesteps within a given extended time interval.

During the calibration session, the eye-tracker 702 records the user's gaze tracks at known coordinates (x,y) of the display 703 of the displayed calibrating visual information 717, in order to train the calibrating machine learning model sufficiently enough to set up a model that allows to:
  a. separate the noise and artifacts that may be generated during the recording of the eye-tracker 702 and eliminate them from the data set that will be fed as input of the training machine learning model, and
  b. to save in the data storage module 716 calibration parameters of the calibration machine learning model, for example, kernel ridge regression parameters, or the support vector regression parameters that are personalized to the user's recording session of consuming the visual information 717, such that these calibration parameters are suitable to be applied to any eye-tracker 702 recorded gaze tracks in order to determine the exact coordinates (x,y) of the visual information 717 that the user is looking at any moment in time t of the recording session.

The training process of the support vector regression consists of determining a set of parameters of an optimal hyperplane in the feature space that estimates a specific function that is able to map the coordinate positions of the calibrating visual information, which are recorded during the calibration session by the eye-tracker, to specific goal positions of the calibrating visual information within the system 700. The set of parameters is obtained by solving a quadratic programming problem. In order to obtain the non-linear regression model, support vector regression can be used in combination with a suitable kernel function, such as a polynomial kernel or a radial basis function. The parameters of the hyperplane in the kernel space are then saved during the calibration step in the data storage module 716, and then can be used during target session in order to calculate the calibrated target coordinates of the gaze tracks of the user during the recording of a target session.

Consequently, when the user is reading text or is looking at images, his/her gaze fixates on certain coordinates (x, y) of the display 703 at every millisecond of the time interval (t). As described in more detail below, the fixation progress on words, images or characters may be expressed in character units (for example, W=W1, W2, W3 . . . Wn) may be measured in order to detect the engagement type, i.e., deciding on the observed eye movement patterns and determining the engagement level (or the reading type) for each character unit during the calibrating session because the system 700 is receiving implicit feedback from the user for a select character unit, thus accurately detecting gaze of that user in relation to his/her corresponding eye-tracker 702 measurements at each moment of time. The eye-tracker 702 gaze tracks is transformed into tensor form features $Z(t)=\{Z(t1), Z(t2), \ldots, Z(tn)\}$ that correspond to $W=W1, W2, W3 \ldots Wn$ at times $t=t1, t2, \ldots tn$, during the calibrating session. The mathematical modeling of the relationship of the $Z(t)=\{Z(t1), Z(t2), \ldots, Z(tn)\}$, $W=W1, W2, W3 \ldots Wn$ at times $t=t1, t2, \ldots tn$, is determined by calibrating machine learning model. As such the calibrating machine learning model can be applied to measurements of the eye-tracker 702 of the target session that generate tensors $Target(t)=\{Target(t1), Target(t2), \ldots, Target(tn)\}$ for target visual information 717 having the character units $Wtarget=Wtarget1, Wtarget2, Wtarget3 \ldots Wtarget\_k$) in order determine what feature $Target(t)=\{Target(t1), Target(t2), \ldots, Target(tn)\}$ corresponds to which character units $Wtarget=Wtarget(t1), Wtarget(t2), Wtarget(t3) \ldots Wtarget(tn)$, by eliminating noise from the eye-tracker 702 and other sensors 711 of the system 700 measurements and calculating actual parameters of the position of the gaze, the position of the face and other data from the eye-tracker 702 and other sensors 711 of the system 700 at the time of the recording session.

A calibrated data set includes data about the coordinates (x,y) on the display 703 of where the user's gaze is directed at time (t) and has a representation (x_calibrated(t), y_calibrated(t)) that corresponds to a $Wtarget(t)=(Wtarget(t1), Wtarget(t2), \ldots Wtarget(tn))$, where the actual coordinate of the user's gaze (x_raw(t), y_raw(t)) is calibrated based on the measured eye-tracker 702 tensors $Z(t)=\{Z(t1), Z(t2), \ldots, Z(tn)\}$ during the recording session.

Also, during the data calibration, the gaze tracks may be processed in order to extract saccadic features associated with reading of the target information 717. The extracted saccadic features, aside from calibrated coordinates, are the length of the saccade, velocity of the saccadic movement, fixation duration associated with the saccades, and angularity of the saccade. The feature extraction step may be as described below, however, any suitable extraction step is possible. For example, in the research experiment described in the research paper "Reading Type Classification based on Generative Models and Bidirectional Long Short-Term Memory" by S. S. Mozaffari Chanijani, F. Raue, S. D. Hassanzadeh, S. Agne, S. S. Bukhari, A. Dengel, IUI Workshops (2018) the following feature extraction strategy was applied:
  a. In the first step of feature extraction a virtual median filter is applied to the input raw gaze points $E'=e'1, \ldots, e'n$ to eliminate any possible outliers: $ei=(medx(e'i-2, \ldots, e'i+2), medy(e'i-2, \ldots, e'i+2))$
  b. In the second step of feature extraction, the fixations were detected using a dispersion method having 100 ms temporal and 50 px spatial for dispersion parameters. The saccades may be considered as two consecutive fixations with the following features $F(1,\theta,v,\gamma)$:
    i. amplitude (1): the distance between two progressive fixations in virtual character unit (vc).
    ii. angularity ($\theta$): the angle of the saccade with respect to its starting point. The a indicates the direction of the saccade in a circle domain: $-180 \leq \alpha \leq 179$.
    iii. velocity (v): the speed of the saccade: $v=1/(te-ts)$, where ts and te are the first timesteps in the start fixation and the end fixation of a saccade in milliseconds.
    iv. duration ($\gamma$): the start fixation duration in each saccade in milliseconds respectively.

The present technology may use the approach described in the research "Reading Type Classification based on Generative Models and Bidirectional Long Short-Term Memory" by S. S. Mozaffari Chanijani, F. Raue, S. D. Hassanzadeh, S. Agne, S. S. Bukhari, A. Dengel, IUI Workshops (2018), which is incorporated herein by reference, or any other suitable approach for extracting saccade features and/or fixation features.

The researchers in the experiment described in the research paper "Reading Type Classification based on Generative Models and Bidirectional Long Short-Term Memory" by S. S. Mozaffari Chanijani, F. Raue, S. D. Hassanzadeh, S. Agne, S. S. Bukhari, A. Dengel, IUI Workshops (2018) used the following strategy for labeling the saccades, for example, using a Gaussian distribution with respect to the covariance matrix and the mean matrix of the feature set F: 1, $\theta$, v, $\gamma$. This kind of labeling may be stored in the tensor features to be used as input data within a portion of a suitable sequence-representation of gaze tracks for further analysis by the training machine learning model. A non-limiting example of such labeling is shown below and may be used in the present technology:
  a. FR: Forward Read (FR) is a progressive saccade associated with reading. The amplitude is between 7 to 10 characters;
  b. FS: Forward Skim (FS) is a progressive saccade in which the amplitude is larger than FR;
  c. LS: Long Saccades (LS) are the saccades, which have a larger amplitude than the threshold considered for the context of a given recording session. The direction of saccade does not apply to LS;
  d. RG: The regressions (RG) are regressive saccades usually associated with reading difficulties. The amplitude is varied and it must target the passed context;
  e. SR: Sweep Returns (SR) is sweeping back to the left on the next line of text;
  f. SW: Sweeps (SW) is unstructured sweeping the text to look up information.

It is contemplated that any other suitable labeling strategy may be applied within the scope of the present technology. A possible difference of the present technology with the approach outlined in the research paper "Reading Type Classification based on Generative Models and Bidirectional Long Short-Term Memory" by S. S. Mozaffari Chanijani, F. Raue, S. D. Hassanzadeh, S. Agne, S. S. Bukhari, A. Dengel, IUI Workshops (2018) is that instead of giving hard class labels to each saccade, it is possible to use the measurement of the actual act of gaze transition between words within the text that the user is consuming to determine the type of a saccade and use such type of a saccade in further calculations performed by the neural networks of the calibrating and training machine learning models. For example, the present technology also may use a one-hot encoding labeling approach for each timestep, wherein the system 700 assigns the value 1 for the act of gazing at a word and a value 0 for the act of non-gazing at a word, and consequently, this labeling approach may be used instead of or in combination with any other labeling strategy.

As mentioned above, it is important to ensure that the system 700 has collected a sufficient amount of raw data that may be used to generate features for the training machine learning model. In an alternative embodiment of the present technology, in order to increase the volume of the input data set for deep neural network, a hierarchical hidden Markov model (HHMM) may be applied to the gaze tracks of consuming the target visual information 717. A description of this approach was also outlined in the research paper "Reading Type Classification based on Generative Models and Bidirectional Long Short-Term Memory" by S. S. Mozaffari Chanijani, F. Raue, S. D. Hassanzadeh, S. Agne, S. S. Bukhari, A. Dengel, IUI Workshops (2018); this approach may be applicable to the present technology. An alternative embodiment of the present technology with the approach outlined in the research paper "Reading Type Classification based on Generative Models and Bidirectional Long Short-Term Memory" by S. S. Mozaffari Chanijani, F. Raue, S. D. Hassanzadeh, S. Agne, S. S. Bukhari, A. Dengel, IUI Workshops (2018) that the Hidden Markov Model data augmentation may use as hidden states a set of words on a given page (instead of classes of saccades). Therefore, the present technology may use the Hidden Markov Model for a set of words on a given page, for example, when a page has 100 words, the present technology may assign 100 hidden states, i.e. one hidden state for each word. In the example, when a page has 100 words, it is also possible to have more or less than 100 hidden states, when a hidden state is defined for a set of words, for example, the system 700 may generate one hidden state for each set of 5 words, which results in 20 hidden states for a 100 word page.

In another embodiment, to ensure that more relevant data is collected and fed into the training machine learning model, the gaze tracks collected may include additional information related to engagement type that may also be added to the tensor form feature data. In order to automatically determine to what extent eye movements, resemble an engagement type pattern for each Wtarget=Wtarget1, Wtarget2, Wtarget3 . . . Wtarget_k), a sequence classification problem may be solved as is described in the research paper "Reading Type Classification based on Generative Models and Bidirectional Long Short-Term Memory" by S. S. Mozaffari Chanijani, F. Raue, S. D. Hassanzadeh, S. Agne, S. S. Bukhari, A. Dengel, IUI Workshops (2018), wherein the discrete labels in an engagement type classification problem may be as: i) during "reading" the saccades are short and progressive over the context, ii) during "skimming" the saccades are longer compared to the reading pattern, and iii) during scanning the saccades are less structured compared to skimming.

These classifications may be attributed to different readers at different times (t) and used to supplement the information stored in the tensor form features that were then analyzed by an RNN. The present technology may also use a classifier designed as a logistic regression that is in the form of a multi-layer fully connected neural network. Consequently, the training objective of such a logistic regression classifier would be to predict a sequence-level class of a cognitive state or an emotional state based on a list of possible states defined by the system 700 that may include:

a. Attention
b. Cognitive demand
c. Cognitive fatigue
d. Cognitive load
e. Concentration
f. Fatigue
g. Involvement
h. Mental effort
i. Stress
j. Reaction time, and
k. Understanding.

Examples of the estimations of the cognitive or emotional levels during a target session are shown in a graph depiction in FIGS. 19 to 28. It is contemplated that the presentation of results of the estimations of the cognitive or emotional levels may be depicted in any suitable manner, which may include number representations, color coding, tabling, etc.

In some examples, the system 700 may be able to identity the emotional states of a user, which may be selected from a list of typical emotional states that may identified as follows:

a. Afraid
b. Angry
c. Disgusted
d. Happy
e. Neutral
f. Sad
g. Surprised.

The present technology contemplates that the user's engagement type (or a reading type) of the visual information 717, depends on the cognitive state of the user, for example, a tired or a stressed user may read selected passages a few times, a focused user is less fixed on specific words and may skim through the text, etc. Thus, the eye-tracker 702 gaze track measurements may be estimated in terms of a probabilistic modeling of the state of the user and quality of the eye-tracker 702 measurements (based on multiple variables of environment and system 700 data as described above). The user's estimated probability of a state is a sequence that is a hidden stochastic process. At each moment in time (t), the system 700 sets a hidden state, which corresponds to a given character unit, such that W: St→Wi. Thus, at each moment (t), the features generated by the calibration machine learning model may include information related to a hidden state S(t), the calibrated position of the user's gaze on the display 703 (x_calibrated(t), y_calibrated(t)), and the measured tensors Z(t) from the eye-tracker 702. This approach may add additional feature data that may be relevant in some configurations of the training machine learning model. The data generated with this approach may be used as an augmentation of the data used for training machine learning model.

In another embodiment of the present technology, it is possible to apply the methods of feature extraction that are described in the research paper "Weakly Supervised Part-of-speech Tagging Using eye tracking Data" by M. Barrett, J. Bingel, F. Keller and A. Søgaard, Proceedings of the 54th Annual Meeting of the Association for Computational Linguistics, pages 579-584 (2016), which is incorporated herein by reference, in the research paper "Entity Recognition at First Sight: Improving NER with Eye Movement Information" by N. Hollenstein and C. Zhang, ArXiv(2019), which is incorporated herein by reference, and in the research paper "Advancing NLP with Cognitive Language Processing Signals" N. Hollenstein, M. Barrett, M. Troendle, F. Bigiolli, N. Langer, C. Zhang, ArXiv Computer Science, ArXiv (2019), which is incorporated herein by reference, such that the word-level features that are extracted from the gaze track data step may be divided in four categories: basic, early, late and context. Basic eye tracking features comprise a set of statistics and metrics that are calculated on the measurements from the entire time interval that corresponds to fixations on a current word by a user. These metrics and statistics may include the total number of fixations on a current word, the estimation of probability that a user will fixate on the current word or a mean duration of fixation on a current word (calculated on a training set of gaze tracks). Early eye tracking feature set consists of metrics and statistics that correspond to the beginning of the process of fixation on a current word by a user. These features are designed to correspond to such cognitive processes as lexical access and early syntactic processing. The early feature set may include duration of a first fixation, first-pass duration and others. Similarly, late eye tracking features are designed to reflect the late syntactic processing and general disambiguation. These features may consist of such metrics and statistics as a number of regressions to a word and re-fixation probability. Context features consist of probabilities of fixating on neighboring words, they represent an overall context of the current word as perceived by a user. A possible difference of the present technology with the approach outlined in the research paper "Weakly Supervised Part-of-speech Tagging Using eye tracking Data" by M. Barrett, J. Bingel, F. Keller and A. Søgaard, Proceedings of the 54th Annual Meeting of the Association for Computational Linguistics, pages 579-584 (2016), in the research paper "Entity Recognition at First Sight: Improving NER with Eye Movement Information" by N. Hollenstein and C. Zhang, ArXiv (2019), and in the research paper "Advancing NLP with Cognitive Language Processing Signals" N. Hollenstein, M. Barrett, M. Troendle, F. Bigiolli, N. Langer, C. Zhang, ArXiv Computer Science, ArXiv (2019), is that a set of features is not limited to calculated statistics, but also may include automatically generated embeddings of gaze patterns, extracted from the local vicinity of a current word. For example, the user reads the sentence "John is eating ice cream", then the system 700 will automatically generate an embedding for each word in this sentence a gaze pattern that is defined by the user's gaze tracks at the words nearby, such as the word "eating" would be defined by the user's gaze tracks recorded when the user gazed at the words "John", "is", "ice" and "cream". These embeddings may be defined by the neural network independently of any input from the manager of the system 700.

In order to add gaze tracks information to the neural network, it is possible to select as many features as available from those present in all of the sources. It is possible to enhance features by combining multiple eye tracking derived features of different stages of the user reading process. For example, in case when during a recording session of the user consuming visual information 717, a limited number of measurements is available from the eye-tracker 702, the bioresponse module 703 and other sensors of the system 700, in order to enhance the measured data, we may normalize the data by splitting the feature values into quantiles to avoid sparsity issues. A separate normalization of each word from different sources may provide average values for the gaze tracks feature for each normalized word over all occurrences in the training data set of all training sessions recorded and used for the training of the training machine learning model. For example, the sum of the gaze tracks features of all n-occurrences of the word "water" are averaged over the number of occurrences n. For each source as well as for any aggregated sources, a lexicon of lower-cased word types with their averaged gaze tracks feature values may be compiled. Thus, for a neural network, either the type-level aggregates for each individual source may be used as input or the values from the combined lexicon, which increases the number of word types with known gaze tracks feature values, may be used as input. In some cases, the aggregation may eliminate the requirement for a larger data set of gaze tracks features when applying the machine learning models training. This allows for cases of having a larger lexicon within a body of text to be accounted for via aggregation by type by receiving type-aggregated gaze tracks feature values. Words that are not within the lexicon of a given body of text consumed by a user, the data analytical module 716 does not assign any gaze tracks feature values. The type-aggregated gaze tracks features can be used on a variety of data sets received from an eye-tracker 702, including data sets with small quantities of recorded eye-tracker 702 data and provide results of sufficient accuracy.

The data analytical module 716 applies to the gaze tracks a hybrid approach based on bidirectional LSTMs using word-level representations generated by the calibrating machine learning model or the algorithms of processing data of the training machine learning model. Specifically, the bidirectional LSTMs for word-level embeddings may be trained on any source of data including a combination of sources. The dimensions of the bidirectional LSTMs for word-level embeddings may be set to 25 or more. The model may use a single layer for the forward and backward LSTMs. All models may be trained with a dropout rate between at 0.1 to 0.7.

Figure 14:
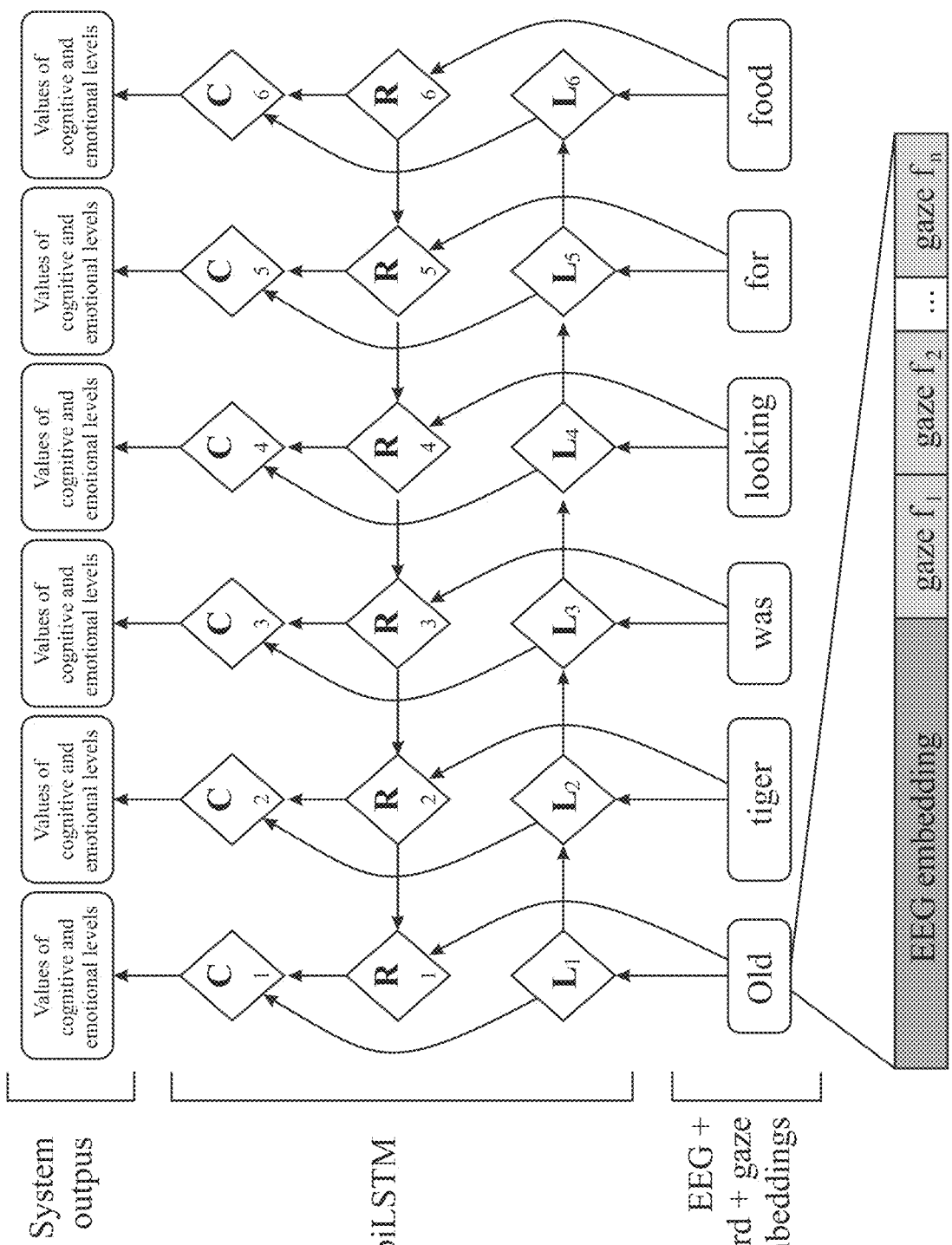
FIG. 14 is a schematic diagram of a portion of a neural network architecture of a machine learning model suitable for configuring an exemplary implementation of the present technology.
Figure 15:
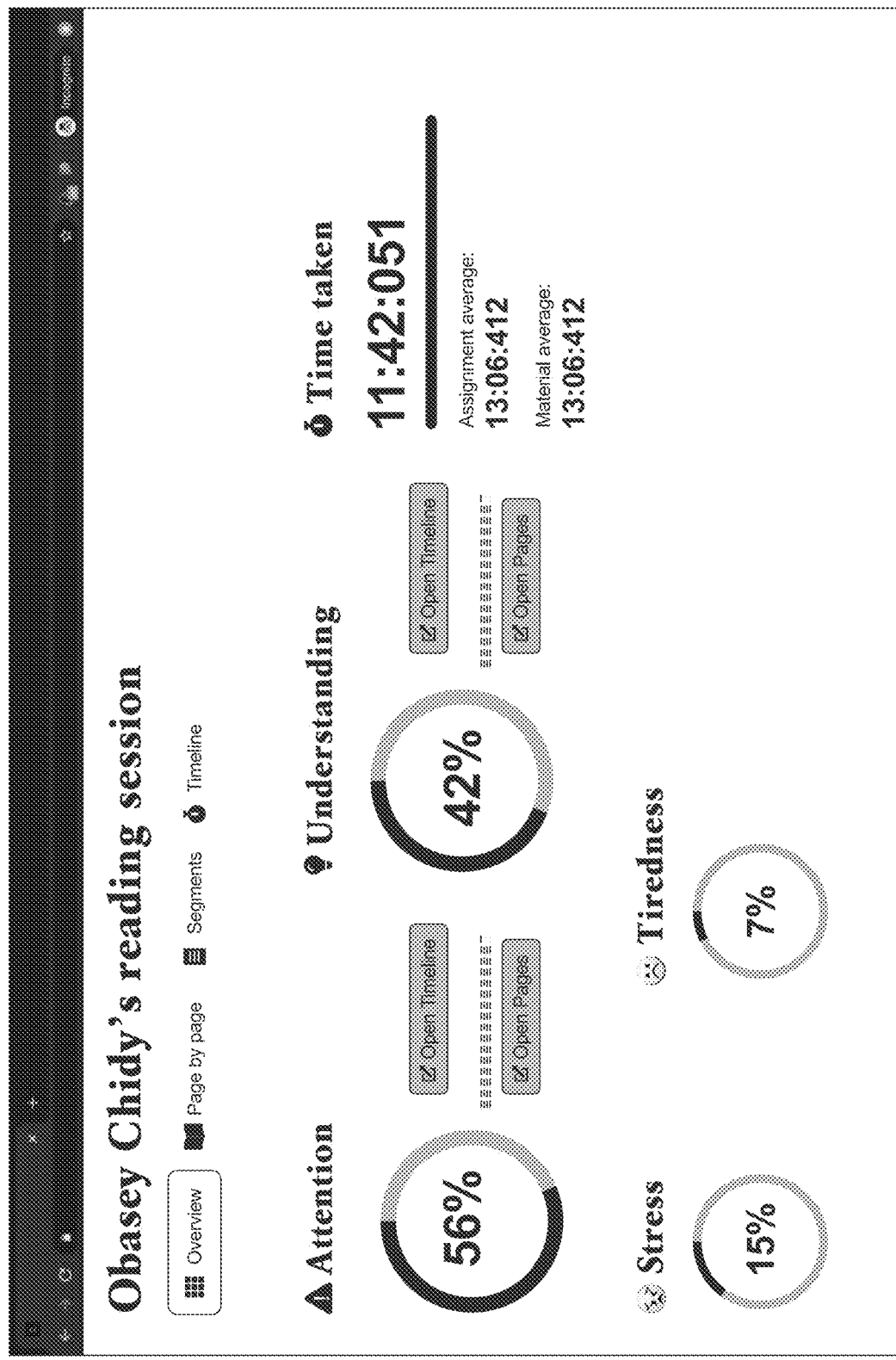
FIG. 15 is an exemplary screenshot, the screenshot depicting a portion of a web browser displaying an interface of a service that presents an overview of the cognitive and the emotional levels estimated during recording of a user's target session of consuming target visual information.
Figure 16:
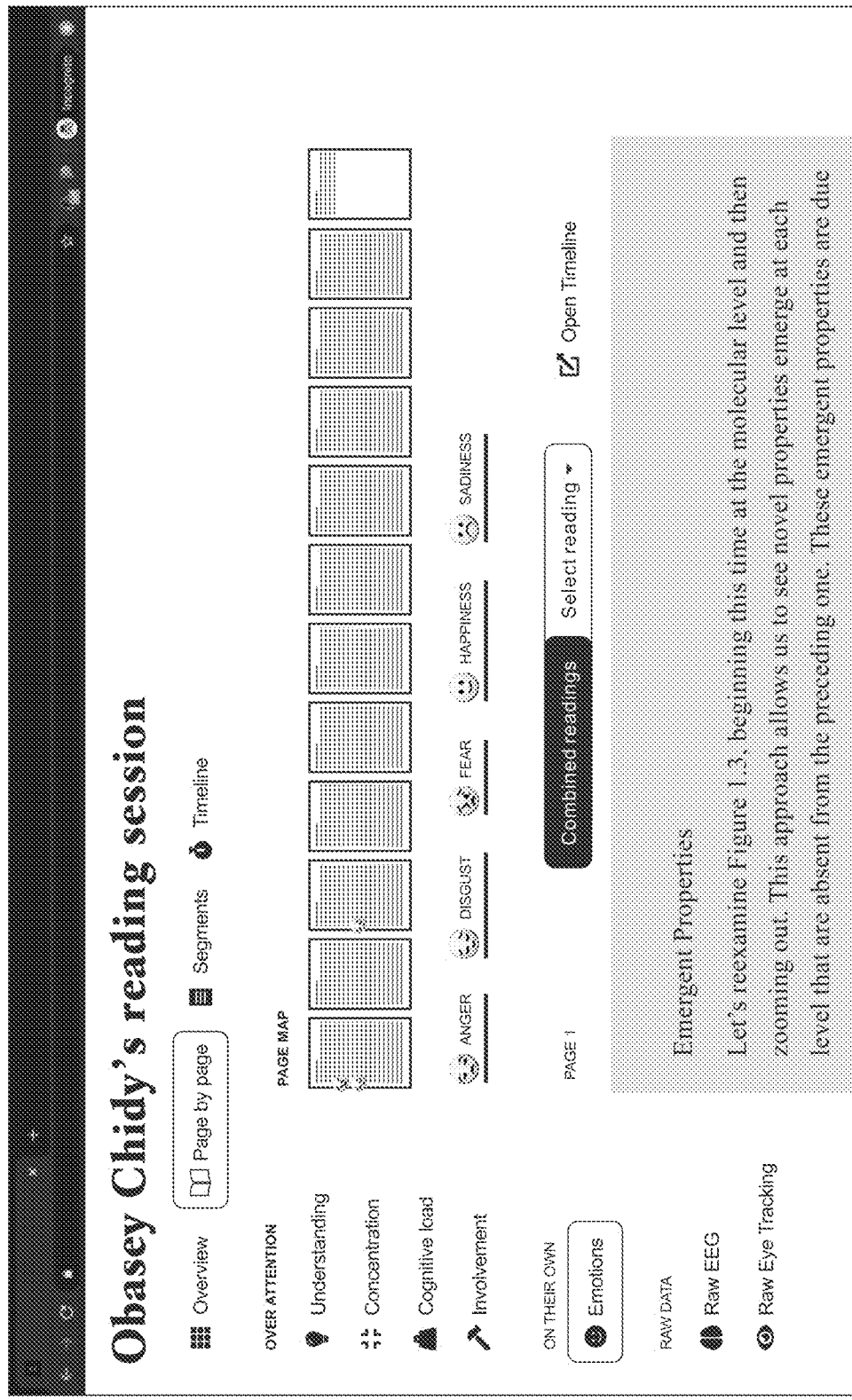
FIG. 16 is an exemplary screenshot, the screenshot depicting a portion of a web browser displaying an interface of a service that presents a page by page estimation of the emotional levels of a user during the recording of a user's target session of consuming the target visual information.
Figure 17:
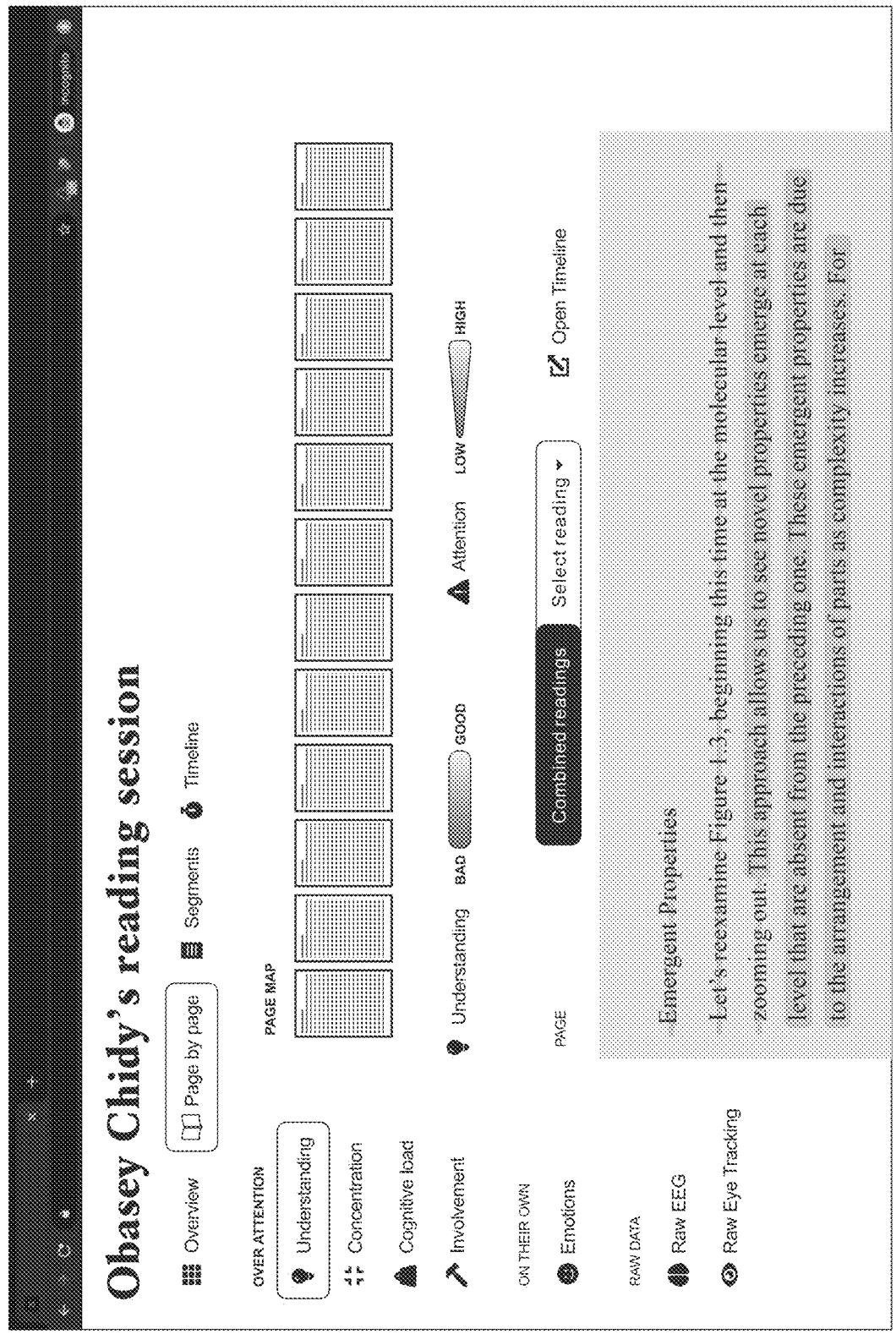
FIG. 17 is an exemplary screenshot, the screenshot depicting a portion of a web browser displaying an interface of a service that presents a page by page estimation of the understanding and attention of a user during the recording of a user's target session of consuming the target visual information.
Figure 18:
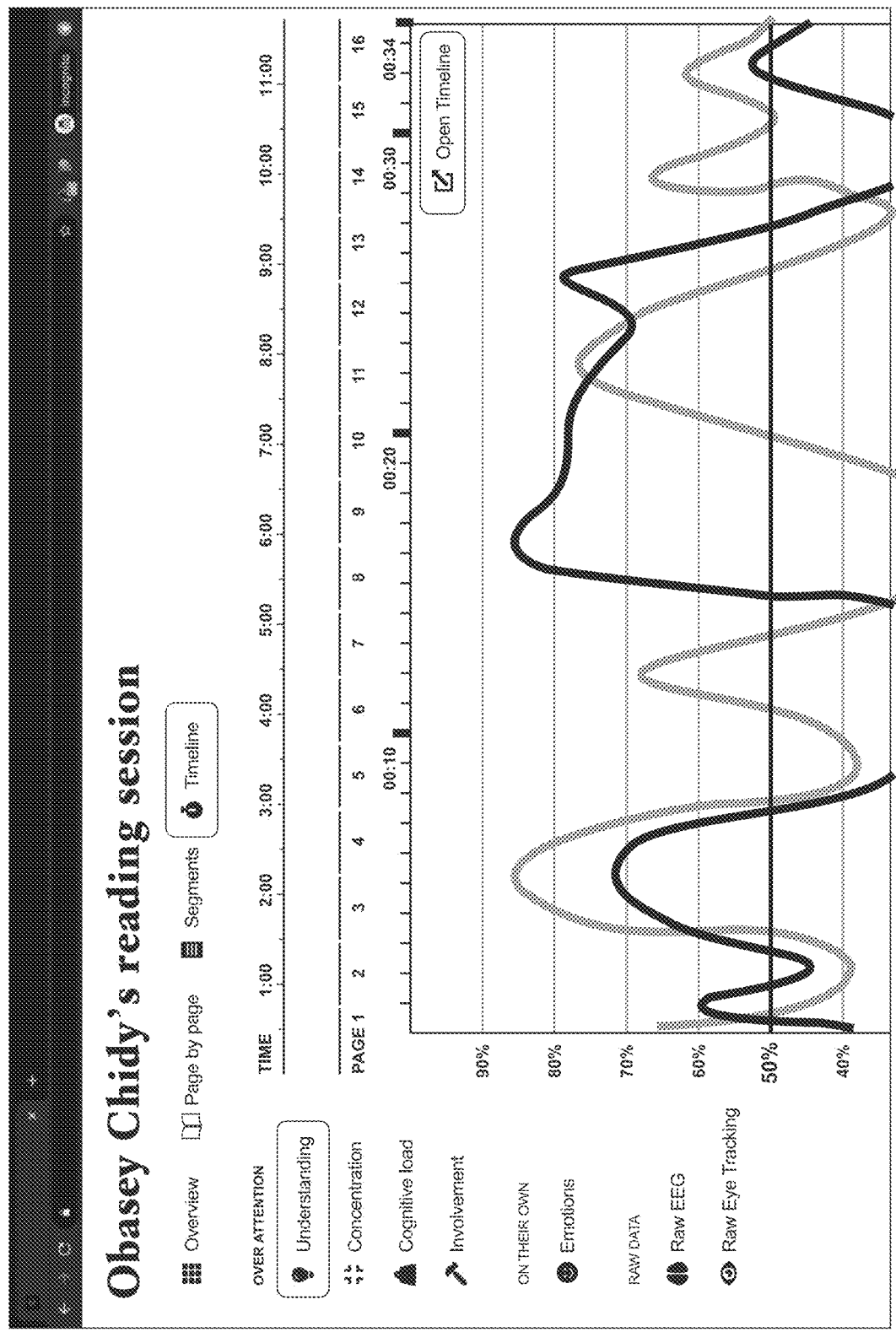
FIG. 18 is an exemplary screenshot, the screenshot depicting a portion of a web browser displaying an interface of a service that presents an estimation of the understanding levels of a user during the recording of a user's target session of consuming the target visual information over a given time period of the target session.
Figure 19:
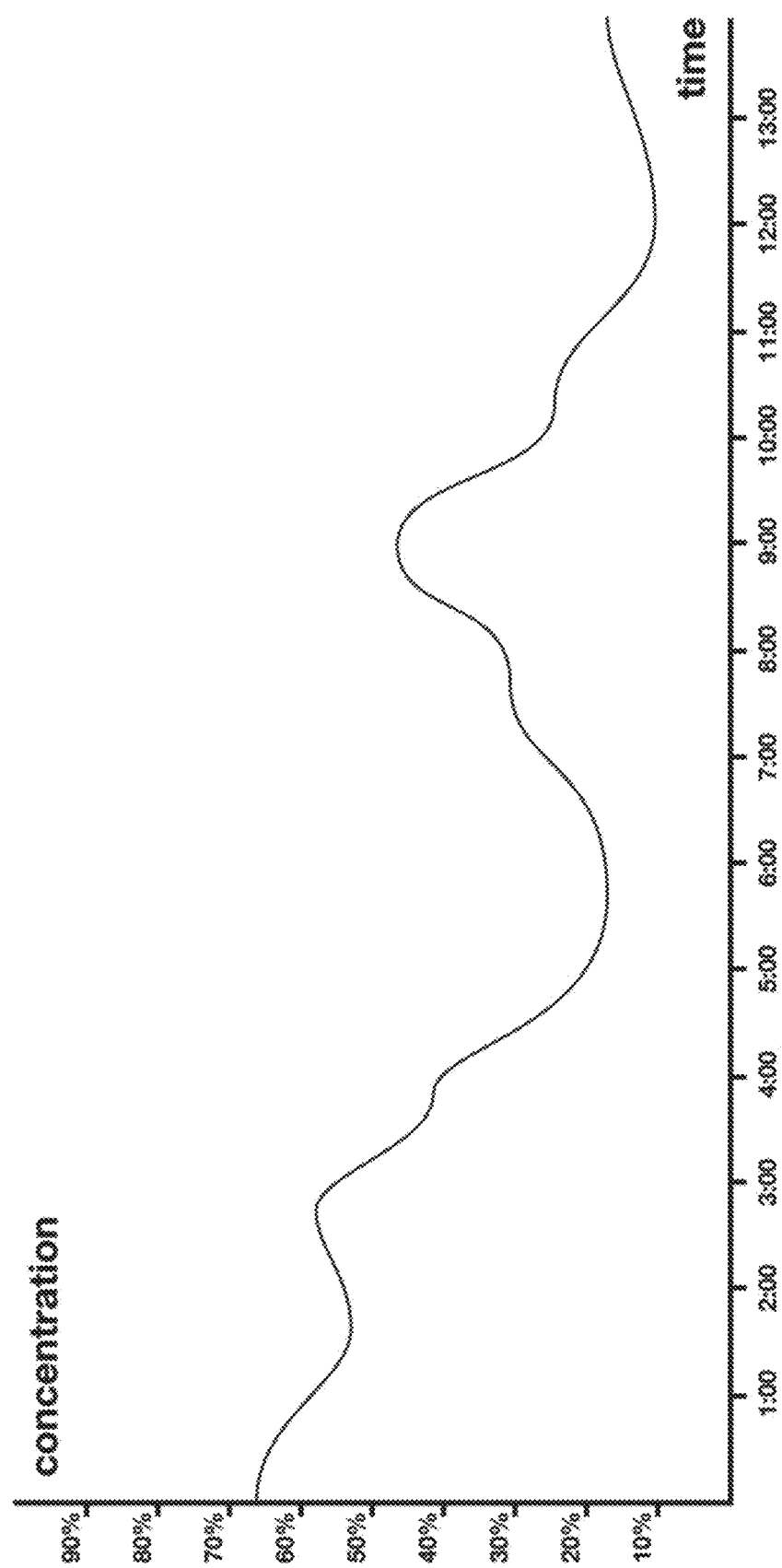
FIG. 19 is an exemplary graph depicting a representation of the estimation of the concentration of a user of during the recording of a user's target session of consuming the target visual information over a given time period of the target session.
Figure 20:
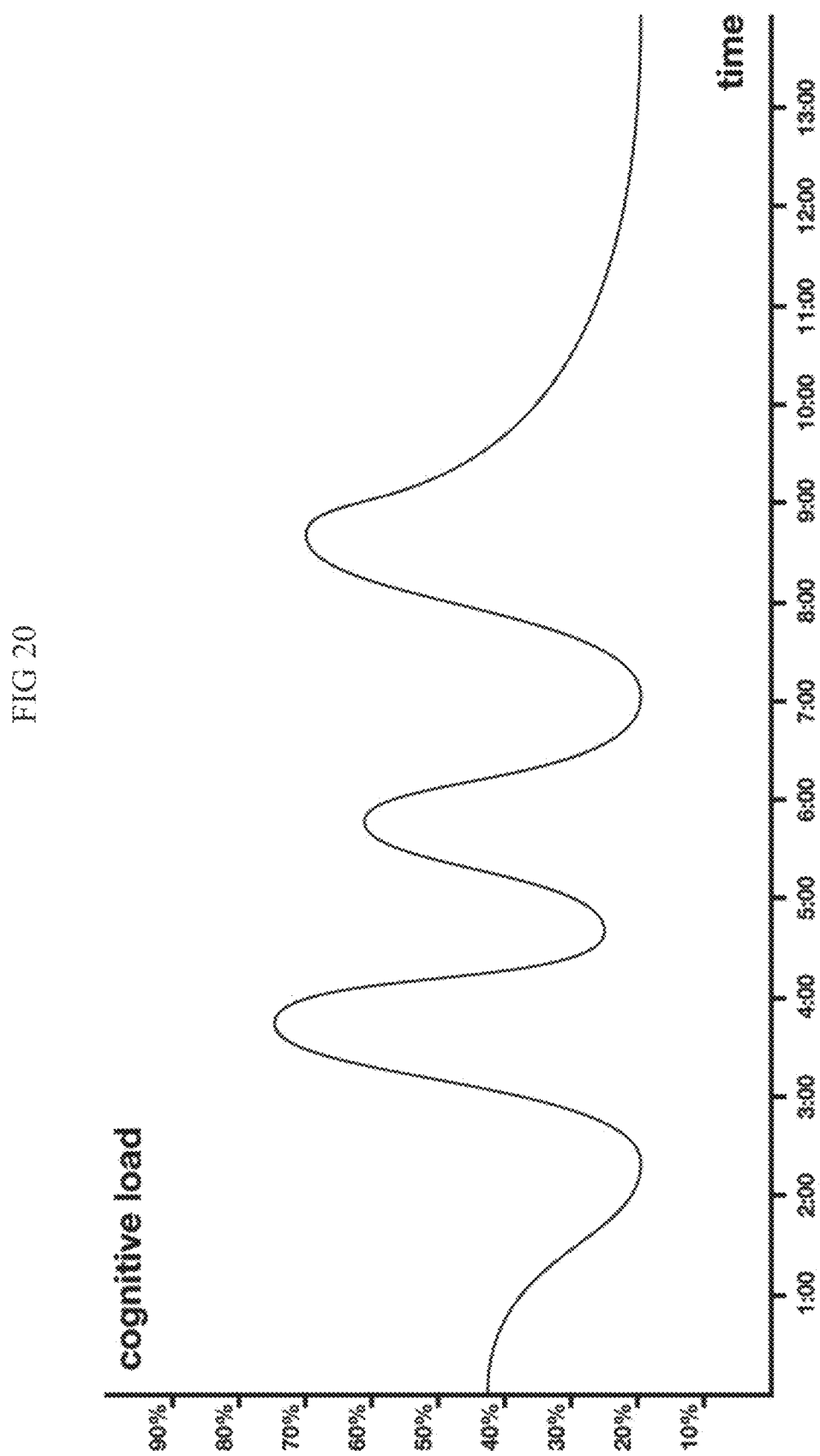
FIG. 20 is an exemplary graph depicting a representation of the estimation of the cognitive load during the recording of a user's target session of consuming the target visual information over a given time period of the target session.
Figure 21:
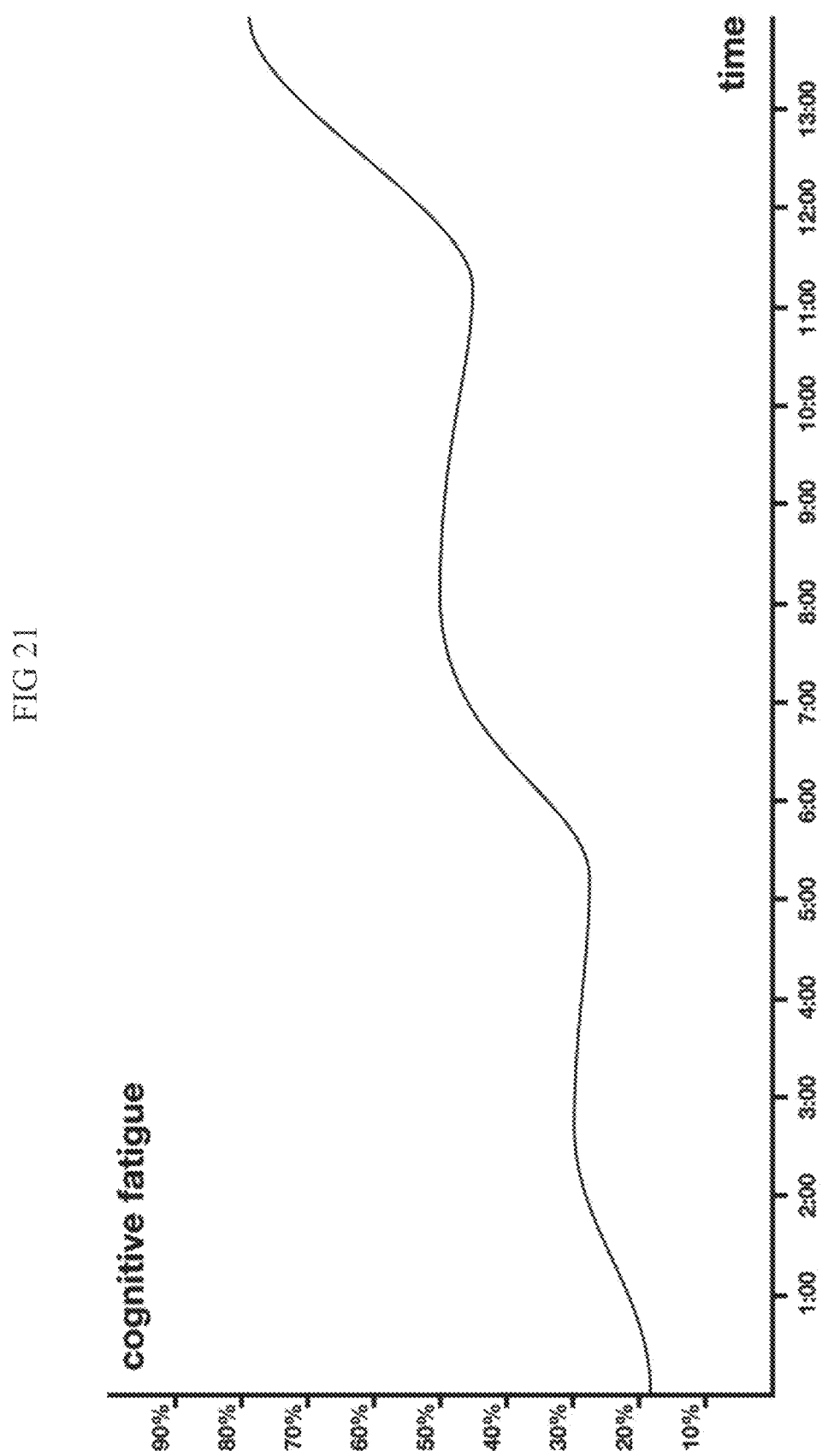
FIG. 21 is an exemplary graph depicting a representation of the estimation of the cognitive fatigue during the recording of a user's target session of consuming the target visual information over a given time period of the target session.
Figure 22:
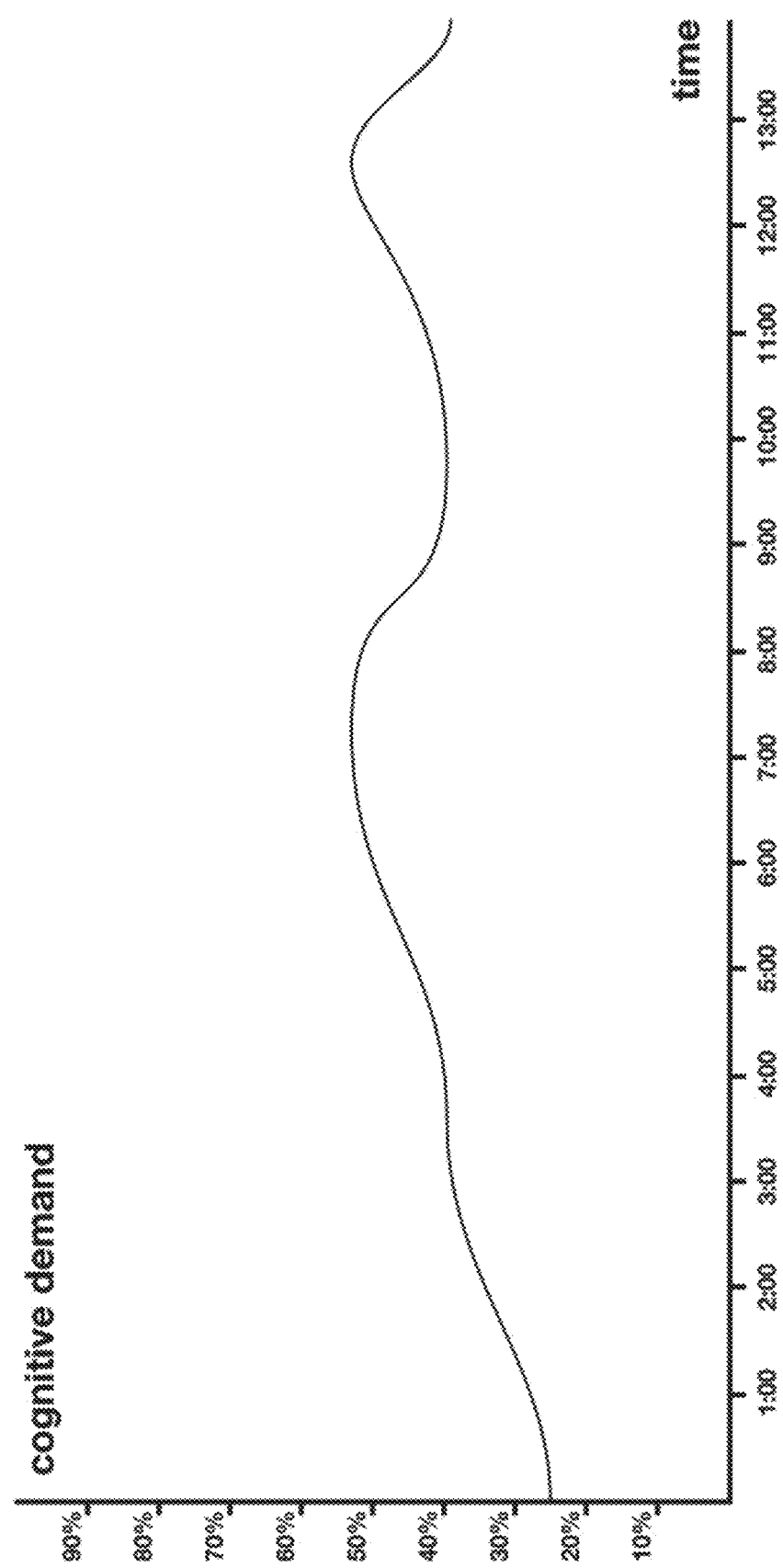
FIG. 22 is an exemplary graph depicting a representation of the estimation of the cognitive demand during the recording of a user's target session of consuming the target visual information over a given time period of the target session.
Figure 23:
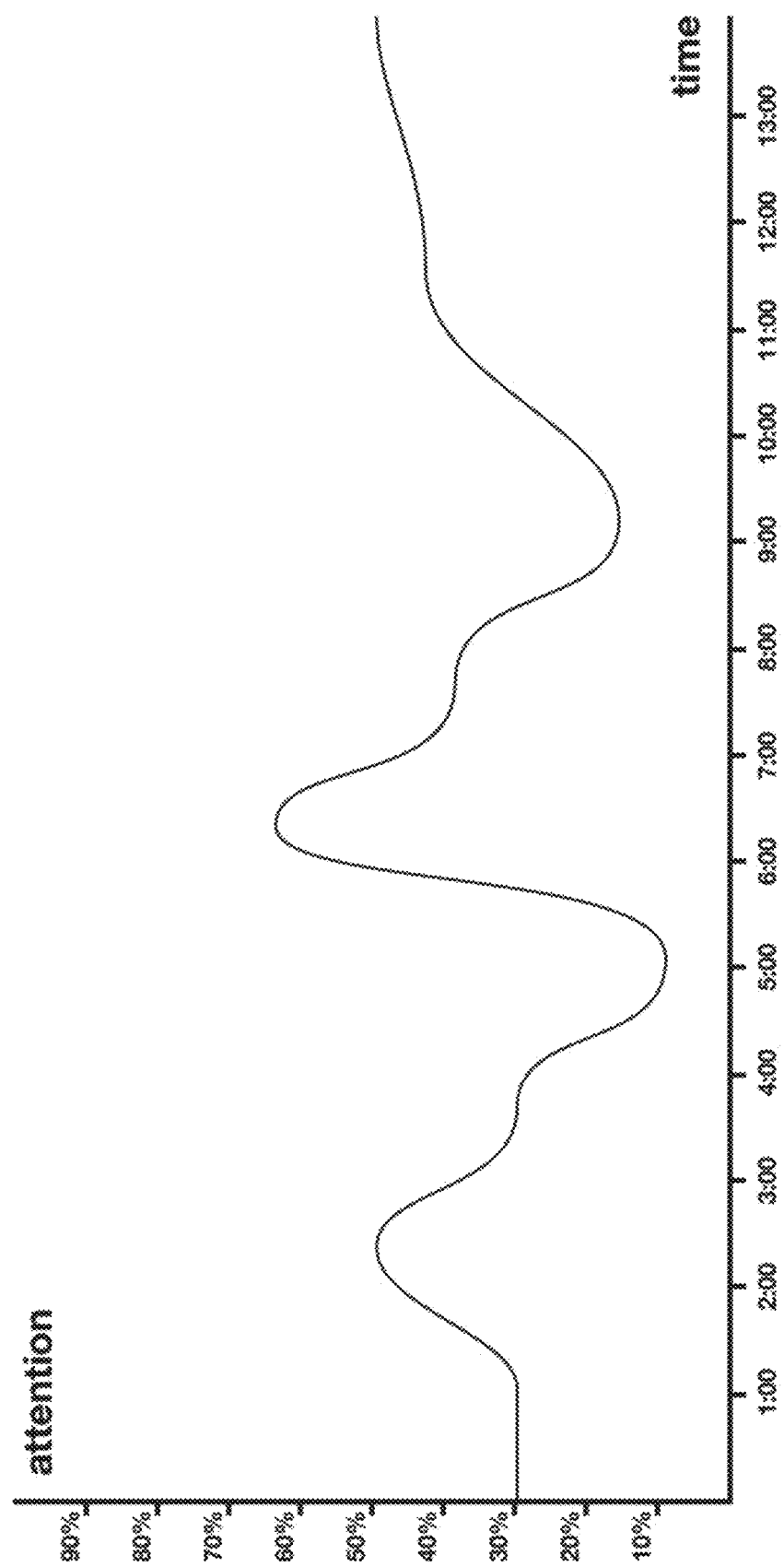
FIG. 23 is an exemplary graph depicting a representation of the estimation of the attention levels during the recording of a user's target session of consuming the target visual information over a given time period of the target session.
Figure 24:
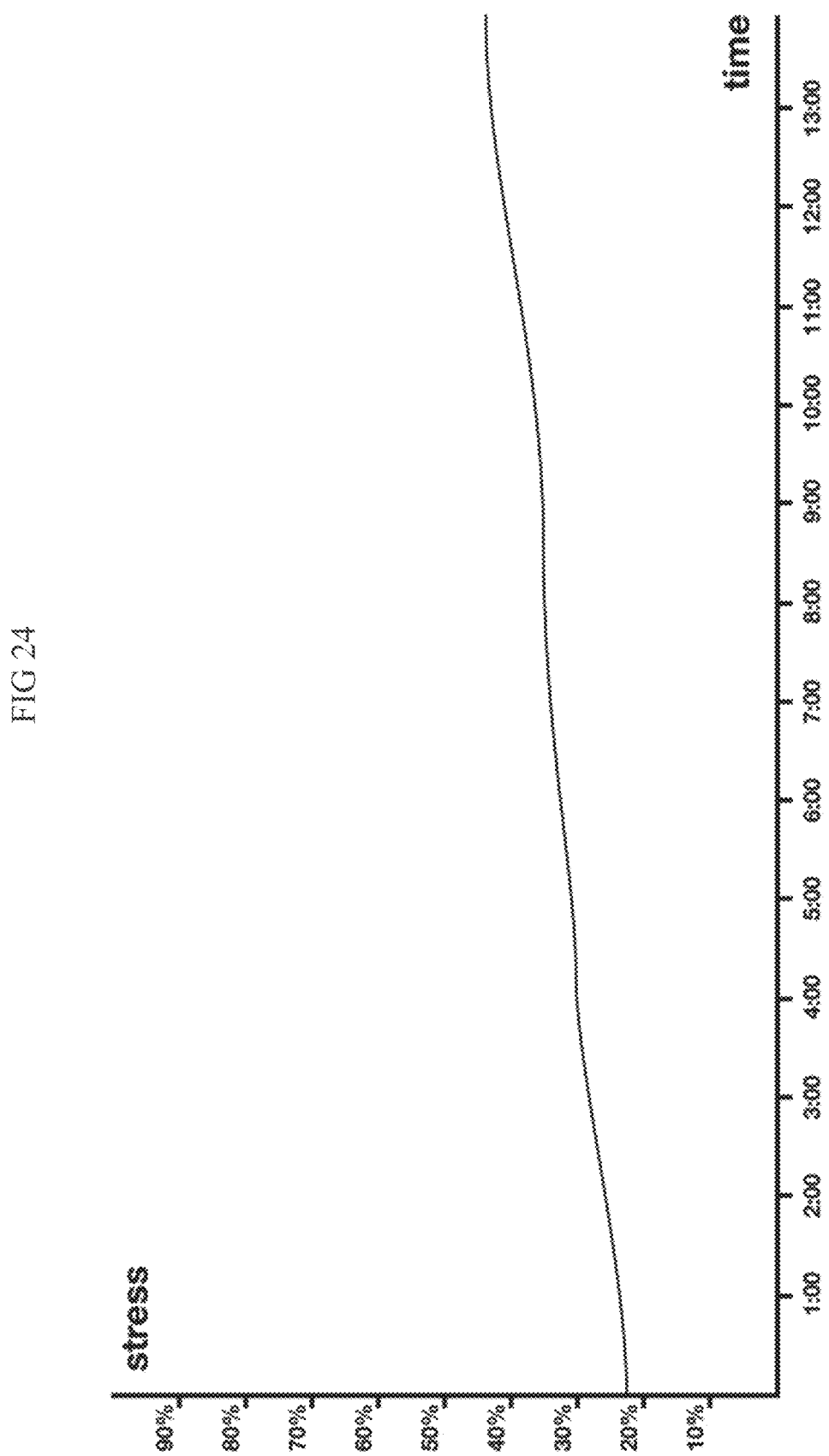
FIG. 24 is an exemplary graph depicting a representation of the estimation of the stress levels during the recording of a user's target session of consuming the target visual information over a given time period of the target session.
Figure 25:
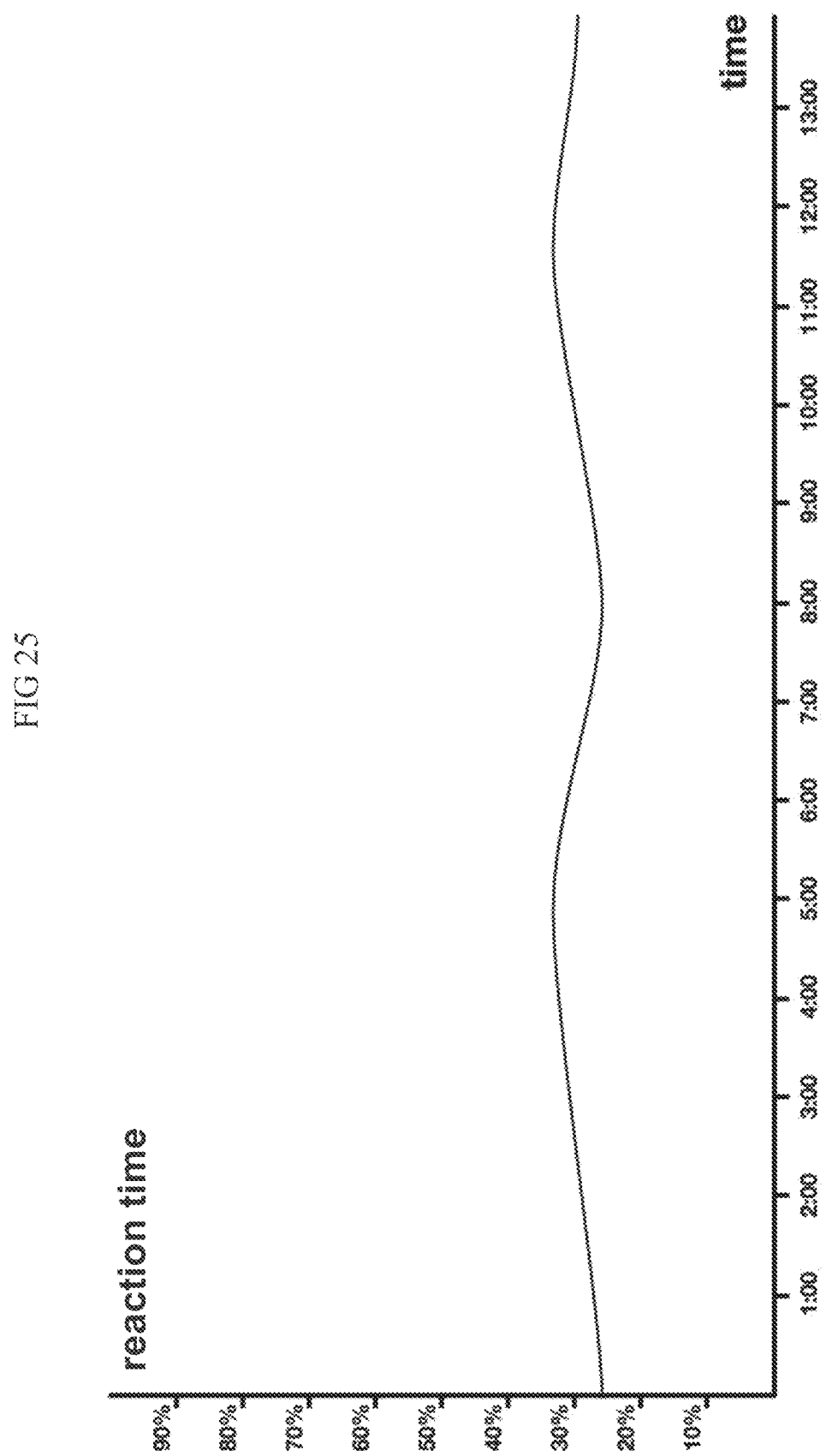
FIG. 25 is an exemplary graph depicting a representation of the estimation of the reaction time levels during the recording of a user's target session of consuming the target visual information over a given time period of the target session.
Figure 26:
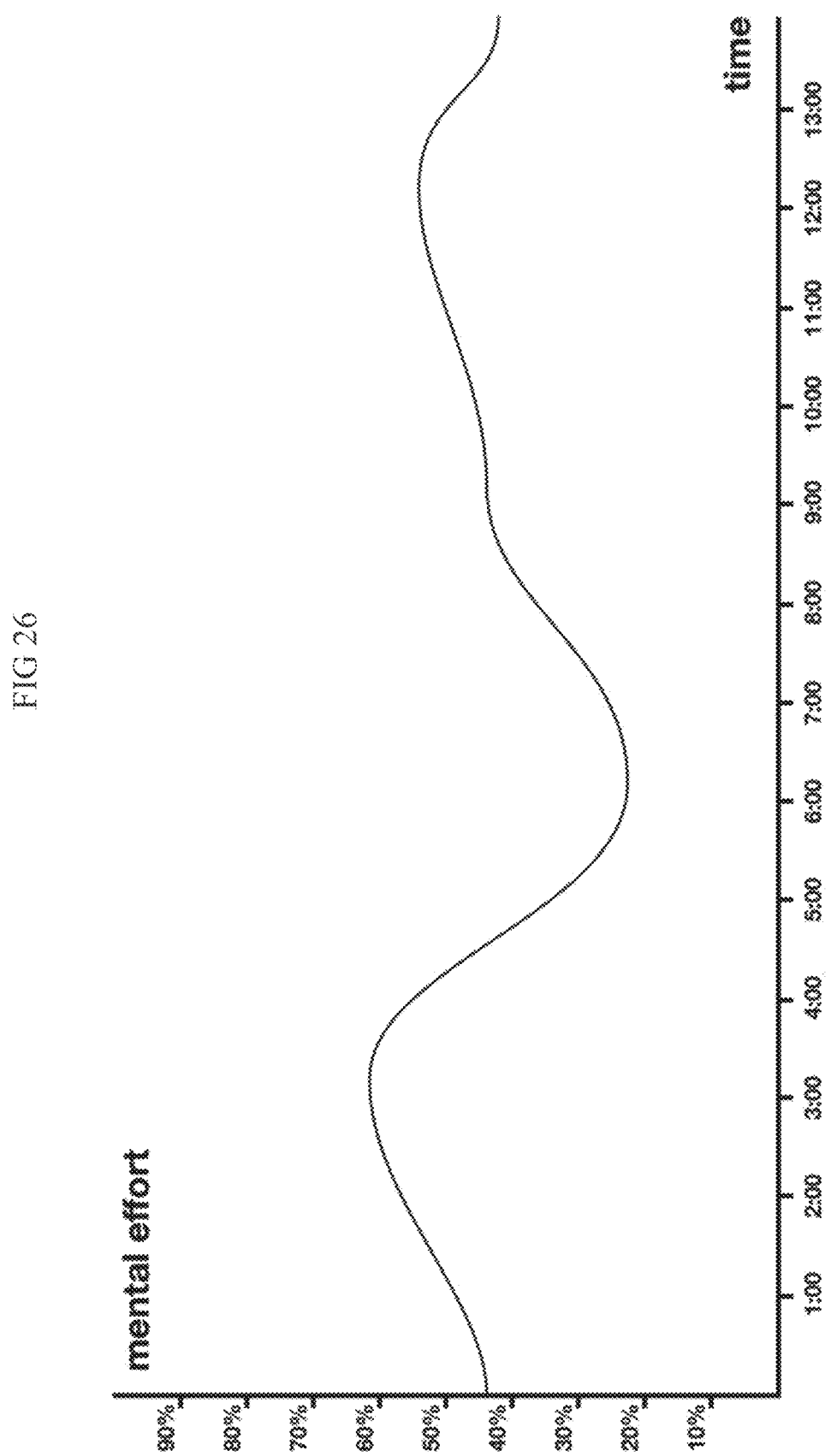
FIG. 26 is an exemplary graph depicting a representation of the estimation of the mental effort levels during the recording of a user's target session of consuming the target visual information over a given time period of the target session.
Figure 27:
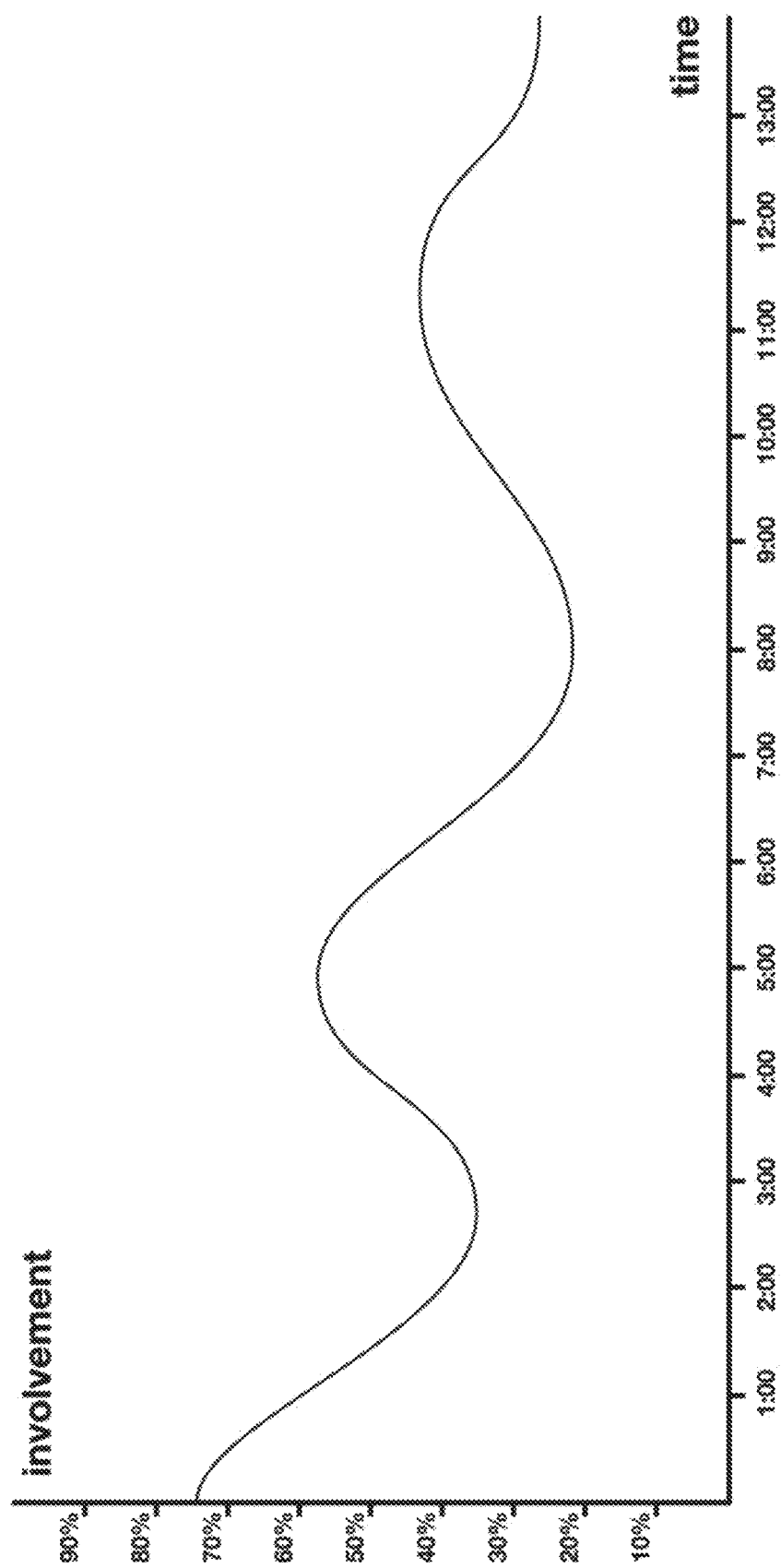
FIG. 27 is an exemplary graph depicting a representation of the estimation of the involvement levels during the recording of a user's target session of consuming the target visual information over a given time period of the target session.
Figure 28:
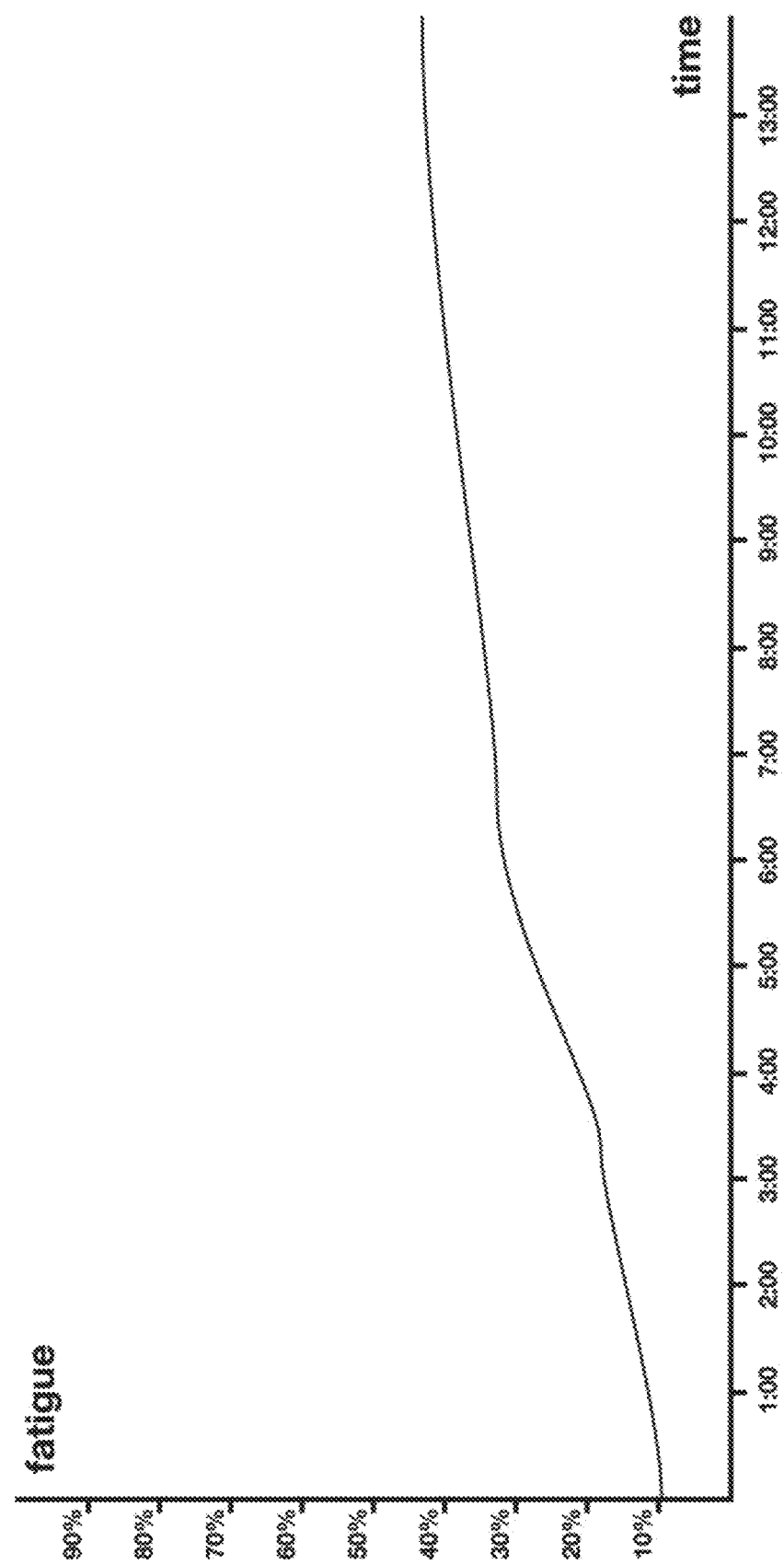
FIG. 28 is an exemplary graph depicting a representation of the estimation of the fatigue during the recording of a user's target session of consuming the target visual information over a given time period of the target session.

In the augmented model with gaze tracks information, the embedding for each discrete gaze track feature is also concatenated to the input. This architecture is shown in FIG. 14. The embeddings that are extracted from bioelectrical signals such as EEG may be included to the input of this system as well by a simple concatenation. For example, the bioresponse measurement module 704 may be an EEG apparatus. The EEG measurement data may be used for training the training machine learning model or the calibrating machine learning model depending on the setup. The user may also be connected to the EEG headset and the user's response to consuming the calibrating or the target visual information 717 may be recorded. The calibrating of the EEG and of the EEG measurement data may be done by any suitable method. Training the training machine learning model is done on a set of EEG data received from training users and applying the training machine learning model to the EEG data received from the user is done by using the data recorded at the training session when the user consumes the target visual information 717.

Extracting word-level EEG features may be done similarly to eye tracking feature extraction or in any suitable manner, as long as the eye tracking and the EEG measurements are recorded simultaneously. It is possible to select the electrodes data from the EEG as more relevant to the training of the machine learning model or less relevant. For example, the processing of the data from the electrodes on the forehead of a user may be considered more relevant for the present technology and the data from the electrodes on the outermost circumference (chin and neck) may be used to detect muscular artifacts and may be considered less relevant to the present technology.

To extract EEG features a convolutional network is used to generate a segment-level representation of bioelectrical signals from a time window centered around a corresponding timestep of a gaze track data. A neural architecture as described above with relation eye tracking feature extraction in FIG. 14 may be used such that it is augmented with embedding layers of the EEG features. EEG features may include 8 word-level EEG features, one for each frequency band, however, it is understood that there may be more or less features extracted for different number of frequency bands. Additional feature values may be averaged over the total number of electrode values, which has been 105 electrode values in one setting. The EEG features may be mapped to the duration of the simultaneously recorded gaze tracks features, including EEG features extracted from the duration of the total reading time of each word or a group of words, or the EEG features extracted from the duration related to the measured fixations or to the first fixations in some embodiments. The gaze tracks features transformed from coordinate values into tensors of real values and the EEG features transformed from microvolts values into tensors of real values may be normalized and concatenated to the character unit and/or word embeddings as one-hot tensors.

Each EEG feature may correspond to the duration of a specific fixation and contain from 1 to 512 electrode values. The EEG signal may be split into 8 frequency bands, which are fixed ranges of wave frequencies and amplitudes over a time scale: theta1 (4-6 Hz), theta2 (6.5-8 Hz), alpha1 (8.5-10 Hz), alpha2 (10.5-13 Hz), beta1, (13.5-18 Hz) beta2 (18.5-30 Hz), gamma1 (30.5-40 Hz) and gamma2 (40-49.5 Hz). It is understood that it is possible to split the EEG signal into 2 to 20 frequency bands in order to estimate a correlation of frequency ranges to cognitive functions. For example, experiments showed that theta activity reflects cognitive control and working memory, alpha activity has been related to attentiveness, gamma-band activity has been used to detect emotions and beta frequencies affect decisions regarding relevance. The EEG may have a sampling rate of 250 Hz where a frame size of 360 ms may be used. It is understood that various sampling rates are possible and various frame sizes may be used.

When the system 700 is operating according to the embodiments of the method 100 or the method 200, any of the calibration steps 103, 104 and 203 may include a step of generating a calibrating machine learning model. The calibrating machine learning model is then used by the system 700 to calibrate the target data that is recorded during the target session as described above. Consequently, the calibrating machine learning model is designed to operate within calibration parameters each recording session that it is generated for.

The system 700 stores the raw data and the calibrated data within the data storage module 716 for the use by the data analyzing module 714 when prompted by the system in accordance with any of the methods 100, 200, 300, 400 or 500.

The training machine learning model.

The training machine learning model is trained on calibrated training data that is stored in the data storage module 716 or that is uploaded into the system 700 via the network 705. The calibrated training data may be uploaded in real-time, such that the data analyzing module 714 constantly updates the training machine learning model on most recent data, or the calibrated training data may be uploaded periodically into the system 700, such that all or some of the uploaded calibrated training data is used to train the training learning model.

In some embodiments, the calibrated target data may also be used as data for training the training machine learning model, for example for future target sessions that may follow the original target session during which the original target data was recorded.

During the step of calibrating the target data the calibrating machine learning model operates within the calibration parameters to extract tensor form features that are then input into a convolutional neural network, which then generate convolutional neural network activations (outputs) for each data point and/or data set of raw target data recorded during the target session, which is then followed by application of a statistical pooling algorithm to each of the outputs. The training machine learning model performs the convolutional neural network and the standard pooling calculations over a number of iterations until a threshold defined by the system 700 is reached.

For the purposes of training the training machine learning model, the system 700 requires a sufficient data set of training data. An example collecting training data is described in the paper "Entity Recognition at First Sight: Improving NER with Eye Movement Information" (incorporated herein by reference), where the data was collected by simultaneous eye tracking and EEG recordings of natural sentence reading of 12 adults, who are native speakers reading approximately 1100 English sentences. Typically, this amount of data would be sufficient to train the training machine learning model of the system 700, however, it is contemplated that more training data may be preferable. The research paper "ZuCo, a simultaneous EEG and eye tracking resource for natural sentence reading", Hollenstein, N., Rotsztejn, J., Troendle, M., Pedroni, A., Zhang, C., & Langer, N., Scientific data (2018) describes that the data may contain both natural reading and task-solving reading sets, which are recorded as follows. Subjects read naturally at their own speed and without any specific task other than answering some control questions testing their reading comprehension. The first set of data included 300 sentences (7737 words) from Wikipedia articles that contain semantic relations and may be used for training the cognitive level calculations within the training machine learning model. The second set contained 400 positive, negative and neutral sentences (8138 words) from the Stanford Sentiment Treebank, which is described in the research paper "Recursive deep models for semantic compositionality over a sentiment treebank" by Socher, R., Perelygin, A., Wu, J., Chuang, J., Manning, C. D., Ng, A. Y., & Potts, C., in Proceedings of the 2013 conference on empirical methods in natural language processing (pp. 1631-1642) (2013), incorporated herein by reference, and may be used for training the emotional level calculations within the training machine learning model. This data would be sufficient to extract the eye tracking features, the EEG features and the text features in order to train the training machine learning model.

It is contemplated that because of a high variability between training users' EEG signal measurements, training of the training machine learning model may have a step of averaging the EEG features over all of the training user data set as is described in the research paper "Advancing NLP with Cognitive Language Processing Signals" N. Hollenstein, M. Barrett, M. Troendle, F. Bigiolli, N. Langer, C. Zhang, ArXiv Computer Science, ArXiv (2019).

Typically, the neural networks of the training machine learning models may be trained on all available data sets with 10-fold cross validation (80% training, 10% development, 10% test).

After the step of training the training machine learning model is completed and the training machine learning model is stored in the data storage module 716, the system 700 will start analyzing users data initially via the calibrating machine learning model and subsequently with the training machine learning model, given that the operational parameters of the training machine learning model have already been calculated during the training step of the training machine learning model.

The training machine learning model is based on combining the analysis of at least the features extracted from eye tracking, EEG and semantic of the visual information 717 consumed by the user. For example, when a user reads a text, the user may focus on several text elements during a given time interval, including a select single word, a group of words, or a section of text in general. The number of fixations and the fixation duration on a word or a section of text may depend on a number of linguistic factors. Users reading a text may fixate on open-class words that are not predictable from context. Word frequency and word familiarity influences the time users may look at a word or a section of text. For example, it is possible to calculate a frequency value for each word within a text. The familiarity of a word may be calculated depending on statistical linguistic analysis of an individual or a group of individuals having similar linguistic background, including culture, profession, etc. Two words may have the same frequency value in a text, but different familiarity value. This may affect the fixation time for each of those two words as measured by the eye-tracker 702. Analysis of the fixation times may include neural network architectures, of the calibrating or the training machine learning models that may include portions related to natural language processing (NLP) algorithms. Particularly, non-linear neural networks with distributed word representations may be used as inputs for a sequence labeling calculations enhanced with NLP features. For example, combinations of neural networks such as LSTMs or CNNs may also be used for feature determination based on transforming raw data of the eye-tracker 702. It is possible to use such an approach in order to enhance features generated by transforming raw data of the recorded gaze tracks by combining word level and character level embeddings into tensors of layers for eye tracking features.

The present technology further augments the data collected from the user during the target session with lexical and semantic information extracted from the text read by a user or the images (still or moving) seen by the user. For instance, the additional information about the text or an image includes meanings that have cognitive and emotional values. This additional information is used to augment the gaze tracks, the EEG data and the text coordinate positions (x, y) data, i.e. the coordinate positions (x, y) of the words and characters on the display 703. The present technology contemplates that the user's response to consuming the visual information 717 displayed to him/her is dependent on text or image characteristics, which include word frequency, text sentiment, text genre, the overall text complexity, specific text subjects and other text characteristics that are currently developed by the natural language processing community and which is described in various the research paper, including "Eye movements in reading and information processing: Keith Rayner's 40 year legacy" by Clifton Jr, C., Ferreira, F., Henderson, J. M., Inhoff, A. W., Liversedge, S. P., Reichle, E. D., & Schotter, E. R., Journal of Memory and Language, 86, 1-19, (2016), which is incorporated herein by reference, and "The Oxford handbook of event-related potential components" by Luck, S. J., & Kappenman, E. S., Oxford university press (2011), which is incorporated herein by reference, as well as color characteristics, image sentiment, color frequency, image cognitive message, etc. Consequently, the system 700 utilizes both neurophysiological information and information embedded in the meaning and/or significance of the visual information, within the training machine learning model, which calculates an estimation of user cognitive and/or emotional responses to consuming visual information 717, which may be more appropriate in some instances than machine learning models that are trained solely on neurophysiological signals, such as the EEG measurements and and gaze tracks.

The present technology contemplates that is it possible to calibrate raw data for use by the neural networks of the training machine learning models such that it includes the word-level lexical information and/or image-level significance information into the training machine learning model by word-embedding and image embedding-systems. Word embeddings are tensor representations of words in a chosen text corpus, that translate semantic affinity of the words into a euclidean space. Word embeddings can be extracted with suitable natural language processing (NLP) solutions such as word2vec, GloVe and BERT that gained a massive popularity in recent years. The image embeddings (similarly to word-embeddings) are tenor representations of images in a chosen image corpus, that translate semantic affinity of the images into a euclidean space. Extracted embeddings may be presented in a form of 200-dimentional real-value tensors, that can be concatenated with gaze-tracks features and EEG embeddings to form an input of the recurrent neural network described previously.

Further augmentation of the analyzed data may include labellings that correspond to semantic relations. The semantic relation labels may be created by a specialist, or can be created by the means of neural network classifier that is based on the word embedding representations. For example, the present technology may use the method proposed in the research paper "Semeval-2010 task 8: Multi-way classification of semantic relations between pairs of nominals" by Hendrickx, I., Kim, S. N., Kozareva, Z., Nakov, P., Séaghdha, D. O., Padó, S., & Szpakowicz, S., in Proceedings of the 5th International Workshop on Semantic Evaluation, pp. 33-38, (2010), which is incorporated herein by reference, wherein the evaluation SemEval-2010 task 8, relations between pairs of nominals were categorized as nine classes: Cause-Effect, Instrument-Agency, Product-Producer, Content-Container, Entity-Origin, Entity-Destination, Component-Whole, Member-Collection, Message-Topic. These class labels may be included into a tensor feature of textual representation in a form of one-hot encoding, and can be concatenated to a word embedding for a system described in the paragraph above.

Apart from labeling semantic relations, a sentiment labeling approach may be used as well. Sentiment labels may be created by a specialist or can be created by the means of neural network classifier that is based on the word embedding representations. For example, the present technology may use the approach outlined in the research paper "Recursive deep models for semantic compositionality over a sentiment treebank" by Socher, R., Perelygin, A., Wu, J., Chuang, J., Manning, C. D., Ng, A. Y., & Potts, C., in Proceedings of the 2013 conference on empirical methods in natural language processing (pp. 1631-1642) (2013), wherein the Stanford Sentiment Treebank sentiment labels are presented in a form of natural numbers from 1 to 25, where 1 represents the most negative sentiment and 25 represents the most positive sentiment. These sentiment labels may be included into a tensor of textual representation and can be concatenated to the word embeddings, which are then used by the neural networks for within the training machine learning model.

The training machine learning model may have a person-specific information analysis within its neural network structure. For example, a bioresponse of one individual may be different from a bioresponse of another individual, how a single individual bioresponses may have a signature like pattern across all types of measurements and bioresponse measurement modules 704. In case of EEG, measured EEG signals may be specific to each user across various elicitation protocols. The user-specific signatures may be identified in EEG signals measurements irrespective of tasks or state of the brain.

For the purpose of creating a system that would be equally applicable for a variety of users, the training machine learning model may be trained to suppress user-specific components of the data that are not related to the cognitive and emotional levels of the training user and, consequently, the user. For extracting robust signatures from bioresponses, the training machine learning model may use a deep neural network (DNN) with the architecture that defines a subspace that enhances the variability of individual's cognitive and emotional responses and suppresses the measured bioresponses as well as other channel factors, such as the measurement of the noise and/or other nuisance factors. This problem can be considered as a domain adaptation problem and may be solved with domain-adversarial training of neural networks as proposed in the research paper "Domain-adversarial training of neural networks" by Ganin, Y., Ustinova, E., Ajakan, H., Germain, P., Larochelle, H., Laviolette, F., & Lempitsky, V., The Journal of Machine Learning Research, 17(1), 2096-2030 (2016), which is incorporated herein by reference. For example, for a multi-channel EEG recorded data set, a (DNN) framework uses as input the feature representations extracted from gaze tracks and the EEG data as described above. Then the DNN projects the input data from the multi-channel EEG into an embedding space. To perform a domain-adversarial training an additional classifier is used on the embedding level and the training machine learning model is trained jointly with the use of gradient reversal layer (GRL). As was described previously, the DNN architecture processes the input first at frame level and then at segment level after accumulating statistics.

The modified DNN model consists of four hidden or more layers and may be configured to take the spectrograms of all EEG channels as input. The initial two or more (if needed) layers of the DNN network act at the frame level, and apply 1D convolution algorithm on all the frames. In an example, following the convolution layers, a statistical pooling layer (subsequent layer) acts at the channel level, where such statistics as mean and variance for every channel is estimated. It is understood that any suitable pooling algorithm may be applicable. The additional hidden layer takes the statistics concatenated from all the channels and projects it onto a lower dimension using a feedforward layer. All the hidden layers in the DNN model may use sigmoid or Rectified Linear Unit (ReLU) activation. For example, to obtain class probabilities as the output of the DNN model, the final output feedforward layer may use softmax activation. In this case the network is trained using the cross-entropy error function or any suitable error function.

The outputs of DNN are the probabilities for each user to have a certain cognitive or emotional level estimation for each given EEG segment of data together with corresponding eye-tracker gaze tracks. The probabilities are used to get the final estimations of the actual cognitive or emotional level at a given time (t) of consuming visual information 717.

In some embodiments, the activations from one of the hidden layers of the DNN give a lower dimensional embedding of the user-specific information. LDA may be computed over these embeddings, and a one-versus-all SVM classifier is built using a cosine kernel to estimate the user's cognitive or emotional levels. This DNN architecture may be used in a validation framework as well.

Below is a description of an example of using the present technology in a web-based service, wherein the examples of an interface of the web-based service are depicted in FIGS. 15 to 18. Any of the methods 100, 200 or 300 may be used within the web-based service. For example, a user of the device having the system 700 installed thereon signs into the web-based service. After signing in, the user is asked to put on an EEG device, turn it on and pair it with the computing module 701. During this step a calibration of an eye-tracker 702 is performed. For example, the user adjusts the camera 701 of the system 700 to ensure that the camera 701 captures the entire face of the user. The system 700 captures the user's face and confirms to the user that it is ready to start recording the user's calibrating session by displaying on the display 702 an appropriate message via the service interface. The system 700 keeps tracks of the user's face to ensure that if during the calibrating or the target session the user's face moves out of the view of the camera 701, the recording of the calibrating and or target sessions is paused and/or stopped and the user alerted with an appropriate message on the display 702, querying the user to interrupt the recording session and save the data for later user, or to move the user's face back to the view of the camera 701 to continue the recording session. The eye-tracker calibration consists of data collection and model fitting, which is executed during the calibrating session. During the data collection step, several targets are consecutively presented on the display 703, the user is asked by the system 700 to look at the presented calibrating visual information (FIG. 29), and the eye-tracker records the gaze tracks of the user. The system 700 automatically stops the calibrating session, when the system 700 deems that sufficient amount of calibrating data is collected from a statistical perspective, i.e. there is enough data to train the calibrating machine learning model. Typically, the calibrating data collection time is approximately 2-3 seconds per unit of calibrating visual information (FIG. 29). As a result of this calibrating data collection step, the system 700 gathers a multi-dimensional time series, which, for every timestep t, contains the values (x_target(t), y_target(t)), which are the display coordinates of the calibrating visual information on the display 703 and may be measured in pixels, for example, from 0 x 0 to 2388×1668 pixels; and values for (x_observed(t), y_observed(t)), which are the uncalibrated coordinates provided by the eye-tracker 703 of the calibrating visual information, which may also be measured in pixels, for example, from 0 x 0 to 2388×1668 pixels; and the metadata that may be stored in the system 700 as param(t1), param(t2), param(t3), . . . param(tn), and which stores data about additional parameters, that contain information about recording environment of the calibrating session, including features that may be extracted from video and audio streams, etc. as described in more detail above. The multidimensional time-series generated during the calibrating data collection step is then used as the input data for eye tracking calibration model selection step. A suitable regression model is trained in order to reconstruct the parameters x_target(t), y_target(t) from the parameters x_observed(t), y_observed(1), and param(t1), . . . param(tn), by applying any suitable loss function, such as mean squared error (MSE). The resulting calibrating machine learning model is then stored within the system 700. Following the eye-tracker calibration, the user is asked to maintain a relaxed position, avoiding any movements and other activities, so as to maintain his/her body and mind in a resting state for a period of time of no less than 30 seconds. During this resting state time interval, a resting state EEG data is measured and collected in a form of multi-channel time series, which is then stored in the system 700. For example, the recorded resting signal may have a sampling frequency of 256 Hz, the frequency of the signal that the system may identify ranges in values from 7 to 13 Hz, which is known as the alpha rhythm, and for the values at rest, the system 700 may identify an average value and a deviation value for each specific user, for example 9 Hz plus or minus 1 Hz.

Following the calibrating session, the user is given access to an electronic library and asked to choose a specific text.

After the text is chosen, the recording of the target session begins as the system presents to the user the first page of the text on the display 703. For example, the system 700 may present a text of 10 pages with about 3,000 words. The system 700 asks the user to read the selected text by navigating between pages of his/her device. During the session, the measurements of eye movements and EEG are being recorded by the system 700. Measurements of eye tracking data consist of a multichannel time series with channels x_observed(t), y_observed(t) (uncalibrated coordinates provided by the eye tracking system) and param(t1), . . . param(tn) (additional parameters). After the user ends the target session, the previously stored calibrating machine model is applied to collected data to enrich the multichannel time series collected from the eye tracking device with channels x_calibrated(t) and y_calibrated(t), which correspond to calibrated target coordinates of gaze tracks. The enriched time series of the calibrated target eye tracking data and the EEG data is stored in the system for analysis. An example of enriched data may be (x_observed 100, y_observed 100, EEG 30, param_1=0.7, param_2=0.2, param_3=0.99→x_observed 100, y_observed 100, EEG 30, param_1=0.7, param_2=0.2, param_3=0.99 x calibrated 80, y_calibrated 80).

The analysis may consist of applying several steps of the training machine learning model to the calibrated target data. The EEG data is analyzed when the target recording session data contains an EEG channel and is analyzed as follows. It is understood that when no EEG data is available, the steps relating to the EEG analysis data may be omitted. The data recorded by the EEG may be considered as a sequence of overlapping time interval windows (window_1, window_2, . . . window_n), wherein the length of each window is similar to each other, is typically no less than 500 ms., and the time shift between the windows may be chosen from interval 0 ms to the value of the measurement of window length/2. Approximately 600 windows may be recorded during a 10 minutes recording of a target session. Each window_k consists of fragments of multichannel EEG time series, the number of channels is equal to the number of EEG channels provided by the EEG recording device. A feature extraction method based on fast Fourier transform (FFT) is applied to each window, generating a tensor of extracted features for each considered window of the EEG signal, producing a sequence (feat_1, feat_2, . . . feat_n). For each of the (window_1, window_2, . . . , window_n) there may be 256 tensors of the sequence (feat_1, feat_2, . . . feat_256), whereby each of the tensors of (feat_1, feat_2, . . . feat_256) are real numbers from 0 to 1000. These tensors are used as an input for the convolutional neural network of the training machine learning model, producing a sequence of the activation tensors (activation_1, activation_2, . . . , activation_k). In some examples, there may be approximately twice as many windows as activations, and the activations are floating point numbers, which are used to generate a sequence of EEG embeddings, such as (embedding_1, embedding_2, . . . , embedding_m) using a suitable pooling approach such as averaging or statistics pooling. Each (embedding_k) is a tensor of real values of a fixed dimension, for example, the dimension may be 100. For each (embedding_k), a (timestep t_k,start) and a (timesteps t_k,stop) are stored, representing specific time coordinates of the input data that was used to produce the (embedding_k).

Then the data analyzing module 714 applies the training machine learning model to the all calibrated target data as follows. For each timestep (t) in the eye tracking multichannel calibrated target session data, a tensor of features (feature(t1), feature(t2), . . . feature(tn)) is generated using a predefined algorithm, which applied to the channels (x_calibrated(t), y_calibrated(t)). For each timestep (t) a corresponding previously extracted EEG embedding(t) tensor is chosen and stored. The tensor of features (feature(t1), feature(t2), . . . feature(tn)) together with calibrated coordinates (x_calibrated(t), y_calibrated(t)) and the additional parameters (param(t1), . . . param(tn)) and the tensor embeddings (embedding(t)) form the input for the training machine learning model recurrent neural network (RNN) of any suitable architecture, such as bi-directional Long Short-Term Memory network (biLSTM). For each timestep (t), the RNN produces a tensor of activations that are designed to describe a frame-level cognitive and emotional state of a user. A time series of activations is stored in the data storage module 716 of the system 700 and is used to generate a graphic report for a convenient visualization of the training machine learning model results.

The time series of activations rnn_activation_1(t), . . . , rnn_activation_p(t) obtained during the previous step consist of real values from interval [0,1]. Each of the values may be interpreted as an estimate of a certain cognitive and emotional state of the user at a given time. For example, the rnn_activation_1(t) may be interpreted as a level of fatigue, rnn_activation_2(t) may be interpreted as a level of emotional arousal, rnn_activation_3(t) may be interpreted as level of attention focus etc. The results are stored in the data storage module 16 and may be displayed to the user in form of a report having numerical values for each cognitive and emotional metric estimation along with generated graphs, such as values aligned with time axis. Examples of such visualizations are shown in FIGS. 15 to 28.

In the above description, numerous specific details are set forth, but embodiments of the invention may be practiced without these specific details. Well-known circuits, structures and techniques have not been shown in detail to avoid obscuring an understanding of this description. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "Connected" may indicate elements are in direct physical or electrical contact with each other and "coupled" may indicate elements co-operate or interact with each other, but they may or may not be in direct physical or electrical contact. Also, while similar or same numbers may be used to designate same or similar parts in different figures, doing so does not mean all figures including similar or same numbers constitute a single or same embodiment.

One skilled in the art will appreciate when the instant description refers to "receiving data" from a user that the electronic device executing receiving of the data from the user may receive an electronic (or other) signal from the user. One skilled in the art will further appreciate that displaying data to the user via a user-graphical interface (such as the screen of the electronic device and the like) may involve transmitting a signal to the user-graphical interface, the signal containing data, which data can be manipulated and at least a portion of the data can be displayed to the user using the user-graphical interface.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method of evaluating one of a target cognitive level and a target emotional level of a user in response to a visual consumption by the user of a target visual information, the method being executed on an electronic device, the method comprising:
  displaying to the user a calibrating visual information,
    the calibrating visual information being displayed to the user on a display,
    and the calibrating visual information being associated with calibrating coordinates of the display;
  recording by an eye tracking device a calibrating data set in response to the user visually consuming the calibrating visual information,
    recording the calibrating data set includes
      recording calibrating gaze tracks of the user,
      recording calibrating actions of the user, and
      recording calibrating session data of the recording of the calibrating data set;
  calculating calibrating features based on associating the calibrating gaze tracks with the calibrating coordinates of the calibrating visual information by analyzing the calibrating gaze tracks, the calibrating actions data and the calibrating session data;
  training a calibrating machine learning model on the calibrating features;
  displaying to the user the target visual information,
    the target visual information being displayed to the user on the display, the target visual information being associated with target coordinates of the display;
  recording by the eye tracking device a target data set in response to the user visually consuming the target visual information,
    recording the target data set includes
      recording target gaze tracks of the user, and
      recording target session data of the recording of the target data set;
  calibrating the target data set by applying the calibrating machine learning model to the target data set and determining a calibrated target data set;
  applying the training machine learning model to the calibrated target data set;
  estimating one of the target cognitive level and the target emotional level of the user in response to the visual consumption of the target visual information at several timesteps from an application of the training machine learning model to the calibrated target data set; and
  storing in the electronic device a digital report of one of the target cognitive level and the target emotional level of the user.

2. The method of claim 1, further comprises recording one of a neural signals, bio-electric signals, captures of facial expressions and any of biometrical measurements of the user in response to the user consuming one of the calibration visual information and the target visual information.

3. The method of claim 1, further comprises training a training machine learning model on a training visual information and a training data set from a training user,
  the training visual information being displayed to the training user on a training display,
  the training visual information being associated with training coordinates of the training display,
  the training data set being recorded in response to the training user visually consuming the training visual information,
  the training data set includes training user gaze tracks and one of a training cognitive data and training emotional data of the training user,
  the training cognitive data and training emotional data being associated with the training user training gaze tracks,
  the training gaze tracks being associated with the training coordinates of the displayed training visual information.

4. The method of claim 3, wherein the training data set includes one of a neural signals, bio-electric signals, captures of facial expressions and any of biometrical measurements of a training user in response to consuming the training visual information.

5. The method of claim 1, wherein the display includes one of a smartphone display, a computer display, a tablet display, a television display, a projector display, a paper, a whiteboard, a blackboard, an interactive display and a display configured for displaying one of a calibrated visual information and a target visual information.

6. The method of claim 1, wherein the one of the target cognitive level and the target emotional level include data related to one of attention, cognitive concentration, cognitive load, cognitive fatigue, stress level, emotional state, emotional strain, reaction time, fatigue, mental effort and engagement.

7. The method of claim 1, the target session data of the user is augmented with any one measurement related to one of durations of fixations, measurements related to amplitudes of saccades, ratios of measurements related to durations of fixations and measurements related to the amplitudes of saccades, estimates of long and extra-long fixations of durations of fixations, measurements related to electroencephalography asymmetry, measurements related to spectral characteristics of the electroencephalography alpha rhythm, measurements related to lower alpha range suppression level, data related to electroencephalography, fatigue index, data related to alpha electroencephalography index, data related to intrusive saccades, data related to orthodromic saccades, data related to and regressive saccades, measurements related to blinking activity, measurements related to changes in skin characteristics, for example, electrical conductivity, data related to Baevsky index, data related to Kaplan index, data related to optically obtained plethysmograms, measurements related to micromimic of a face data, measurements related to saccade latency, measurements related to respiratory activity, measurements related to electroencephalography alpha rhythm desynchronization, and data related to electroencephalography ratio index.

8. The method of claim 1, further including recording during one of a calibration session and a target session at least one measurements related to one of durations of fixations, measurements related to amplitudes of saccades, ratios of the measurements related to durations of fixations and measurements related to the amplitudes of saccades, estimates of long and extra-long fixations of the durations of fixations, measurements related to electroencephalography asymmetry, measurements related to spectral characteristics of the electroencephalography alpha rhythm, measurements related to lower alpha range suppression level, data related to electroencephalography fatigue index, data related to alpha electroencephalography index, data related to intrusive saccades, data related to orthodromic saccades, data related to and regressive saccades, measurements related to blinking activity, measurements related to changes in skin characteristics, data related to Baevsky index, data related to Kaplan index, data related to optically obtained plethysmograms, measurements related to facial expressions data, measurements related to saccade latency, measurements related to respiratory activity, measurements related to electroencephalography alpha rhythm desynchronization, and data related to electroencephalography ratio index.

9. The method of claim 1, further including recording data by electroencephalography applications, devices and hardware.

10. The method of claim 1, wherein training the calibrating machine learning model includes one of applying independent component analysis, training a computer neural network, applying a stacked autoencoder model, and applying a distributed regression trees model.

11. The method of claim 3, wherein one of the training machine learning model and the calibrating machine learning model includes one of regression algorithms, regularization algorithms, decision tree algorithms, bayesian algorithms, clustering algorithms, association rule learning algorithms, artificial neural network algorithms, deep learning algorithms, dimensionality reduction algorithms, ensemble algorithms, and computer vision algorithms.

12. The method of claim 1, wherein one of the training machine learning model and calibrating machine learning model include a convolutional neural network, a fully-connected neural network operatively arranged within a network architecture.

13. The method of claim 1, wherein the target data set includes raw data from one of an analogue and a digital signal generated by one of an eye tracking device, an electroencephalography device and a bioelectric signal measurement device.

14. The method of claim 13, wherein the raw data is transformed into frame-level feature representations by a signal transformation algorithm, the frame-level feature representations being a tensor having a time axis and a frequency axis that are input into a convolutional neural network and generate segment-level representations by a pooling algorithm.

15. The method of claim 14, wherein the segment-level representations are associated with representations of graze tracks, and the segment-level representations and representations of gaze tracks are input into a recurrent neural network, the recurrent neural network transforms the segment-level representations and representations of gaze tracks into frame-level estimates associated with cognitive level estimates and emotional level estimates for a given time interval.

16. The method of claim 15, wherein the recurrent neural network has a set of parameters, each parameter being derived by iteratively applying a set of that recurrent neural network functions, the neural network functions include an optimizing a loss function by of one of a mean squared error and a cross-entropy function, such that the recurrent neural network applies weights to input data, the loss function is calculated, the loss function is optimized by changing the weights within the recurrent neural network, the recurrent neural network repeats the process until a predetermined threshold is reached.

17. The method of claim 1, wherein estimating one of a target cognitive and target emotional levels of consumption of the target visual information of the user at several target gaze tracks from applying of the training machine learning model to the calibrated target data set further includes estimating an independent measurement tensor for one of an attention, a cognitive concentration, a cognitive load, a cognitive fatigue, a stress level, an emotional state, an emotional strain, a reaction time, a fatigue, a mental effort and an engagement.

18. The method of claim 1, wherein the training machine learning model includes a recurrent neural network within its architecture, the recurrent neural network is a bi-directional long short-term memory network, and input data for the recurrent neural network includes tensors of representations that are generated from gaze tracks and from segment-level representations that are derived from processing electroencephalography data by a combination of a convolutional neural network and pooling algorithms applied to a number of frame representations generated by the convolutional neural network for a given time segment.

19. The method of claim 18, wherein the recurrent neural network input data tensors have a time component and a corresponding session data component, the session data component of the recurrent neural network input data includes tensors generated from
  gaze tracks including information about one of a gaze point coordinates, a duration of fixations, saccades and regressions, the user's head position, facial biometrics features, and
  session environment representations, including one of a lighting information, an eye tracking technical information, and a display technical information, and
  outputs of the recurrent neural network represent frame-level representations matched to corresponding time intervals, the outputs being used for producing frame-level estimations of cognitive levels and emotional levels at the corresponding time intervals.

20. A method evaluating one of a target cognitive level and a target emotional level of user in response to a visual consumption by the user of a target visual information, the method being executed on an electronic device, the method comprising:
  training a training machine learning model on a training visual information and a training data set from a training user,
    the training visual information being displayed to the training user on a training display, and
    the training visual information including one of a training number, a training letter, a training image, a training character, a training symbol, a training space and a training color, and
      one of the training number, the training letter, the training image, the training character, the training symbol, the training space and the training color being associated with training coordinates of the training display,
    the training data set being recorded in response to the training user visually consuming the training visual information,
    the training data set including training user gaze tracks and one of a training cognitive and training emotional data of the training user, a training cognitive and a training emotional data being associated with the training user training gaze tracks, the training gaze tracks being associated with the training coordinates of the displayed one of the training number, the training letter, the training image, the training character, the training symbol, the training space and the training color;

displaying to the user a calibrating visual information, the calibrating visual information being displayed to the user on a display, and including one of a calibrating number, a calibrating letter, a calibrating image, a calibrating character, a calibrating symbol, a calibrating space and a calibrating color, one of the calibrating number, the calibrating letter, the calibrating image, the calibrating character, the calibrating symbol, the calibrating space and the calibrating color being associated with calibrating coordinates of the display;

recording by an eye tracking device a calibrating data set in response to the user visually consuming the calibrating visual information, recording the calibrating data set including recording calibrating gaze tracks of the user, recording calibrating actions data of the user, and recording calibrating session data of the recording of the calibrating data set;

calculating calibrating features based on associating the calibrating gaze tracks with the calibrating coordinates of the calibrating visual information by analyzing the calibrating gaze tracks, the calibrating actions data and the calibrating session data;

training a calibrating machine learning model on the calibrating features;

displaying to the user the target visual information, the target visual information being displayed to the user on the display, the target visual information being associated with target coordinates of the display;

recording by the eye tracking device a target data set in response to the user visually consuming the target visual information, recording the target data set includes recording target gaze tracks of the user, and recording target session data of the recording of the target data set;

calibrating the target data set by applying the calibrating machine learning model to the target data set and determining a calibrated target data set;

applying the training machine learning model to the calibrated target data set;

estimating one of the target cognitive level and the target emotional level of the user in response to the visual consumption of the target visual information at several timesteps from an application of the training machine learning model to the calibrated target data set; and storing in the electronic device a digital report of one of the target cognitive level and the target emotional level of the user.

* * * * *